(12) United States Patent
Menzer et al.

(10) Patent No.: US 7,843,379 B2
(45) Date of Patent: Nov. 30, 2010

(54) SYMMETRICAL MULTI-PATH METHOD FOR DETERMINING THE DISTANCE BETWEEN TWO TRANSMITTER-RECEIVERS

(75) Inventors: Lars Menzer, Santa Cruz, CA (US); Zbigniew Ianelli, Berlin (DE); Rainer Hach, Berlin (DE)

(73) Assignee: Nanotron Technologies GmbH, Berlin (DE)

( * ) Notice: Subject to any disclaimer, the term of this patent is extended or adjusted under 35 U.S.C. 154(b) by 0 days.

(21) Appl. No.: 11/667,806

(22) PCT Filed: Nov. 15, 2005

(86) PCT No.: PCT/EP2005/055996

§ 371 (c)(1),
(2), (4) Date: May 6, 2008

(87) PCT Pub. No.: WO2006/051119

PCT Pub. Date: May 18, 2006

(65) Prior Publication Data

US 2008/0231498 A1    Sep. 25, 2008

(30) Foreign Application Priority Data

Nov. 15, 2004  (DE) .................. 10 2004 005 651

(51) Int. Cl.
*G01S 13/08* (2006.01)

(52) U.S. Cl. .................. 342/118; 356/5.01; 356/5.1; 367/127

(58) Field of Classification Search .................. 342/134
See application file for complete search history.

(56) References Cited

U.S. PATENT DOCUMENTS 3,810,179 A   5/1974 Merrick (Continued)

FOREIGN PATENT DOCUMENTS

DE   198 36 778   2/2000

(Continued)

OTHER PUBLICATIONS

Statement of Relevance for DE 100 38 278 A1.

(Continued)

*Primary Examiner*—Thomas H Tarcza
*Assistant Examiner*—Timothy A Brainard
(74) *Attorney, Agent, or Firm*—Alfred A. Fressola; Ware, Fressola, Van Der Sluys & Adolphson LLP

(57) ABSTRACT

The invention relates to a symmetrical multi-path method for determining the spatial distance between two transmitter-receivers. Both transmitter-receivers set off at least one signal round in each case. A signal round comprises the steps:
a) transmitting at least one request data frame of a first transmitter-receiver to a second transmitter-receiver at a request transmitting time ($T_{TA1}$, $T_{TB2}$),
b) receiving the request data frame at the second transmitter-receiver at a request receiving time ($T_{RB1}$, $T_{RA2}$),
c) transmitting a reply data frame from the second transmitter-receiver to the first transmitter-receiver at a reply transmitting time ($T_{TB1}$, $T_{TA2}$), which has a respective reply time interval ($T_{replyB1}$, $T_{replyA2}$) from the request receiving time ($T_{RB1}$, $T_{RA2}$) and detecting the reply time interval,
d) receiving the reply data frame at the first transmitter-receiver setting off the signal round and detecting an allocated reply receiving time ($T_{RA1}$, $T_{RB2}$).

The signal rounds are performed in such a way that the reply time intervals ($T_{replyA2}$, $T_{replyB1}$) are either identical or have a difference, in the case of performing more than one signal round set off by each transmitter-receiver an average difference, the amount of which is a maximum of 200 microseconds.

68 Claims, 13 Drawing Sheets

U.S. PATENT DOCUMENTS

| | | | |
|---|---|---|---|
| 4,113,382 A | | 9/1978 | Freudenschuss |
| 5,510,800 A | | 4/1996 | McEwan .................... 342/387 |
| 5,589,838 A | | 12/1996 | McEwan .................... 342/387 |
| 5,661,490 A | | 8/1997 | McEwan .................... 342/387 |
| 5,748,891 A | | 5/1998 | Fleming et al. ............. 375/200 |
| 5,859,986 A | * | 1/1999 | Marenin .................... 713/401 |
| 5,959,568 A | | 9/1999 | Woolley |
| 6,002,708 A | | 12/1999 | Fleming et al. ............. 375/200 |
| 6,385,268 B1 | | 5/2002 | Fleming et al. ............. 375/377 |
| 6,400,754 B2 | * | 6/2002 | Fleming et al. ............. 375/140 |
| 6,483,454 B1 | * | 11/2002 | Torre et al. .................... 342/30 |
| 6,522,395 B1 | * | 2/2003 | Bamji et al. ................ 356/5.01 |
| 2003/0134647 A1 | * | 7/2003 | Santhoff et al. ............. 455/456 |
| 2003/0232620 A1 | * | 12/2003 | Runkle et al. ............... 455/423 |
| 2004/0090362 A1 | * | 5/2004 | Zimmermann et al. ........ 342/70 |
| 2005/0016163 A1 | * | 1/2005 | Kitahara ...................... 60/285 |
| 2005/0174285 A1 | * | 8/2005 | Monnerat ............. 342/357.09 |
| 2005/0186933 A1 | * | 8/2005 | Trans ......................... 455/296 |

FOREIGN PATENT DOCUMENTS

| | | |
|---|---|---|
| DE | 100 38 278 A1 | 1/2002 |
| DE | 101 01 285 | 7/2002 |
| DE | 101 50 104 | 11/2002 |
| DE | 101 47 462 | 4/2003 |
| DE | 101 61 507 | 7/2003 |
| EP | 0 420 329 | 9/1990 |
| EP | 1 178 330 | 4/1994 |
| EP | 0 701 701 | 5/1994 |
| EP | 0 965 050 | 9/2001 |
| WO | WO 03/077432 | 9/2003 |

OTHER PUBLICATIONS

Virginia Polytechnic Institute and State University; M. Aatique; "Evaluation of TDOA Techniques for Position Location in CDMA Systems"; whole document; Sep. 1997; Blacksburg, Virginia.

Department of Telecommunication Michigan State University; C. Steinfield; "The Development of Location Based Services in Mobile Commerce"; whole document; 2004.

IEEE Journal on Selected Areas in Communications, vol. 20, No. 9; J. Lee et al.; "Ranging in a Dense Multipath Environment Using an UWB Radio Link"; pp. 1677-1683; Dec. 2002.

IEEE Communications Magazine; J. Caffery, Jr. et al.; "Overview of Radiolocation in CDMA Cellular Systems"; pp. 38-45; Apr. 1998.

* cited by examiner

SYMMETRICAL MULTI-PATH METHOD FOR DETERMINING THE DISTANCE BETWEEN TWO TRANSMITTER-RECEIVERS

CROSS REFERENCE TO RELATED APPLICATIONS

This application is for entry into the U.S. national phase under §371 for International Application No. PCT/EP2005/ 055996 having an international filing date of Nov. 15, 2005, and from which priority is claimed under all applicable sections of Title 35 of the United States Code including, but not limited to, Sections 120, 363 and 365(c), and which in turn claims priority under 35 USC §119 to German Patent Application No. DE 10 2004 055 651.2 filed on Nov. 15, 2004.

BACKGROUND OF THE INVENTION

1. Technical Field

The invention relates to a method for determining the spatial distance of two transmitter-receivers communicating without wires from one another within a transmission range in the order of magnitude of 10 km. The invention further relates to a system of at least two transmitter-receivers communicating without wires, designed to determine the spatial distance of the transmitter-receivers from one another within a transmission range in the order of magnitude of 10 km. The invention finally relates to a transmitter-receiver for performing said method.

2. Discussion of Related Art

Three different media are employed to measure distances between mobile and stationary objects. These are: radio, infrared and ultrasound. The so-called pulse transit time method is mainly used for this. The transit time of transmitted pulses is determined by measuring the time of arrival (=TOA) and comparing it with the start time of the pulses. The distance is then calculated from the pulse transit time, also called the signal transit time in the context of this application, at the known propagation speed in the medium.

Another method for measuring distance measures the receive signal strength (=RSS) of received pulses and from this estimates the distance. The receive signal strength is strongly influenced by interference, attenuation and reflections. Experience has shown that this method is too inaccurate and unreliable for measuring distance.

A further method by which the distance can likewise be calculated is determining position by determining the angle of a arrival (=AOA) and triangulation. However, determining the distance of an object requires two cooperating devices at a known distance from one another.

Measuring the angle is relatively complicated (special antennae, time expenditure) and, because of interference, attenuation and reflections, inaccurate. If there is no visual connection, measuring the angle is greatly restricted or no longer possible, depending on the medium used. Experience has proved that this method is also too inaccurate and unreliable for measuring distance.

Infrared and ultrasound methods according to the pulse transit time method likewise have a considerable number of disadvantages. The transmission range of the systems is not very large, normal environmental influences such as daylight, sound sources or reflections interfere with them greatly and signal attenuations alone, e.g. due to thick smoke or haze, lead to the failure of these systems. Owing to said disadvantages these methods are not suitable for precise and reliable measuring of distance.

Pulse transit time methods based on radio communication signals are less sensitive to interference caused by the environment and have proved to have the greatest accuracy.

Classical radar systems are considered disadvantageous as far as expenditure, immunity to interference and unambiguous identification of objects is concerned. Reliability and accuracy depend greatly on the reflective properties of the object to be measured and the propagation conditions of the radar waves.

Also applied, in addition to the pulse transit method, is the method of determining the angle of arrival, which has the already mentioned disadvantages. It is not possible to transmit all types of data with the classic radar systems.

Satellite-aided location systems are widely used systems, which apply distance measurement according to the pulse transit time method for determining positions. These include, for example, the location system known by the name of Global Positioning System (GPS). The satellite-aided systems have a number of disadvantages. Set up and operation of the infrastructure is very complicated and expensive. Availability is greatly reduced by attenuation where there is restricted visual connection to the satellites (e.g. narrow gorges, woods) and no longer provided in shadow (e.g. in buildings). Moreover, only determining their own position is possible, but not determining the position of remote objects. In order to determine the distance from a remote object, an additional system is required to transmit messages, as this is not possible via the satellites. Only by a second position determination and exchange of the position data is measuring the distance possible. The accuracy is additionally not estimated to be sufficiently precise, since the errors of two position determinations may accumulate in the distance calculation (1-3 m with differential GPS). Furthermore, the equipment for determining position is distinguished by over-long measuring times of up to several minutes, making determining the distance of mobile objects too inaccurate or no longer possible. Transmission of all types of data, as already mentioned, is not possible via the satellite-aided systems. In addition, there is a dependency on the operator who may restrict the accuracy and reliability and charge fees for usage.

A further option for measuring distance is determining the position of mobile radio subscribers with the aid of mobile terminals, e.g. mobile telephones for operation according to the GSM standard. However, the attainable accuracy of determining position of at best 60 m is regarded as very disadvantageous. Here too there is dependency on the operator, who nearly always charges fees for usage.

Further known methods and systems which measure the round time of a sequence of radio pulses between two transmitter-receivers (active pulse radar) also have a number of disadvantages. In the known round time methods on the TOA principle (time of arrival), also called two-path method, there is a very great dependency of the accuracy of determining the position on the accuracy of the clock generators for measuring time. With simultaneous transmission of data, at purely the pulse transit in the medium, relatively long round time intervals arise conditional on the transmission time of the data frames. A typical ratio is 1:10,000. Very precise clock generators with an accuracy of more than ±1 ppm and therefore cost-intensive components are necessary to achieve high accuracy. If reasonably priced clock generators (±50 ppm) were to be used, only inadequate accuracy (c. 10 m) would be achievable.

Increasing accuracy is for this reason also achieved by shortened round time intervals. However, the result of this is that fewer to no additional data at all can be transmitted and special message protocols have to be used. Standardised message protocols cannot be used, which is a further considerable disadvantage of these methods in relation to recyclability or the capacity to extend standards.

The achievable accuracy with the known methods is, moreover, dependent on the smallest unit of the time measurement. Therefore, to increase accuracy, very small time units are used, making necessary the use of very fast clock generators and time counters (30 cm distance corresponds to 1 ns time unit or 1 GHz clock frequency). Time counters faster in this way are regarded as very disadvantageous, though, as this is accompanied by an increase in energy consumption and costs of implementation.

DISCLOSURE OF INVENTION

The object of the invention is to cite a method for determining distance which is distinguished within a transmission range in the order of magnitude of 10 km by increased accuracy of distance measuring compared with known methods and yet simultaneously enables the use of conventional crystal clock generators with an error of up to ±50 ppm.

A further object of the invention is to cite a method for determining distance which is distinguished within a transmission range in the order of magnitude of 10 km by increased accuracy of distance measurement compared with known methods and yet enables the use of clock generators with comparatively low frequencies in a range of approximately 100 MHz for measuring time in the subscribing transmitter-receivers.

A further object of the invention is to cite a method for determining distance which is distinguished within a transmission range in the order of magnitude of 10 km by increased accuracy of distance measuring compared to known methods and yet at the same time generates low energy consumption on the part of the participating transmitter-receivers.

A further object of the invention is to cite a method for determining distance which is distinguished within a transmission range in the order of magnitude of 10 km by increased accuracy of distance measurement compared with known methods and yet at the same time enables reasonably priced manufacture of the transmitter-receivers required for performing the method.

A further object of the invention is to cite a method for determining distance which can be used in conjunction with known, standardised message protocols such as Bluetooth, WLAN or ZigBee, without the security layer of these protocols (layer 2 according to the ISO/OSI reference model) having to be modified.

According to a first aspect of the invention a method for determining the spatial distance of two transmitter-receivers operating without wires from one another within a transmission range in the order of magnitude of 10 km is provided. With the method of the invention the two transmitter-receivers in each case set off at least one signal round, a signal round comprising the steps described below:

a) transmitting at least one request data frame, containing a sequence of at least two signal pulses with a predetermined pulse time interval, from a first transmitter-receiver setting off the signal round to a second transmitter-receiver at a request transmitting time, b) receiving the request data frame at the second transmitter-receiver at a request receiving time, c) transmitting a reply data frame, containing a sequence of at least two signal pulses, with a predetermined pulse time interval from the second transmitter-receiver to the first transmitter-receiver at a reply transmitting time, which has a respective reply time interval from the request receiving time, and detecting the respective reply time interval, d) receiving the reply data frame at the first transmitter-receiver setting off the signal round and detecting a reply receiving time allocated to the receipt of the reply data frame relative to the request transmitting time, The method according to the invention further comprises an evaluation with the steps:

e) ascertaining a round time interval between the respective request transmitting time and the respective reply receiving time for each signal round, this step being able to be performed at any time after the relevant signal round, f) ascertaining a signal transit time between the two transmitter-receivers using the ascertained round time intervals and the reply time intervals and g) ascertaining the spatial distance between the first and second transmitter-receivers by multiplying the signal transit time by a previously known propagation speed of the signal pulses.

With the method according to the invention the signal rounds are performed in such a way that the reply time intervals are either identical or have a difference, in the case of performing more than one signal round set off by each transmitter-receiver an average difference, the amount of which is a maximum of 200 microseconds.

The method according to the invention is distinguished on the one hand by its property as a symmetrical multi-path method. Here two symmetrical aspects cooperate advantageously in a previously unknown way. A first symmetrical aspect of the method according to the invention is the combination of a first signal round, in which the first transmitter-receiver is the start and destination point, with a second signal round, which has the second transmitter-receiver as start and destination point. The two transmitter-receivers may also in each case set off several signal rounds. The symmetrical multi-path method according to the invention makes determining distance considerably less sensitive to fluctuations in the ambient temperature and the supply voltage than conventional methods for determining distance. Furthermore, minimal deviations in the performance parameters of circuits used in participating transmitter-receivers (so-called specimen scattering) do not substantially impair the accuracy of determining distance.

The method according to the invention is furthermore distinguished by a second symmetrical aspect, in that the reply time intervals at the first transmitter-receiver and at the second transmitter-receiver are either identical or have a difference, the amount of which is a maximum of 200 μs. A reply time interval is the time difference between a receiving time of a request data frame and transmitting a reply data frame in reply to the request data frame received at a transmitter-receiver. The reply time interval is conditional on the processing time at the transmitter-receiver, possibly in association with checking the request data frame. Furthermore, the reply time interval is conditional on the length of a received request data frame and by protocol regulations, which may, for example, prescribe adhering to a minimum and a maximum reply time interval. Fluctuations in the reply time intervals are caused by circuit-conditional delays in the implementations of the transmitter-receivers.

Literally identical reply time intervals are technically almost impossible because the smallest deviations in the reply time intervals can always be traced with appropriate measuring accuracy. In the context of this application "identical" means the same values of the reply time intervals within the measuring accuracy appropriate to a respective specific implementation. It is possible, for example, for only a relatively low accuracy of location determination in the range of ±2 m to be required in an implementation of the method according to the invention. In such a case a lower accuracy of measuring accuracy is appropriate for comparing the reply time intervals than in the case of a required accuracy of ±50 cm. In the context of a reduced accuracy of this kind reply time intervals which show a minimal difference with a higher measuring accuracy may be considered identical. It should be noted that this explanation is intended to serve only to explain the term "identical". Comparison of reply time intervals is not required for performing the method according to the invention. Such a comparison may serve as evidence of use of the method according to the invention. It is also conceivable for such a comparison to be performed as part of an embodiment example.

The method according to the invention enables determining distance where there is a distance of 10 km with an error of only ±150 cm caused by crystal tolerances. Other error sources are not taken into account in this statement.

In a preferred embodiment example, in which the difference between the reply time intervals is a maximum of 20 microseconds, taking into account all the error sources which, besides the error caused by crystal tolerances, may impair the accuracy of the method of the invention, in practice in determining the distance of a distance of 10 km an accuracy of c.±100 cm, for a distance of 1 km as much as ±50 cm or more, can be achieved.

For the surprisingly high accuracy of the method according to the invention achieved compared to the simplicity of the technical means required, the combination of the feature of the signal rounds set off by the two transmitter-receivers with the feature of identical reply time intervals or such that occur only in the context of a difference of a maximum of 200 µs (in the preferred embodiment example a maximum of 20 microseconds) is of very great significance, not so far acknowledged by the professional world. As illustrated in greater detail below using error calculations and embodiment examples, by this feature the error of determining distance compared with conventional methods becomes insensitive to inaccuracies in the time measurement in the transmitter-receivers participating in the distance measuring. It is therefore possible to use relatively inaccurate clock generators for time measurement, without the accuracy of determining the distance being substantially reduced. For example, commercially available, very reasonably priced oscillating crystals with a clock accuracy of ±50 ppm and clock generators derived from crystal-controlled oscillator clocks with this accuracy are used, without appreciable deterioration of the accuracy occurring owing to their errors. Accuracy of determining distance previously not considered possible with such simple means is in this way achieved.

The method according to the invention enables determining the distance with said accuracy in a short time. Determining distance requires a time expenditure of only c. 2 ms.

The method according to the invention does not prescribe a fixed order between the first and the second signal round. With the method according to the invention the steps of ascertaining the respective round time interval (steps e) and f)) can be performed either immediately after completion of a respective signal round or there is a wait until both signal rounds have been completed before the evaluation in steps e) and f) is started.

The method according to the invention is suitable for simultaneous transmission of any desired data between mobile and stationary transmitter-receivers, in a data frame which as request data frame or reply data frame simultaneously contains the data for the distance measurement in the form of at least one signal pulse.

The method does not require any additional infrastructure. It can even be used in buildings. An estimated energy consumption of approximately 360 µJ per distance determination in the case of implementation in an integrated circuit demonstrates a further substantial advantage of the invention, since owing to this low energy consumption it is suitable for using battery-operated transmitter-receivers with a long service life.

The signal processing in the method according to the invention is particularly simple. Only basic arithmetic operations are enlisted for determining distance. Determining distance can therefore be carried out in a simple arithmetic unit or in a few clock cycles on a microprocessor. It is therefore also very fast and, in particular, available immediately after the signal rounds have been performed.

The method according to the invention is likewise suitable for highly precise and fast position determination, for speed measurement and for measuring acceleration, as explained in greater detail below.

The method according to the invention can be used in communication networks. Use of suitable message protocols allows a very high number of stations in a limited area, without endangering the reliability of the method according to the invention. The use of known message protocols enables the ability to perform distance determination ad-hoc, without prior negotiation of method parameters being necessary.

Regulations of known standardised message protocols, such as a check sum calculation and encryption, can further increase the reliability and security of the method according to the invention, as explained later below.

By a combination of several distance measurements according to the invention between more than two transmitter-receivers via one or more intermediate stations to remote stations the method according to the invention may also enable distance determination over larger distances with high precision.

The method according to the invention can be used anywhere where knowledge about a distance or a position or a change in position of people, animals or stationary and mobile objects is required. Use is possible, for example, in the fields of wireless data transmission networks, automation of buildings, industrial automation, material and goods logistics, vehicle and personal navigation or local or long-distance reconnaissance. Further examples of application will be mentioned as part of the description of preferred embodiment examples.

In the context of this application the term round time is also designated with the same meaning as the term round interval. Also, the term reply time is used with the same meaning as the term reply time interval. The important thing here is that these are not points of time but differences in time. The round time interval is the duration of a signal round, in other words the time interval (the time difference) between a request transmitting time and a reply receiving time within a signal round. The reply time interval is the time difference between a request receiving time and a reply transmitting time within a signal round.

Additional features of embodiment examples of the method according to the invention are described below. Embodiment examples of the method according to the invention are also cited in the claims. As long as nothing contradictory emerges directly and unambiguously from the description or the claims, the embodiment examples can also be implemented in combination with one another.

In a preferred embodiment example a signal round set off by the second transmitter-receiver is carried out in each case chronologically after a signal round performed by the first transmitter-receiver. The important thing is that the second transmitter-receiver sets off a signal round after it has sent the reply data frame to the first transmitter-receiver. Naturally, the designations "second" and "first" transmitter-receiver are interchangeable in this embodiment example. This method provides no or only a very slight time overlap of the signal rounds. A slight time overlap of the signal rounds can arise in that the second transmitter-receiver sets off a signal round by transmitting an appropriate second request data frame before the first transmitter-receiver has received the previously transmitted first reply data frame. Since a distance of 10 km corresponds to a signal transit time of 30 microseconds, no substantial acceleration of the method can be achieved by such an overlap, however.

The method of this embodiment example is also designated as a double-sided two-path method in the context of this application. If several signal rounds are carried out it is designated as a multiple-double-sided two-way method.

In an embodiment example alternative to this the signal rounds set off by the two transmitter-receivers are interconnected. The second transmitter-receiver, on transmitting, simultaneously sets off a signal round, the reply data frame allocated to a first signal round set off by the first transmitter-receiver simultaneously forming the reply data frame of a second signal round set off by the second transmitter-receiver. In this way, in this embodiment example step c) of a signal round set off by the first transmitter-receiver. simultaneously constitutes step a) of a signal round set off by the second transmitter-receiver. This procedure can be agreed as a standard feature, for example. It can also be made known by transmitting a special, combined request and reply data frame, which is appropriately interpreted and dealt with on the receiver side. A data frame of this kind is always designated in this application as a "combined request and reply data frame," in order to avoid confusion with the likewise used abbreviated written form "request and reply data frame," which is to be understood as "request data frame and reply data frame". For the sake of completeness it is noted that another abbreviated written form used here, "start or reply data frame," to be interpreted as "request data frame or reply data frame".

The present embodiment example has the advantage of particularly great economy of the method. The distance between the first and the second transmitter-receivers is passed through only three times, not four times. Fewer steps are required for determining the distance. This economical procedure is not associated with any losses in measuring accuracy. It is accompanied by reduced energy consumption, because fewer data frames have to be sent for this purpose.

In detail the two signal rounds of this embodiment example comprise the steps listed individually below.

The first signal round has the steps:

a1) transmitting at least one first request data frame, containing a sequence of at least two signal pulses with a predetermined pulse time interval, from a first transmitter-receiver setting off the signal round to a second transmitter-receiver at a first request transmitting time, b1) receiving the first request data frame at the second transmitter-receiver at a first request receiving time, c1/a2) transmitting a first reply data frame, containing a sequence of at least two signal pulses with a predetermined pulse time interval, from the second transmitter/receiver to the first transmitter-receiver at a first reply transmitting time, which has a respective reply time interval from the first request receiving, time and which simultaneously constitutes the second request transmitting time, d1/b2) receiving the first reply data frame at the first transmitter-receiver setting off the signal round and detecting a first reply receiving time allocated to the receipt of the first reply data frame relative to the first request transmitting time.

Steps c1) and d1) here simultaneously constitute the first two steps of the second signal round, which can therefore also at the same time be designated as steps a2) and b2). To complete the second signal round these are adjoined by the following steps:

c2) transmitting a second reply data frame, containing a sequence of at least two signal pulses with a predetermined pulse time interval, from the first transmitter-receiver to the second transmitter-receiver at a second reply transmitting time, which has a respective reply time interval from the first reply receiving time, d2) receiving the second reply data frame at the second transmitter-receiver setting off the signal round and detecting a second reply receiving time allocated to the receipt of the second reply data frame relative to the first reply transmitting time, which, as mentioned above, in this embodiment example simultaneously constitutes the second request transmitting time.

The present embodiment example is also designated in the context of this application as a symmetrical three-path method, or in abbreviated form three-path method. Further details of this embodiment example are likewise explained in connection with the detailed description of preferred embodiment examples. It can also be extended by continuing the signal rounds, enabling greater accuracy of distance determination.

If only one signal round set off by the first signal transmitter-receiver and one set off by the second transmitter-receiver is performed in each case, the signal transit time $T_{prop}$ between the first and second transmitter-receivers is determined according to the formula $$T_{prop} = \frac{T_{roundA1} - T_{replyB1} + T_{roundB2} - T_{replyA2}}{4} \quad \text{Formula 1}$$

This formula is used if the first and second signal rounds are performed separately or, as in the last described embodiment example, interconnected. It can therefore be applied equally to a double-sided two-path method and a three-path method.

In a further preferred embodiment example of the method according to the invention each transmitter-receiver sets off at least two signal rounds, until the distance between the first and second transmitter-receivers has been passed through by a number of request and reply data frames which is at least eight and a multiple of four. This means that at least four and multiples of two request data frames and at least four and multiples of two reply data frames are transmitted. In this embodiment example each transmitter-receiver can set off 2, 3, 4, ..., n signal rounds. Accordingly, 4 request and 4 reply, 6 request and 6 reply, 8 request and 8 reply, 10 request and 10 reply frames, etc. are thus possible. The sum of all the frames is always a multiple of 4. In this embodiment example additional round time intervals $T_{roundAi}$ with i=3, 5, 7, ..., (n−2) from $T_{roundA3}$ to $T_{roundA(n-2)}$ to the signal rounds set off by the first transmitter-receiver, are ascertained, n>3 being an uneven number, and additional round time intervals $T_{roundBk}$ with k=4, 6, 8, ..., (n−1) from $T_{Tround4}$ to $T_{roundB(n-1)}$ to the signal rounds set off by the second transmitter-receiver are ascertained, wherein reply time intervals $T_{replyAk}$, k=2, 4, 6, 8, ..., (n−1) from $T_{replyA2}$ to $T_{replyA(n-1)}$, and $T_{replyBi}$, i=1, 3, 5, 7, ..., (n−2). from $T_{replyB1}$ to $T_{replyB(n-2)}$ occur, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}} \quad \text{Formula 2}$$

the amount of which is a maximum of 200, but preferably a maximum of only 20 microseconds. This formula images the simple difference between the reply time intervals in the event of only one signal round set off by each transmitter-receiver in each case on to the case of a multiplicity of signal rounds.

In this embodiment example not just one, but several signal rounds are set off by both transmitter-receivers. This is therefore the variant of a multiply double-sided two-path method already mentioned above. The signal rounds are therefore not performed interconnected, but independently of one another. The signal transit time between the first and the second transmitter-receivers in this embodiment example can therefore be determined using the multiplicity of ascertained round time intervals and the detected reply time intervals with increased accuracy, thus increasing the precision of determining distance. Details of the calculation of the signal transit time are explained below as part of the detailed description of preferred embodiment examples.

In the present embodiment example the requirement according to the invention for a difference in the reply time intervals of a maximum of 200 (preferably 20) microseconds is replaced by the requirement that an average difference according to the above formula has an amount which is a maximum of 200 (preferably 20) microseconds. This condition is equivalent to the maximum difference of 200 (preferably 20) microseconds required in the case of a single performance in each case of the first and second signal rounds. In a variant of the method both conditions are met simultaneously.

It should be noted that in the present embodiment example in the multiplicity of pairs of signal rounds reply time intervals may occur in a pair, the difference between which has an amount of more than 200 or, in the preferred embodiment example, more than 20 microseconds. However, this is balanced out by a smaller difference between other reply time intervals in other pairs of signal rounds and therefore constitutes an exception. The important thing for the accuracy of the distance determination in the present case is the average time difference between the reply time intervals.

With interconnected performance of the signal rounds in the context of an embodiment example constituting a symmetrical n-path method, the signal rounds can also be carried out multiply to increase the precision of distance determination. In this embodiment example each transmitter-receiver sets off at least two signal rounds, until the distance between the first and second transmitter-receivers has been passed through by an uneven number n>3 of request and reply data frames) (in other words an uneven number n>3 of the sum of all the frames transmitted), all the additional round time intervals being ascertained and all the additional reply time intervals being detected, after repeated performance of the first signal round step sequence additional round time intervals $T_{roundAi}$ with i=3, 5, 7, ..., (n−2), from $T_{roundA3}$ to $T_{roundA(n-2)}$ are ascertained and after repeated performance of the second signal round step sequence additional round time intervals $T_{roundBk}$, with k=4, 6, 8, ..., (n−1), from $T_{roundB4}$ to $T_{roundB(n-1)}$ are ascertained, wherein reply time intervals $T_{replyAk}$, k=2, 4, 6, 8, ..., (n−1) from $T_{replyA2}$ to $T_{replyA(n-1)}$, $T_{replyBi}$, i=1, 3, 5, 7, ..., (n−2) from $T_{replyB1}$ to $T_{replyg(n-2)}$ occur, which have an average difference according to the formula $$\Delta T_{replyAVG} = \frac{T_{replyA2} - T_{replyB1} + \ldots + T_{replyA(n-1)} - T_{replyB(n-2)}}{\frac{n-1}{2}} \quad \text{Formula 3}$$

the amount of which is a maximum of 200, preferably a maximum of 20 microseconds. This embodiment example, as already described in the case of multiple separate performance of pairs of signal rounds in the context of the multiply double-sided two-path method, enables more precise distance determination and is likewise described in greater detail below in the context of the detailed description of preferred embodiment examples. The request data frames are also at the same time reply data frames (overlapping), so in this embodiment example an uneven number of frames is always transmitted.

In the embodiment examples mentioned, which provide for multiple performance of the first and second signal round, the signal transit time T prop is ascertained according to the formula $$T_{prop} = \frac{T_{roundA1} - T_{replyB1} + T_{roundB2} - T_{replyA2} + \ldots + T_{roundA(n-2)} - T_{replyB(n-2)} + T_{roundB(n-1)} - T_{replyA(n-1)}}{2(n-1)} \quad \text{Formula 4}$$

$$n = 2k + 1, k \in N > 1$$

In a further embodiment example the signal rounds are carried out with a time overlap, the request and reply data frames of a signal round set off by the first transmitter-receiver being transmitted on a different transmission channel from the request and reply data frames of a signal round set off by the second transmitter-receiver. This means that the method according to the invention can be performed more quickly.

Various embodiment examples of the method according to the invention relate to variants of the evaluation in the context of ascertaining distance. The variants described below can be combined in each case with all the above-described embodiment examples. In a first variant only the first, in a second variant only the second transmitter-receiver ascertains the spatial distance. The other transmitter-receiver in each case communicates in advance the round time interval ascertained on its part and the reply time interval that occurred there. In a third variant both transmitter-receivers ascertain the spatial distance and transmit to one another in advance the round time intervals previously ascertained and the reply time intervals that have occurred in each case.

In a fourth variant a third transmitter-receiver ascertains the spatial distance between the first and second transmitter-receivers and the first and second transmitter-receivers transmit the ascertained round time intervals and reply time intervals alternatively or additionally in advance to the third transmitter-receiver. This does not necessarily have to be a targeted transmission to the third transmitter-receiver. This variant may also be performed in such a way that the third transmitter-receiver "listens in" to the communication of the round and reply time intervals between the first and second transmitter-receivers, it therefore being informed of the round and reply time intervals of both transmitter-receivers.

It is also conceivable for only the transmitting and receiving times to be transmitted between said transmitter-receivers and for the round and reply times then to be ascertained.

In a further embodiment example the communicated request and reply data frames contain more than two signal pulses and the receiving times of more than two signal pulses of a respective request or reply data frame are ascertained on the part of a respective receiver.

Detection of the receiving and transmitting times of the individual data frames uses a uniform reference time in the data frame, in relation to which times are determined. For example, the first signal pulse, in another example the last signal pulse, in a further example any other signal pulse, within each data frame is agreed or established as a reference point. The number of signal pulses of the individual data frames can in this case always differ, as long as the reference time exists in all the data frames.

In a further embodiment example the respective transmitter of a request or reply data frame transmits signal pulses of the data frame at transmitting times which are delayed relative to a time grid, defined by the pulse time interval predetermined on the transmitter side in the data frame to be transmitted, in such a way that on average the signal pulses are transmitted at the grid times preset by the time grid. A procedure of this kind is also designated below as dithering. This can further increase the accuracy of determining distance, as explained in detail below.

Dithering can alternatively or, particularly preferably, additionally be used on the part of a respective receiver to increase the precision of determining distance. The receiver of a request or reply data frame in this case delays signal pulses of the received data frame relative to a time grid, defined by the pulse time interval of the received signal pulses, in such a way that the delayed signal pulses are on average received with the pulse time interval predetermined on the transmitter side.

In this case scattering of the time delay of a signal pulse of the data frame on the part of the respective transmitter or the respective receiver is greater than the accuracy of a time measurement on the part of the receiver. In the case of dithering generated by both the respective transmitter and by the respective receiver the scattering of the sum of the time delays of a signal pulse on the part of the respective transmitter and the respective receiver is greater than the accuracy of a time measurement on the part of the receiver.

If dithering is used on the part of the transmitter, the receiving times of a plurality of signal pulses contained in a received request or reply data frame relative to a time grid, defined by the pulse time interval of the received signal pulses and an agreed reference point in the request or reply data frame are preferably detected and stored at the respective receiver of a data frame.

After detecting the receiving times, the transmitter-receiver receiving in each case determines an average receiving time in relation to the time grid.

In a further embodiment example of the invention, during determining of a receiving time of a signal pulse the respective receiver ascertains the time at which a detected signal pulse has a maximum signal amplification or a maximum value of a correlation with a predetermined signal pattern.

In this case, the respective receiver restarts a clock generator or oscillator it uses to determine transmitting and receiving times after determining a receiving time of a data frame and before subsequent determining of a receiving time of a next data frame and before subsequent determination of a receiving time of a next data frame.

Alternatively, during receipt of a data frame the respective receiver modulates the frequency of a clock generator or oscillator it uses to determine transmitting and receiving times of the signal pulses according to a pseudo-random sequence.

In a further embodiment example errors produced by multi-path propagation of the signal pulses are reduced in that, if there is a pulse sequence in the receiving signal traceable to multi-path propagation of a single signal pulse, the receiver ascertains as receiving time of the signal pulse the earliest time within a predetermined window of time at which the receiving signal adopts a maximum value.

In a further embodiment example the first and second transmitter-receivers agree the values of the reply time intervals before transmitting a request data frame.

In order to make the distance determination inaccessible to third persons in multiple performance of distance determination, the first and second transmitter-receivers agree a sequence of different values of reply time intervals before transmitting a request data frame of the first performance and in subsequent performances in each case adhere to the next preset reply time interval in the sequence. The first and second transmitter-receivers preferably vary the reply time interval as a function of an unknown pseudo-random sequence of numbers.

A further increase in secrecy is achieved if the first and second transmitter-receivers transmit to one another secretly encrypted messages during agreement of the reply time intervals or the sequence of reply time intervals.

The first and second transmitter-receivers preferably measure the reply time interval they use in each case. The measured reply time intervals are enlisted for determining the distance. This ensures the accuracy of the method of the invention.

In a further preferred embodiment example of the method according to the invention the signal pulses used for determining the distance are simultaneously used as information symbols.

Furthermore, embedding of the method according to the invention in known transmission protocols of layer 2 of the OSI reference model is particularly preferred. An internationally standardised transmission protocol which is in widespread use is preferably used for this.

In a further particularly preferred embodiment example the signal pulses are formed by chirp pulses. Chirp pulses with a rising or falling frequency response are used for this. To further increase the accuracy of determining distance it is advantageous to use two complementary types of chirp pulses, which have an identical middle frequency and pulse duration, but a contra-directional frequency response, symmetrical about the middle frequency, in the case of one chirp pulse type rising and in the case of the other chirp pulse type falling, during the duration of the pulse, the same number of complementary chirp pulse types being used in a request or reply data frame to determine the distance in each case. The requirement of symmetry about the middle frequency relates here to the complementary chirp pulse types in comparison, not to the individual chirp pulse type.

In a further embodiment example a calibration run is performed, in that, before a first signal round in the context of determining the distance from the other transmitter-receiver in each case, the first or the second or both transmitter-receivers perform at least one signal round in each case to determine the distance of one or one each of the calibrating transmitter-receivers, arranged at a previously known distance from the respective transmitter-receiver, which additionally uses a reply time interval known or to be communicated to the respective transmitter-receiver in each case. Determining the distance from the calibrating transmitter-receiver follows the method according to the invention. In this embodiment example the thus ascertained and the previously known spatial distance from the calibrating transmitter-receiver are compared. The result of the comparison is used as part of the following distance determination to correct errors.

In this embodiment example either a current temperature at the site of a respective transmitter-receiver or a current supply voltage of a respective transmitter-receiver or both the temperature and the supply voltage are preferably ascertained before distance determination is performed or at a time interval in the order of magnitude of one second before or afterwards.

The first or the second or both transmitter-receivers store the result of the comparison before or during performance of the calibration to ascertain characteristic error data for the respective transmitter-receiver either as a function of the temperature at the site of a respective transmitter-receiver or as a function of the current supply voltage of a respective transmitter-receiver or as a function of both said parameters. Furthermore, the ascertained error data are enlisted to determine an individual temperature- and supply-voltage-dependent error correction function or an appropriate error correction table for the respective transmitter-receiver, which are stored in the respective transmitter-receiver. Finally, distance values ascertained as part of a subsequent distance determination are corrected by applying the error correction function or by enlisting a correction value contained in the error table. If the distance is calculated on the part of a single transmitter-receiver only the correction value must be transmitted in addition to the signal round and reply time intervals. Alternatively the signal round and reply time intervals can already be corrected before communication.

The method according to the invention can also be used in further embodiment examples for measuring speed and acceleration. For determining speed, the distance determination is preferably repeated after a predeterminable or dynamically changeable measuring time interval. Dynamic changeability of the measuring time interval here means that the measuring time interval can be changed during performance of the speed measurement. In this way the frequency of the distance measurements can be increased with frequently changing speed in order to determine more accurate progression of the speed of the two transmitter-receivers relative to one another. Determining a speed value is done by forming a difference in distance of distance values ascertained in succession between the first and second transmitter-receivers and subsequent formation of a quotient of the difference in distance and the measuring time interval the speed of the transmitter-receivers is ascertained relative to one another.

In an acceleration measurement with a predeterminable or dynamically changeable speed measuring time interval two speed values are ascertained.

The acceleration of the transmitter-receivers relative to one another is ascertained by forming a speed difference between speed values ascertained in succession and subsequent formation of the quotient of the difference in speed and the measuring time interval.

In a further embodiment example the number of signal rounds set off by each transmitter-receiver is chosen as a function of a predetermined accuracy of the distance determination.

In a further embodiment example the number of signal rounds is chosen as an additional function of a predetermined upper limit of the time duration of performing the distance determination.

According to a second aspect of the invention a method for determining the position of a first transmitter-receiver relative to at least one second transmitter-receiver within a distance range in the order of magnitude of 10 km is provided as a further development of the distance determination according to the invention, in which to determine the distance between the first and the second or every other transmitter-receiver a method according to one of the preceding embodiments is used.

The advantages of the position determining method according to the invention emerge from those of the distance determination method of the first aspect of the invention. Embodiment examples of the position determining method have the additional features of the embodiment examples of the distance determining method according to the invention described in this application either individually or in combination.

Determining the positions of a transmitter-receiver is done on the basis of the distance determination, as quite normal in methods for determining position, by tri- or multi-lateration with transmitter-receivers of known positions.

Owing to influences of temperature, supply voltage and specimen scattering and also multi-path propagation, errors in the pulse transit times may arise which would result in an ambiguous result of the position during lateration. The distance determining method according to the invention can reduce these errors. By using additional, redundant transmitter-receivers with a known position and other known methods for improving the accuracy of determining position, more precise position coordinates can be ascertained.

Errors arising from uneven distribution of the propagation properties of the medium (inhomogeneous multi-path propagation) can also be compensated, since the distance measuring values become conspicuous during position determination and can be taken into account with appropriate weighting. The thus improved precision of the position coordinates of transmitter-receivers can then in turn be used for improved calculation of the distance between two transmitter-receivers.

According to a third aspect of the invention a transmitter-receiver is cited for wireless communication to determine the spatial distance from a second transmitter-receiver within a distance range in the order of magnitude of 10 km with the method according to the first aspect of the invention.

The transmitter-receiver has a transmitting unit which is designed to set off a first signal round by transmitting a first request data frame, containing a sequence of at least two signal pulses with a predetermined pulse time interval, to a second transmitter-receiver at a first request transmitting time.

Furthermore, the transmitter-receiver according to the invention has a receiving unit which is designed to monitor the receipt of a first reply data frame sent in reply to the first request data frame from the second transmitter-receiver and to detect a first reply receiving time allocated to the receipt of the first reply data frame relative to the first request transmitting time.

According to the invention the transmitting unit is additionally designed,
  after receipt of a second request data frame setting off a second signal round from the second transmitter-receiver, to transmit a second reply data frame, containing a sequence of at least two signal pulses with a predetermined pulse time interval, with a reply time interval from an allocated second request receiving time of the second request data frame to the second transmitter-receiver,
  after receipt of a first request data frame setting off a first signal round from a second transmitter-receiver to transmit a first reply data frame, containing a sequence of at least two signal pulses with a predetermined pulse time interval, with a reply time interval relative to an allocated first request receiving time of the first request data frame to the second transmitter-receiver, and
  on receipt of the first request data frame from the second transmitter-receiver, to set off a second signal round by transmitting a second request data frame, containing a sequence of at least two signal pulses with a predetermined pulse time interval, to the second transmitter-receiver at a second request transmitting time.

The receiving unit is additionally designed according to the invention to monitor the receipt of a second reply data frame sent by the second transmitter-receiver in reply to the second request data frame and to detect a second reply receiving time allocated to the receipt of the second reply data frame relative to the second request transmitting time.

The transmitter-receiver according to the invention is finally designed to transmit the first and second reply data frames with a predetermined value of the reply time interval relative to the respective request receiving time with a time precision in which the reply time intervals on the part of the first and second transmitter-receivers in the signal rounds performed for determining distance are either identical or have a difference, in the case of performing more than one signal round set off by each transmitter-receiver an average difference, the amount of which is a maximum of 200, in a preferred embodiment example a maximum of 20, microseconds.

Adhering to the described precision of the predetermined reply time interval does not require any new construction of clock generators or oscillators to generate the reply time interval. On the contrary, commercially available, very reasonably priced oscillating crystals with a clock accuracy of ±50 ppm or ±20 ppm or clock generators derived from crystal-controlled oscillator clocks are used, for example, without any appreciable deterioration in the accuracy occurring owing to their errors. An accuracy of distance determination not so far considered possible with such simple means is therefore achieved. Adhering to the described precision requires, however, that two transmitter-receivers according to the present invention be used for determining distance.

The method according to the invention is based on compensation of errors caused by oscillating crystals by symmetrical distance measuring occasioned by both participating transmitter-receivers. In a variant of the method according to the invention, which in particular reduces the energy and channel bandwidth required for measuring distance, the method according to the invention is performed before determination of the distance comprising only a single signal round. In this method a clock generator error of both transmitter-receivers is additionally ascertained. The round measurements, of the method according to the invention can be enlisted to ascertain the clock generator error. For subsequent distance determination relating to at least one of the two transmitter-receivers of the previous distance measurement, differing from the procedure according to the invention, only a single signal round is set off. An evaluation step to determine the distance based on this single signal round is then performed. In the evaluation step of this subsequent distance determination, corruption on the basis of the single signal round of a provisionally ascertained distance value on the basis of the previously ascertained clock generator error of the relevant transmitter-receiver is worked out for ultimate ascertainment of the distance value. A clock drift can therefore be eliminated with the previously calculated and stored value. This makes it possible, in a series of distance determinations, for not all the distance determinations by both transmitter-receivers to have to contain signal rounds set off by round measurements, also entailing, in addition to energy saving, a saving of channel bandwidth used.

This embodiment example does have lower accuracy than continuous repetition of the method according to the invention. However, this reduced accuracy may be adequate in many applications. The method requires setting up and looking after a database of crystal or clock generator errors in one of the transmitter-receiver stations (for example a central ranging station). Applications with many network nodes and high network utilisation in which the bandwidth used and the life of the battery is of importance, will very often contain a central or coordinating unit which will take on the function of the ranging station. This ranging station will also normally contain the application with a database of necessary information, for example an application for tracking transmitter-receivers: Stations of this kind are not under cost pressure to the same extent as mobile devices.

Since crystal errors may change owing to temperature variations, the coordinating ranging station preferably performs regular updating of the database with crystal errors. Alternatively updating of this kind may also be occasioned by changes in temperature measured in a mobile device. However, it is necessary to take into account that the changes in temperature typically take place only slowly and it is unlikely that the entire temperature range of −40° C. to 85° C. relevant to oscillating crystals will be passed through within a short time. Therefore crystal error measurements with the method according to the invention have to be performed only relatively rarely and the error values stored in the database are usually valid for a fairly long time.

The protocol for performing ranging together with other functions, such as security functions, for example, is typically established at a fairly high protocol layer. This benefits smooth cooperation between the ranging functionality and an application, such as the tracking application, for example, in looking after the database.

Embodiment examples of the transmitter-receiver according to the invention are described below. It should be noted that embodiment examples of the transmitter-receiver are also mentioned in the claims. Furthermore, further embodiment examples of the transmitter-receiver emerge from implementing the additional features of the above-described embodiment examples of the method according to the invention for determining distance and of the method according to the invention for determining position. Converting the method features described there into electronic circuits can be done by means of known methods of hardware or software design. It should further be noted that the embodiment examples described here can be implemented both individually and in combination with one another, as long as there is nothing to contradict this in the description or the claims.

In a preferred embodiment example the transmitter-receiver has an evaluation unit which is connected to the transmitting and receiving units and is designed to ascertain a round time interval between the request transmitting time of a first or second request data frame transmitted by the transmitting unit and the reply receiving time of a first or second reply data frame received from the second transmitter-receiver.

In this embodiment example the evaluation unit preferably has a data connection to the second transmitter-receiver and is additionally designed to transmit a detected reply time interval and an ascertained round time interval to the second transmitter-receiver via the transmitting unit or to receive a detected reply time interval and an ascertained round time interval on the part of the second transmitter-receiver via the receiving unit and to ascertain a signal transit time $T_{prop}$ between the first and the second transmitter-receivers using the round time interval(s) ascertained and the reply time intervals and to determine the spatial distance between the first and second transmitter-receivers by multiplying the signal transit time $T_{prop}$ by a previously known propagation speed of the signal pulses.

In a further embodiment example of the transmitter-receiver according to the invention the transmitting unit is designed to transmit the second request data frame for setting off the second signal round to the second transmitter-receiver after the first reply data frame.

In another embodiment example the transmitting unit is designed to transmit a combined request and reply data frame to the second transmitter-receiver at the second request transmitting time with the predetermined reply time interval relative to an allocated receiving time of the first request data frame, which unites in a single data frame both the function of a first reply data frame and the function of a second request data frame, and [in which] the receiving unit is designed to monitor the receipt of a second reply data frame sent by the second transmitter-receiver in reply to the combined request and reply data frame and to detect a second reply receiving time allocated to the receipt of the second reply data frame relative to the second request transmitting time.

In a further embodiment example the transmitting unit is designed to transmit request data frames and reply data frames with more than two signal pulses in each case and [in which] the receiving unit is designed to detect the receiving times of more than two signal pulses of a respective request or reply data frame.

In this embodiment example the transmitting unit is preferably designed to transmit signal pulses of a data frame at transmitting times which are delayed relative to a time grid, defined in the data frame to be transmitted by the pulse time interval predetermined on the transmitter side, in such a way that the signal pulses are transmitted on average at the grid times preset by the time grid.

The receiving unit is here preferably designed to delay signal pulses of a received data frame relative to a time grid, defined by the pulse time interval of the received signal pulses, in such a way that, the delayed signal pulses are received on average with the pulse time interval predetermined on the transmitter side. The receiving unit is preferably designed to ascertain an average receiving time in relation to the time grid after detection of the receiving times of the signal pulses.

In an embodiment example with particularly precise determination of receiving times the receiving unit is designed to ascertain the time and to detect it as the receiving time of a signal pulse, at which a detected signal pulse has a maximum signal amplification or a maximum value of a correlation with a predetermined signal pattern.

In a further embodiment example the receiving unit is designed to restart a clock generator or oscillator used to determine transmitting and receiving times, after determination of a request or reply receiving time of a request or reply data frame and before subsequent determination of a request or reply receiving time of a next request or reply data frame.

The receiving unit is preferably designed to check a receiving signal for the presence of a pulse sequence traceable to a multi-path propagation of a single signal pulse and if such a pulse sequence is present to ascertain as receiving time of the signal pulse the earliest time within a predetermined window of time in which the receiving signal adopts a maximum value.

In another embodiment example the transmitter-receiver is designed to agree the values of the reply time intervals with the second transmitter-receiver before transmitting a request data frame.

A particularly preferred embodiment example of the transmitter-receiver according to the invention is designed to measure the reply time interval.

A further embodiment example of the transmitter-receiver according to the invention is designed to agree a sequence of different values of reply time intervals with the second transmitter-receiver and to adhere to the next reply time interval preset in the sequence in each case during performance of each subsequent distance determination.

Particularly preferred is a transmitter-receiver in which the transmitting unit is designed to use the signal pulses used for determining distance simultaneously as information symbols.

Furthermore, the transmitting unit is particularly preferably designed to transmit generated signal pulses in the form of chirp pulses and the receiving unit is designed to reconstruct signal pulses generated on the transmitter side from received chirp pulses.

It is advantageous in this case if the transmitting unit is designed to transmit two complementary types of chirp pulses, which have an identical middle frequency and pulse duration, but a contra-directional frequency response, symmetrical about the middle frequency, in the case of one chirp pulse type rising and in the case of the other chirp pulse type falling, during duration of the pulse, the same number of complementary chirp pulses being used in a request or reply data frame for determining distance in each case.

A preferred embodiment example of a transmitter-receiver with an evaluation unit is designed to repeat the distance determination after a predeterminable or dynamically changeable measuring time interval and [in which] the evaluation unit is designed, by forming a difference in distance of distance values ascertained in succession between the first and second transmitter-receivers and subsequent formation of a quotient of the difference between the distance and the measuring time interval, to ascertain the speed of the transmitter-receivers relative to one another.

For measuring acceleration a further embodiment example of the transmitter-receiver according to the invention is designed to ascertain two speed values with a predeterminable or dynamically changeable speed measuring time interval and [in which] the evaluation unit is designed to ascertain the acceleration of the transmitter-receivers relative to one another by forming a difference in speed of speed values ascertained in succession and subsequent formation of the quotient of the difference in speed and the measuring time interval.

According to a fourth aspect of the invention an arrangement for determining the spatial distance between a first transmitter-receiver according to the invention and a second transmitter-receiver according to the invention within a distance range in the order of magnitude of 10 km is provided.

The advantages of the arrangement according to the invention emerge from the above-described advantages of the method according to the invention. Embodiment examples of the arrangement according to the invention correspond to the embodiment examples of the transmitter-receiver according to the invention, unless they have been described in greater detail below and in the claims.

The additional features of further embodiment examples of the arrangement according to the invention are described below.

In a preferred embodiment example of the arrangement according to the invention both transmitter-receivers have an evaluation unit which is connected to the respective transmitting unit and the respective receiving unit of the transmitter-receivers and is designed to ascertain a round time interval between the transmitting time of a first or a second request data frame transmitted by the transmitting unit and the receiving time of a first or second reply frame received by the second transmitter-receiver.

A further embodiment example of the arrangement according to the invention has a third transmitter-receiver which has a distance determining unit with a data connection to the first and the second transmitter-receivers. The third transmitter-receiver is designed to ? a data connection to the first and second transmitter-receivers to transmit round time intervals and reply time intervals to the third transmitter-receiver. Moreover, the distance determining unit is designed to ascertain a signal transit time between the first and the second transmitter-receivers using the round time interval(s) ascertained and the reply time intervals and to calculate the spatial distance between the first and second transmitter-receivers by multiplying the signal transit time $T_{prop}$ by a previously known propagation speed of the signal pulses.

In a further embodiment example of the arrangement according to the invention the first and second transmitter-receivers are designed to perform the first and second signal rounds at least twice, until the distance between the first and second transmitter-receivers has been passed through by a number of request and reply data frames which is a multiple of four and to ascertain all the additional round intervals and to detect reply time intervals, the first and second transmitter-receivers being designed to use reply time intervals $T_{replyAk}$, k=2, 4, 6, 8, ..., (n−1) from $T_{replyA2}$ to $T_{replyA(n-1)}$, and $T_{replyBi}$, =1, 3, 5, 7, ..., (n−2) from $T_{replyBi}$ to $T_{replyB(n-2)}$, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

the amount of which is a maximum of 200, preferably a maximum of 20 microseconds. The evaluation unit of the first transmitter-receiver is designed in this case, after repeated performance of the first signal round step sequence, to ascertain additional round time intervals $T_{roundAi}$ with i=3, 5, 7, ..., (n−2) from $T_{roundA3}$ to $T_{roundp(n-2)}$, n being an uneven number.

In this embodiment example the evaluation unit of the second transmitter-receiver is furthermore designed, after repeated performance of the second signal round step sequence, to ascertain additional round time intervals $T_{roundBk}$ with k=4, 6, 8, ..., (n−1) from $T_{roundB4}$ to $T_{roundB(n-1)}$.

In a further embodiment example of the arrangement according to the invention, in which the transmitter-receivers are designed to perform a symmetrical three-path method, each transmitter-receiver is preferably designed to set off at least two signal rounds, until the distance between the first and second transmitter-receivers has been passed through by an uneven number n>3 of request and reply data frames and to ascertain all the additional round intervals and to detect reply time intervals.

In this arrangement after repeated performance of the first signal round step sequence, additional round time intervals $T_{roundAi}$ with i=3, 5, 7, ..., (n−2), from $T_{roundA3}$ to $T_{roundA(n-2)}$ are ascertained and after repeated performance of the second signal round step sequence additional round time intervals $T_{roundBk}$, with k=4, 6, 8, ..., (n−1), from $T_{roundB4}$ to $T_{roundB(n-1)}$ are ascertained wherein reply time intervals $T_{replyAk}$, k=2, 4, 6, 8, ..., (n−1) from $T_{replyA2}$ to $T_{replyA(n-1)}$, $T_{replyBi}$, i=1, 3, 5, 7, ..., (n−2) from $T_{replyB1}$ to $T_{replyB(n-2)}$ occur which have average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

the amount of which is a maximum of 200, preferably a maximum of 20 microseconds.

In a further embodiment example of the arrangement according to the invention an additional calibrating transmitter-receiver with an evaluation unit is provided, which is arranged at a previously known distance from the first or second transmitter-receiver and which uses a reply time interval which is known or to be communicated [to the transmitter-receiver] in each case.

In this embodiment example the first or the second or both transmitter-receivers are designed to perform at least one pair of signal rounds to determine the distance from the calibrating transmitter-receiver before a first signal round in the context of determining the distance from the other transmitter-receiver in each case.

Furthermore the first or second transmitter-receiver is designed to compare the thus ascertained and the previously known spatial distance from the calibrating transmitter-receiver and to use the result of the comparison for error correction as part of the subsequent distance determination.

In a preferred embodiment example of the arrangement according to the invention the first or second transmitter-receiver or both transmitter-receivers are designed to measure either a current temperature at the site of a respective transmitter-receiver or a current supply voltage of a respective transmitter-receiver or both the current temperature and the current supply voltage during performance of distance determination or at a time interval in the order of magnitude of one second before or afterwards.

The negative influences of the ambient temperature or manufacturing tolerances can be avoided by using components which are not sensitive to temperature, used in particular for detecting the pulses in the receiver.

In practice, mechanical surface wave filters which have a strong temperature dependency are often used to compress a pulse. Specimen-dependent properties which are conditional on the mechanical tolerances of manufacture and produce different chronological behaviour additionally exist in these components. The time errors would lead to great inaccuracies in distance measurement.

The working principle of these analogue components is therefore preferably realised in the transmitter-receiver according to the invention in digital electronic circuits, which have considerably less dependency on temperature and manufacturing tolerances. For example, the compression of a chirp pulse used to transmit information symbols can be realised in the receiver by a digital correlator as electronic circuit.

In one embodiment example of an arrangement according to the invention for determining the spatial distance between a first transmitter-receiver and a second transmitter-receiver according to the invention a database unit is provided in one of the transmitter-receivers, which is designed to ascertain and store clock generator errors of transmitter-receivers using a previously performed distance determination. The first and second transmitter-receivers are designed, after ascertainment of their clock generator errors, to perform the following distance determinations, differing from the procedure according to the invention with only a single signal round and with one evaluation step. The evaluation unit of the transmitter-receivers is designed in the evaluation step to work out a corruption of a distance value provisionally ascertained after the single signal round by accessing the clock generator error of the participating transmitter-receiver previously stored in the database unit for ultimate ascertaining of the distance value. With this arrangement the previously explained procedure, in which the method according to the invention is performed at regular intervals, is implemented and in the meantime a simpler method of determining distance with just a single signal round is performed.

SHORT DESCRIPTION OF THE FIGURES

DESCRIPTION OF PREFERRED EMBODIMENTS

A number of preferred embodiment examples is described in greater detail below in relation to the figures mentioned.

1. Three Path Method for Determining Distance

A 3-path method for determining the distance between two transmitter-receivers is described below as first embodiment example of the invention using FIGS. 1 and 2. In this embodiment example the above-described first and second signal rounds are interconnected. The chronological sequence of the signal rounds is described first. Then the accuracy of the distance measurement according to this embodiment example is examined in detail.

1.1 Signal Rounds in the Three Path Method

Figure 1:
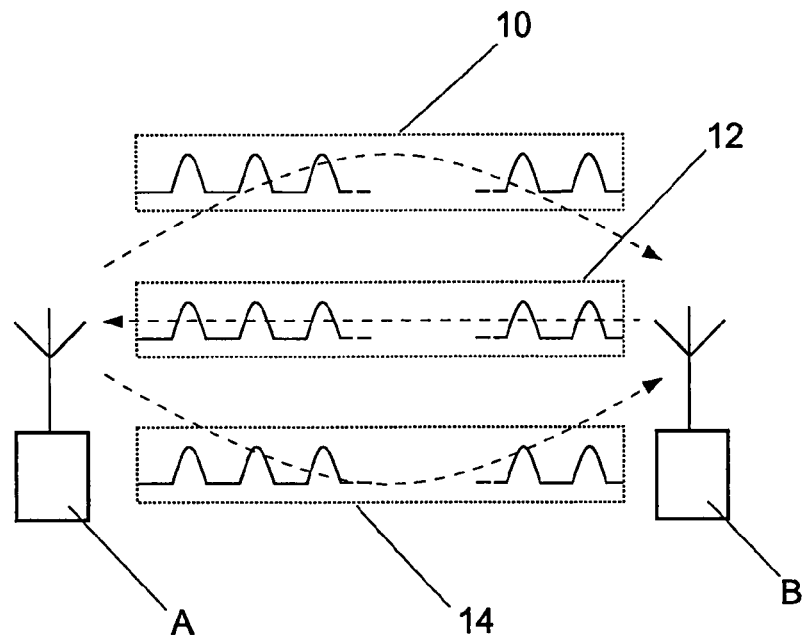
FIG. 1 shows a schematic illustration of an embodiment example of the method according to the invention in the form of a 3-path method.

FIG. 1 shows a schematic illustration of the 3-path method for determining the distance between a first transmitter-receiver A and a second transmitter-receiver B. The designation 3-path method has been chosen because overall three data frames are transmitted as part of the distance determination.

Transmitter-receiver A transmits a first data frame 10 to the second transmitter-receiver B. The data frame 10 consists of a sequence of signal pulses with known frequency of the signal pulses.

The data frame 10 is received and checked by transmitter-receiver B and if the check is successful answered by transmitting a second data frame 12 to the first transmitter-receiver A. The set up of the second data frame corresponds to that of the first data frame. This does not mean that data frames 10 and 12 have to be identical. They have a sequence of signal pulses with a known pulse frequency simply for the purposes of determining distance. It is possible in each case to transmit further different messages with the data frames.

The first transmitter-receiver A checks the received second data frame 12 and after successful checking transmits a third data frame 14 to the second transmitter-receiver B. The distance between the two transmitter/receivers can be ascertained using the time course of these three transmission steps between the first and second transmitter-receivers, as explained below in greater detail using FIG. 2.

Figure 2:
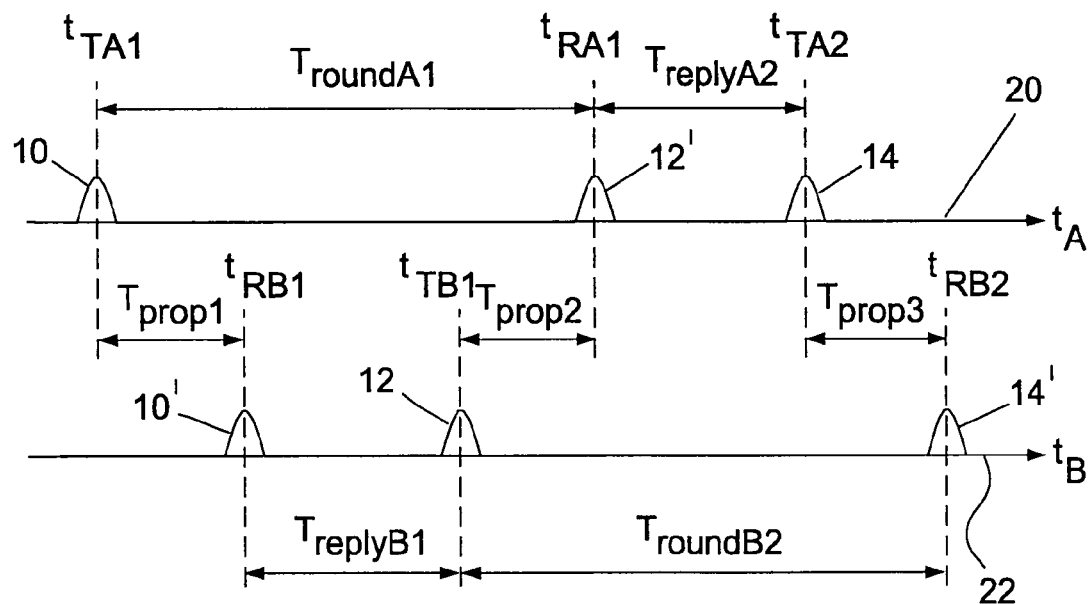
FIG. 2 shows a time chart to explain the time sequence of the 3-path method of FIG. 1.

FIG. 2 shows a time chart to explain the time sequence of the 3-path method of FIG. 1. In the chart of FIG. 2 two time axes 20 and 22 are illustrated, illustrating the chronological course of the transmitting and receiving activities of the first transmitter-receiver A on time axis 20 and of the second transmitter-receiver B on time axis 22. To simplify the illustration only one signal pulse from each data frame of FIG. 1 is shown in FIG. 2. This corresponds to the actual circumstances insofar as a reference point within the data frame has to be agreed for determining transmitting and receiving times. A suitable reference point is the time of the maximum amplitude of a specific signal pulse of the data frame, for example of the first signal pulse (start of frame) or the last signal pulse (end of frame). It is also possible to agree a different reference point between transmitter-receivers A and B.

At a time $T_{TA1}$ the first transmitter-receiver A transmits the first data frame 10 to the second transmitter-receiver B, which receives the first data frame 10 in the form of a receiving signal 10' after a signal transit time $T_{prop}$ conditional on the distance between transmitter-receivers A and B and the propagation speed of the medium. In the context of this description received data frames, such as data frame 10', are distinguished as such from transmitted data frames for the sake of clarity by an apostrophe only because they are receiving signals which can be distinguished from the data frame transmitted in each case on the basis of multiple propagation, signal attenuations and similar known effects. Ideally, a transmitted and a received data frame do not differ from one another.

After checking the received data frame 10', the second transmitter-receiver B transmits the second data frame 12 to the first transmitter-receiver A. The time interval between the receiving time $T_{RB1}$ of the first data frame 10' and the transmitting time $T_{TB1}$ of the second data frame 12 is the reply time interval $T_{replyB}$. The first transmitter-receiver A receives the second data frame 12 after the signal transit time $T_{prop}$ in the form of a receiving signal 12' at a receiving time $T_{RA1}$. The time interval between the first transmitting time $T_{TA1}$ and the receiving time $T_{RA1}$ on the part of transmitter-receiver A constitutes a first round time interval $T_{roundA1}$.

The first transmitter-receiver A replies to the receipt of the second data frame 12 with the third data frame 14. A time interval $T_{replyA2}$ here elapses between entry of the receiving signal 12' at time $T_{RA1}$ and transmission of the third data frame 14 at time $T_{TA2}$. After a signal transit time $T_{prop}$ the third data frame 14 reaches the second transmitter-receiver B at a receiving time $T_{RB2}$.

Between transmission of the second data frame 12 and receipt of the third data frame 14 at the second transmitter-receiver B a second signal round therefore takes place, which requires a total duration of $T_{roundB2}$.

A substantial feature of the present invention is the fact that the first signal round starts and ends at the first transmitter-receiver A, whereas the second signal round starts and ends at the second transmitter-receiver B. Furthermore, a substantial feature of the embodiment example described here is the fact that the reply time intervals $T_{replyB1}$ and $T_{replyA2}$ are identical or have a difference, the amount of which is a maximum of 20 μs. The reply time intervals may be conditional on reply times established in transmission protocols, on the length or duration of the transmitted data frames and on delays within the devices arising from the frame check or other processes within a transmitter-receiver.

From the round time intervals $T_{roundA1}$ and $T_{roundB2}$, after deduction of the known reply times, an average signal transit time is ascertained in the transmission medium. The following formula is enlisted for this:

$$T_{prop} = \frac{T_{roundA1} - T_{replyB1} + T_{roundB2} - T_{replyA2}}{4} \qquad \text{Formula 5}$$

From the average signal transit time $T_{prop}$ ascertained according to formula (6), using a known propagation speed of the data frames in the transmission medium between the transmitter-receivers A and B, the distance d is ascertained as follows:

$$d = cT_{prop} \qquad \text{Formula 6}$$

In the preceding description it has been assumed that the distance between transmitter-receivers A and B does not change during measurement. This is also very approximately a valid assumption in the case of moving transmitter-receivers. Also, to simplify the illustration, round time intervals $T_{round}$ and reply time intervals $T_{reply}$ without errors are assumed. In practice of course values containing errors have to be allowed for and the method according to the invention ascertains the distance in spite of values containing errors with the above-explained accuracy. Statements on accuracy made here are based on an error analysis which takes into account erroneous round and reply time intervals.

1.2 Accuracy of Determining Distance

For the purposes of the following illustration the symbols used in above formula (2) are simplified in their indices without changing their meaning. The simplified formula (2') with the same meaning as formula 2 is:

$$T_{prop} = \frac{T_{roundA} - T_{replyB} + T_{roundB} - T_{replyA}}{4} \qquad \text{Formula 6'}$$

Clock generators of the two transmitter-receivers A and B used for measuring the round time intervals and determining the reply times almost always have errors owing to implementation variants of the circuits, temperature influences, manufacturing tolerances and obsolescence.

This therefore results in a deviation of the clock frequency of the clock generators from their nominal frequency. Because of the deviations in the nominal frequency at both transmitter-receivers round time intervals ($T_{roundA'}$, $T_{roundB'}$) containing errors are measured. Additionally reply times ($T_{replyA'}T_{replyB'}$) containing errors are generated. For the calculated pulse transit time or the distance calculated from it this results in the relative error $E_{tAB}$ according to formula 7 below:

$$T_{prop}(1 + E_{tAB}) = \frac{T_{roundA'} - T_{replyB'} + T_{roundB'} - T_{replyA'}}{4} \qquad \text{Formula 7}$$

The nominal frequency deviations are illustrated as relative deviations or time errors ($E_{tA}$ and $E_{tB}$) of the measured or generated times of the actual time' intervals according to formula 8 to formula 11 as follows:

$$T_{roundA'} = T_{roundA}(1+E_{tA}) \qquad \text{Formula 8}$$

$$T_{replyA'} = T_{replyA}(1+E_{tA}) \qquad \text{Formula 9}$$

$$T_{roundB'} = T_{roundB}(1+E_{tB}) \qquad \text{Formula 10}$$

$$T_{replyB'} = T_{replyB}(1+E_{tB}) \qquad \text{Formula 11}$$

The error of the pulse transit time or the distance ($E_{tAB}$) is determined as follows:

$$E_{tAB} = \frac{1}{2}E_{tA} + \frac{1}{2}E_{tB} + \frac{T_{replyA} - T_{replyB}}{4T_{prop}}(E_{tB} - E_{tA}) \qquad \text{Formula 12}$$

In order to be able to better assess the influences of the pulse transit time or the distance, the two following cases of nominal frequency deviations (time errors) are used as a starting point.
a) The relative time errors are both the same size (EtA=EtB).
b) The relative time errors are the same size in amount, but with a different sign (EtA=-EtB).

In case a) the relative error of the distance corresponds to the arithmetic average of the relative time errors according to the following formula 13:

$$E_{tAB} = \tfrac{1}{2}E_{tA} + \tfrac{1}{2}E_{tB} \qquad \text{Formula 13}$$

The latter are in practice very small. For example, commercially available and very reasonably priced oscillating crystals have an error of less than ±0.005% over a temperature range of −40 to 85° C. Therefore a very small error in the distance measurement arises. The precision of the distance measurement is in this case moreover not dependent on the absolute round and reply times—the time errors have an effect only on the pulse transit time.

In case b) the relative error is substantially dependent on the ratio of the reply time difference ($T_{replyA}-T_{replyB}$) to the fourfold pulse transit time (see formula 14).

$$E_{tAB} = \frac{T_{replyA} - T_{replyB}}{4T_{prop}}(2E_{tA}) \qquad \text{Formula 14}$$

At this point a substantial advantage of the procedure according to the invention becomes evident: because of the adherence according to the invention to very small reply time differences, the precision of the distance measurement is improved. The precision of the distance measurement in the case of identical reply time intervals is not dependent on the absolute round and reply time intervals. An ideal case of identical time intervals is sufficiently enough approximated by adhering to a maximum difference between the reply time intervals of a maximum of 20 microseconds. Whereas the upper limit of 20 microseconds represents the currently preferred embodiment example, it should be pointed out that a distance measurement sufficiently accurate for many cases of application can still be performed with the method according to the invention even when adhering to a difference in the reply time intervals of a maximum of 200 microseconds.

To clarify the validity of these remarks, using an example system the influence of the reply time differences on the precision of the distance measurement has been calculated using concrete numerical values for different distances ($d_{AB}$) and different reply time differences ($\Delta T_{reply} = T_{replyA} - T_{replyB}$). In a group of combinations with different pairs of relative time error values ($E_{tA}$, $E_{tB}$), located at an interval of $E_{tA}$= −50 ... 0 ... 50 ppm and $E_{tB}$=−50 ... 0 ... 50 ppm, the errors of the distance measurement have been calculated using formula 15. The pair with the greatest error in the distance measurement $\Delta_{dAB}$ in each case has then been ascertained. These in each case maximum errors of the distance measurement $\Delta_{dAB}$ are illustrated in the following table as a function of the distance between the first and second transmitter-receivers and from the difference in the reply time intervals $\Delta T_{reply}$.

| $d_{AB}$ | $\Delta T_{reply}$ = 20 ns | $\Delta T_{reply}$ = 200 ns | $\Delta T_{reply}$ = 2 µs | $\Delta T_{reply}$ = 20 µs | $\Delta T_{reply}$ = 200 µs |
|---|---|---|---|---|---|
| 10 cm | ±0.015 cm | ±0.15 cm | ±1.5 cm | ±15 cm | ±150 cm |
| 1 m | ±0.015 cm | ±0.15 cm | ±1.5 cm | ±15 cm | ±150 cm |
| 10 m | ±0.05 cm | ±0.15 cm | ±1.5 cm | ±15 cm | ±150 cm |
| 100 m | ±0.5 cm | ±0.5 cm | ±1.5 cm | ±15 cm | ±150 cm |
| 1 km | ±5 cm | ±5 cm | ±5 cm | ±15 cm | ±150 cm |
| 10 km | ±50 cm | ±50 cm | ±50 cm | ±50 cm | ±150 cm |

The preceding table shows that, apart from the difference in the reply time intervals $\Delta T_{reply}$ of 20 µs and a distance between transmitter-receivers A and B of 10 km, the method according to the invention enables amazingly accurate distance determination with an error, caused by crystal tolerances, of only ±50 cm. However, even with a difference in the reply time intervals $\Delta T_{reply}$ of 200 µs and a distance between transmitter-receivers A and B of 10 km or less, sufficient accuracy for many cases of application is achieved. The accuracy of ±150 cm, for example, generally suffices to establish in which room of a building a person is located. If, for example, protocol regulations make adhering to the preferred difference in the reply time intervals of 20 microseconds difficult, to increase the accuracy of the distance measurement clock generators with narrower tolerances can also be used, in which the relative time error values ($E_{tA}$, $E_{tB}$) are, for example, at an interval $E_{tA}$=−20 ... 0 ... 20 ppm and $E_{tB}$= −20 ... 0 ... 20 ppm. Clock generators of this kind are hardly more expensive, however, considering the overall costs of a transmitter-receiver system.

2. N-Path Method

Figure 3:
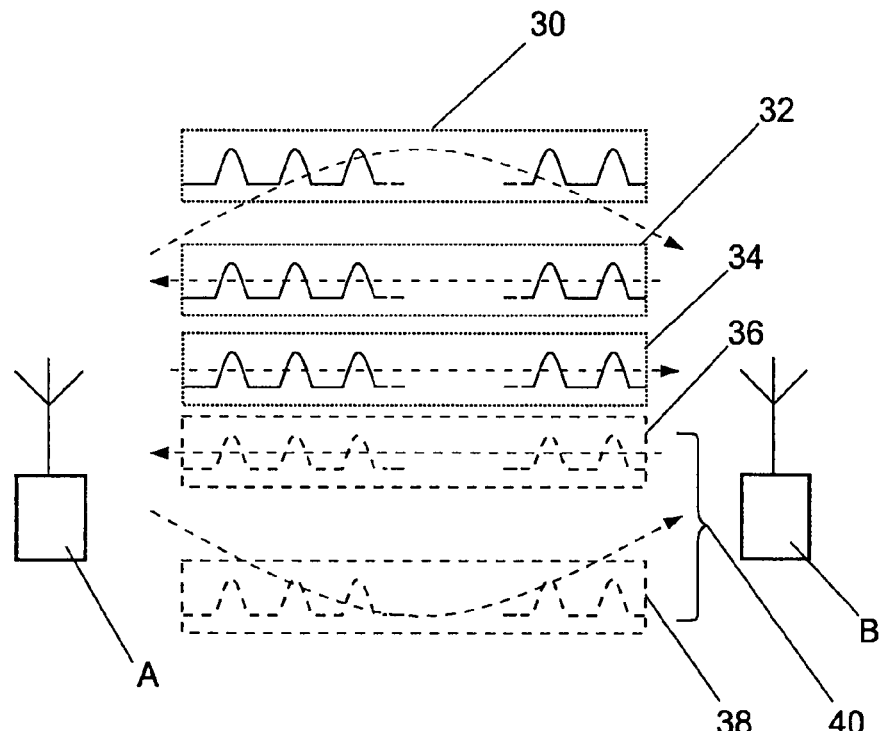
FIG. 3 shows a second embodiment example of the invention in the form of a generalised n-path method, in which the distance between two transmitter-receivers is passed through by an uneven number of data frames.

A generalisation of the above-described 3-path method is described below as a second embodiment example using FIGS. 3 and 4. In the n-path method described here the distance between two transmitter-receivers is passed through by an uneven number n of data frames.

The sequence of the method is depicted first. The accuracy of this n-path method is then mathematically derived.

2.1 Signal Rounds in the N-Path Method

The n-path method substantially represents a generalisation of the 3-path method described under 1.

A data frame 30 is transmitted by a first transmitter-receiver A and received by a second transmitter-receiver B. This data frame is there checked and after successful completion of the check a second data frame 32 is transmitted to the first transmitter-receiver A with a reply time interval.

The first transmitter-receiver A checks the second data frame 32 and transmits a third data frame, likewise with a delay in a reply time interval to the second transmitter-receiver B. Any number of data frames can be transmitted to this sequence of data frames. Data frames 34, 36 and 38 are illustrated as examples in FIG. 3. A total of n data frames is transmitted. Data frames 36 and 38 are combined into a pair 40 of data frames in FIG. 3 by a curved bracket and drawn with dotted lines to symbolise the fact that multiple repetition of the transmission of such pairs of data frames can take place as part of the present embodiment example. The reply time intervals $T_{replyAk}$, k=2, 4, 6, 8, . . . , (n−1) from $T_{replyA2}$ to $T_{reply(n-1)}$, and $T_{replyBi}$, i=1, 3, 5, 7, . . . , (n−2) from $T_{replyB1}$ to $T_{replyB(n-2)}$ have an average difference according to the formula $$\Delta T_{replyAVG} = \frac{T_{replyA2} - T_{replyB1} + \ldots + T_{replyA(n-1)} - T_{reply(n-2)}}{\frac{n-1}{2}}$$

the amount of which is a maximum of 20 microseconds. In a variant of this method the reply time intervals $T_{replyA2}$ and $T_{replyB1}$ are additionally either identical or have a difference, the amount of which is a maximum of 20 microseconds.

The entire pulse transit time in the transmission medium is ascertained from the measurement of the round time of this sequence of messages, similarly to the 3-path method.

Figure 4:
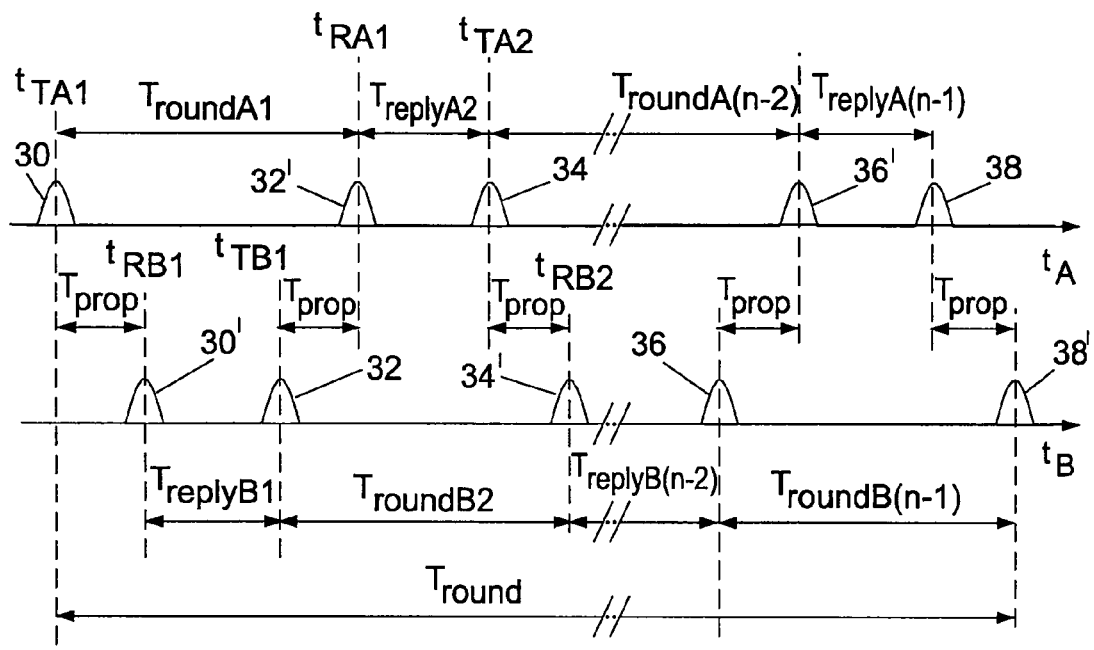
FIG. 4 shows a time chart to explain the time sequence of the n-path method of FIG. 4.

FIG. 4 shows in an illustration analogous to FIG. 2 the time sequence of the method, again illustrating only one pulse for each data frame.

Calculation of the arithmetic mean value of the signal transit time $T_{prop}$ is done using the following formula:

$$T_{prop} = \frac{T_{roundA1} - T_{replyB1} + T_{roundB2} - T_{reply} + \ldots + T_{roundA(n-2)} - T_{replyB(n-2)} + T_{roundB(n-1)} - T_{replyA(n-1)}}{2(n-1)} \quad \text{Formula 15}$$

$$n = 2k + 1, k \in N > 1$$

The distance can in turn be calculated from the signal transit time $T_{prop}$.

Since the overall round time $T_{round}$ in the n-path method is likewise not directly measured, the directly measured partial round time intervals ($T_{roundA1}$, $T_{roundB2}$, . . . , $T_{roundA(n-2)}$, $T_{roundB(n-1)}$) are again used. The reply times ($T_{replyA2}$, $T_{replyB1}$, . . . , $T_{replyA(n-1)}$, $T_{replyB(n-2)}$) of the two transmitter-receivers must be known in this case.

2.2 Accuracy of the N-Path Method

If the sum of the differences in the reply times ($T_{replyA2}$, $T_{replyB1}$, . . . , $T_{replyA(n-1)}$, $T_{replyB(n-2)}$) is kept very small according to the invention or is equal to zero ($T_{replyA2} - T_{reply.B1} + \ldots + T_{replyA(n-1)} - T_{reply(n-2)} \rightarrow 0$), the advantage of an unexpectedly high accuracy of the distance measurement is achieved by this symmetrical n-path method, as with the above-described 3-path method. This is explained in greater detail below.

Because of the relative time errors on the part of transmitter-receivers A and B, already explained above under 1.2, the relative error $E_{tAB}$ results for the ascertained pulse transit time or the distance calculated from it according to formula 16:

$$T_{prop}(1 + E_{tAB}) = \frac{T_{roundA1'} - T_{replyB1'} + T_{roundB2'} - T_{replyA2'} + \ldots + T_{roundA(n-2)'} - T_{replyB(n-2)'} + T_{roundB(n-1)'} - T_{replyA(n-1)'}}{2(n-1)} \quad \text{Formula 16}$$

Taking into account the errors $E_{tA}$ and $E_{tB}$ according to formula 17 to formula 20

$$T_{roundAn'} = T_{roundAn}(1+E_{tA}), n=2k+1, k \in N \quad \text{Formula 17}$$

$$T_{replyAn'} = T_{replyAn}(1+E_{tA}), n=2k, k \in N > 0 \quad \text{Formula 18}$$

$$T_{roundBn'} = T_{roundBn}(1+E_{tB}), n=2k, k \in N > 0 \quad \text{Formula 19}$$

$$T_{replyBn'} = T_{replyBn}(1+E_{tB}), n=2k+1, k \in N \quad \text{Formula 20}$$

the error of the signal transit time or the distance can be determined:

$$E_{tAB} = \frac{1}{2}E_{tA} + \frac{1}{2}E_{tB} + \frac{T_{replyA2} - T_{replyB1} + \ldots + T_{replyA(n-1)} - T_{replyB(n-2)}}{2(n-1)T_{prop}}(E_{tB} - E_{tA}) \quad \text{Formula 21}$$

The sum of the reply time differences $$(T_{replyA2} - T_{replyB1} + \ldots + T_{replyA(n-1)} - T_{reply(n-2)} = \Sigma \Delta T_{reply})$$

divided by their number $$\left(\frac{n-1}{2}\right)$$

results in a mean value $\Delta T_{replyAVG}$ for the reply times according to the following formula 22:

$$\frac{\sum \Delta T_{reply}}{\frac{n-1}{2}} = \Delta T_{replyAVG} \quad \text{Formula 22}$$

This allows the error in the signal transit time to be represented in simplified form as follows (Formula 23):

$$E_{tAB} = \frac{1}{2}E_{tA} + \frac{1}{2}E_{tB} + \frac{\Delta T_{replyAVG}}{4T_{prop}}(E_{tB} - E_{tA}) \quad \text{Formula 23}$$

Two cases of time errors are again considered to assess the error properties. Identically to the 3-path method, the relative error in the distance corresponds to the arithmetic average of the relative errors $E_{tA}$ and $E_{tB}$ (see formula 13), if both errors are of equal size ($E_{tA}=E_{tB}$). Similarly to the 3-path method, in the case of errors of equal amount with different signs ($E_{tA}=-E_{tB}$) the error is substantially dependent on the ratio of the mean value of the reply time differences to the fourfold signal transit time according to formula 24:

$$E_{tAB} = \frac{\Delta T_{replyAVG}}{4T_{prop}}(E_{tB} - E_{tA}) \qquad \text{Formula 24}$$

The precision of the distance measurement in the n-path method compared with the 3-path method likewise does not depend on the absolute round and reply time intervals. The error becomes smaller with increasing distance.

In practical implementations of transmitter-receivers the reply time differences, as already mentioned, are kept very small, but, owing to scanning errors of the digital system components, often cannot be avoided. However, if the reply times in an n-path measurement are evenly varied or scattered, the mean value of the reply time differences becomes very small ($\Delta T_{replyAVG} \rightarrow 0$), since negative differences may also occur. This is approximated in practical implementations in that the scanning errors occur randomly. The mean value of the differences in the reply time intervals tends to be substantially smaller than the difference in reply time intervals in the 3-path method:

$$\Delta T_{replyAVG} < |T_{replyA} - T_{replyB}|,$$

(compare formula [?] and formula 23). This means that the relative error of the distance comes out smaller than in the 3-path method and the n-path method thus proves equally accurate for measuring distance.

3. Double-Sided Two-Path Method

Figure 5:
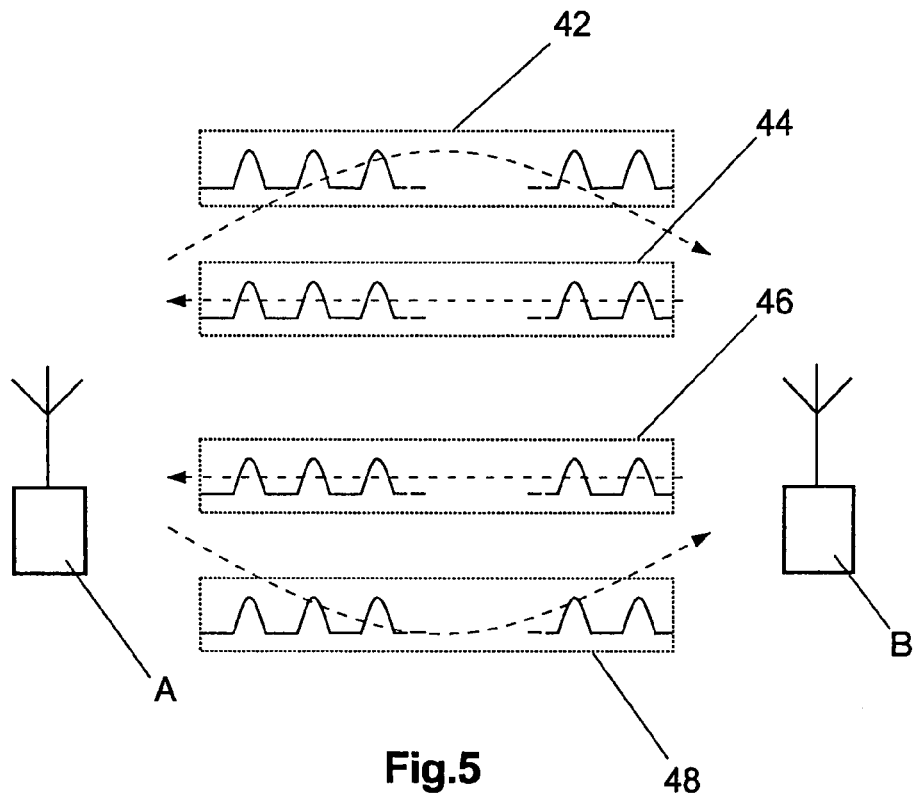
FIG. 5 shows a third embodiment example of the method according to the invention for determining distance in the form of a double-sided two-path method.
Figure 6:
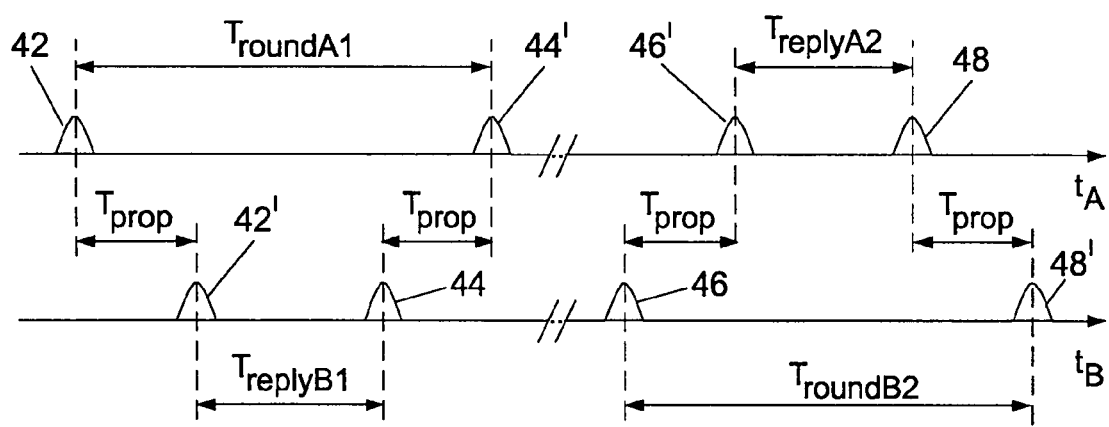
FIG. 6 shows a time chart to explain the time sequence of the double-sided two-path method of FIG. 6.

A double-sided two-path method is described below as a third embodiment example of the method for determining distance according to the invention using FIGS. 5 and 6.

3.1 Signal Rounds in the Double-Sided Two Path Method

For performing a first signal round, a first data frame 42 is transmitted by a first transmitter-receiver A and received by a second transmitter-receiver B in the form of a received data frame 42'.

This received data frame 42' is checked on the part of the transmitter-receiver 42 [sic] and, if successful, a first follow-up data frame in the form of a second data frame 44 is sent to the first transmitter-receiver A with a reply time interval from the receipt of the first data frame 42'. The receipt of the second data frame 44 at the first transmitter-receiver A in the form of a receiving signal 44' completes the first signal round.

To perform a second signal round, the second transmitter-receiver B transmits a third data frame 46 to the first transmitter-receiver A, which again checks the received third data frame 46' and transmits a second follow-up data frame in the form of a fourth data frame 48 to the second transmitter-receiver (B) with a reply time interval from the receipt of the third data frame 46'. The receipt of the transmitted fourth data frame 48 at the second transmitter-receiver B in the form of a receiving signal 48' completes the second signal round.

The method is performed in such a way that the reply time intervals $T_{replyA2}$ and $T_{replyB1}$ on the part of the first and second transmitter-receivers are either identical or have a difference, the amount of which is a maximum of 20 microseconds.

This two-path message exchange for determining the distance in two different signal rounds, once started by the two transmitter-receivers, is designated as a double-sided two-path method. The two signal rounds can be carried out in succession in the same transmission channel or the exchange may take place simultaneously or with a time overlap if two separate message channels are used.

The pulse transit times are ascertained in the transmission medium from the measurements of the round time intervals of the message sequences, after deduction of the known reply times.

The respective pulse transit times are calculated as follows (see formula 25 and formula 26):

$$T_{propA} = \frac{T_{roundA1} - T_{replyB1}}{2} \qquad \text{Formula 25}$$

$$T_{propB} = \frac{T_{roundB2} - T_{replyA2}}{2} \qquad \text{Formula 26}$$

The calculated pulse transit times ($T_{propA}$, $T_{propB}$) are then averaged (see formula 27) and the distance is then calculated from the averaged pulse transit time.

$$T_{prop} = \frac{T_{propA} + T_{propB}}{2} \qquad \text{Formula 27}$$

The calculation can be combined in the following way by inserting formula 25 and formula 26 into formula 27 (see formula 28).

$$T_{prop} = \frac{T_{roundA} - T_{replyB} + T_{roundB} - T_{replyA}}{4} \qquad \text{Formula 28}$$

The calculation according to this formula 28 is thus identical to the 3-path method. In the same way as there the spatial distance between the two transmitter-receivers A and B can be calculated from the pulse transit time.

3.2 Accuracy of the Double-Sided Two Path Method

Since calculation of the pulse transit time of the double-sided two-path method is identical to the 3-path method (cf. formula 28) and the errors can be taken into account in the same way as in the 3-path method (formula 8 to formula 11), the same function results for the relative error of the pulse transit time or distance as in the 3-path method (see formula 12). This means the double-sided two-path method can be used as an alternative to the 3-path method with identical error properties, representing the essential feature of this method.

4. Multiply Double-Sided Two Path Method

Figure 7:
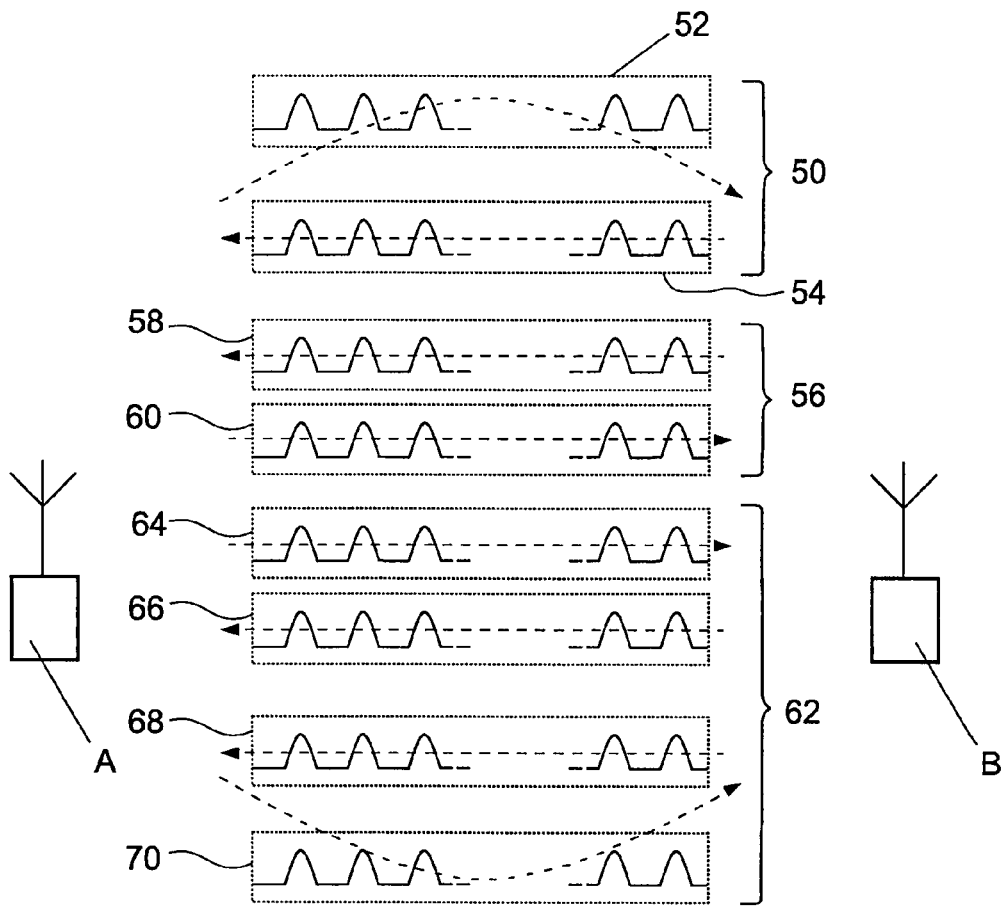
FIG. 7 shows a schematic illustration to explain a fourth embodiment example, in which by repeating signal rounds a multiply double-sided two-path method is performed.
Figure 8:
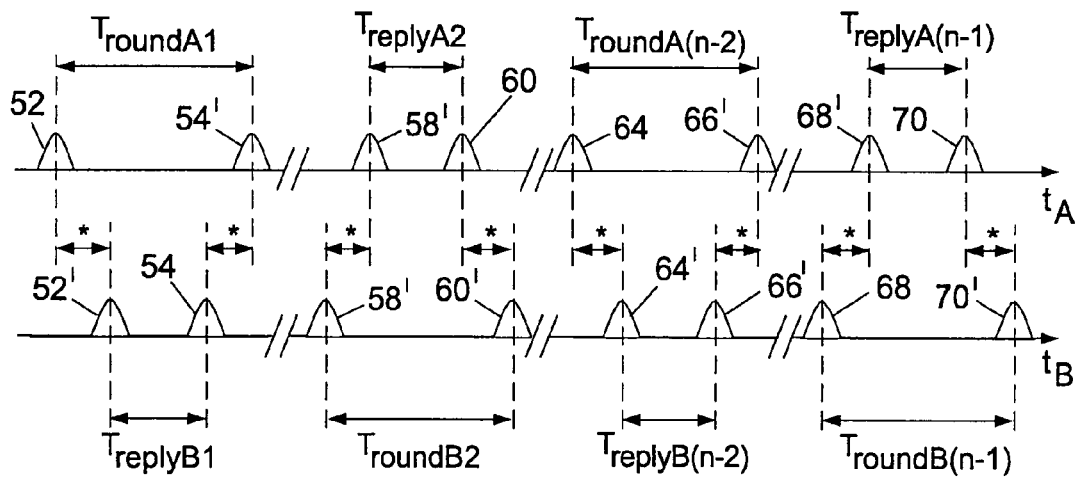
FIG. 8 shows a time chart to explain the time sequence of the multiply double-sided two-path method of FIG. 8.

A fourth embodiment example of the method according to the invention is described below using FIGS. 7 and 8, in which, by repeating pairs of signal rounds, a multiply double-sided two-path method is performed.

4.1 Signal Rounds

At the start of a first signal round 50 a first data frame 52 is transmitted by a first transmitter-receiver A and received by a second transmitter-receiver B. This received data frame 52' is there checked and, if successful, a follow-up data frame in the form of a second data frame 54 is transmitted to the first transmitter-receiver A with a reply time interval $T_{replyB1}$ from the receipt of the first data frame 52'. The receipt of the second data frame 54 at the first transmitter-receiver A ends the first signal round 50.

At the start of a second signal round 56 the second transmitter-receiver B transmits a third data frame 58 to the first transmitter-receiver A. This received data frame 58' is there checked and, if successful, a follow-up data frame in the form of a fourth data frame 60 is transmitted to the second transmitter-receiver B with a reply time interval $T_{replyA2}$ from the receipt of the third data frame 58'. The receipt of the fourth data frame 60 at the second transmitter-receiver B ends the second signal round 56.

The double-sided two-path message exchange described so far is carried out n−1 times in total. The method is performed in such a way that the reply time intervals $T_{replyAk}$, k=2, 4, 6, 8, . . . , (n−1) from $T_{replyA2}$ to $T_{replyA(n-1)}$, and $T_{replyBi}$, i=1, 3, 5, 7, . . . , (n−2) from $T_{replyB1}$ to $T_{replyB(n-2)}$ occur, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

The signal rounds can take place in succession in the same transmission channel. Alternatively, where two or more separate message channels are used, two or more signal rounds can be performed simultaneously or with a time overlap. With the sequential variant the direction of the two-path message sequences is not bound to a specific order. The individual message sequences are independent of one another.

The pulse transit times of both sides (see formula 29 and formula 30) are calculated from the respective measured round time intervals and the known reply time intervals.

$$T_{propAx} = \frac{T_{roundAx} - T_{replyBx}}{2}, \quad \text{Formula 29}$$
$$x = 2k+1, x < n, k \in N$$

$$T_{propBy} = \frac{T_{roundBy} - T_{replyAy}}{2}, \quad \text{Formula 30}$$
$$y = 2k, x < n, k \in N > 0$$

The pulse transit times ($T_{propAx}$, $T_{propBy}$) are then averaged (see formula 31) and the distance is then calculated from the averaged pulse transit time.

$$T_{prop} = \frac{T_{propA1} + T_{propB2} + \ldots + T_{propA(n-2)} + T_{propB(n-1)}}{(n-1)} \quad \text{Formula 31}$$

The calculation can be combined in the following way by inserting formula 29 and formula 30 into formula 31 (see formula 32).

$$T_{prop} = \frac{T_{roundA1} - T_{replyB1} + T_{roundB2} - T_{replyA2} + \ldots + T_{roundA(n-2)} - T_{replyB(n-2)} + T_{roundB(n-1)} - T_{replyA(n-1)}}{2(n-1)} \quad \text{Formula 32}$$
$$n = 2k+1, k \in N > 1$$

The calculation is thus identical to the above-described n-path method, a special case of which is the above-described 3-path method.

Since the sum of the differences in the reply times ($T_{replyA2}$, $T_{replyB1}$, . . . , $T_{replyA(n-1)}$, $T_{replyB(n-2)}$) according to the invention is kept very small or disappears completely during procedure ($T_{replyA2} - T_{replyB1} + \ldots + T_{replyA(n-1)} - T_{reply(n-2)} \to 0$), it is possible to refer to a symmetrically multiply double-sided two-path method.

4.2 Accuracy of the Multiply Double-Sided Two Path Method

Since, here too, the calculation of the pulse transit time of the multiply double-sided two-path method is identical to the n-path method (cf. formula 32 and formula 15) and errors can be taken into account in the same way as in the n-path method (formula 17 to formula 20), the same function results for the relative error of the pulse transit time or distance as in the n-path method (see formula 22). This means the multiply double-sided two-path method can be used as a substitute for the n-path method with identical error properties, representing the essential feature of this method.

5. Dithering and Averaging

A method, by which the accuracy of the distance measuring can be further increased, applicable to all the above-described embodiment examples is described below as a fifth embodiment example of the method according to the invention using FIGS. 9 to 13.

The capacity C of a transmission channel, in other words the amount of information which can be transmitted in a specific time, is determined by the Shannon theorem of channel capacity (see formula 33).

$$C = B \log_2(1+SNR) \quad \text{Formula 33}$$

B here denotes the band width of the channel and SNR the signal-to-noise ratio. This means that the amount of information I can be transmitted in a specific time T (see formula 34).

$$I = BT \log_2(1+SNR) \quad \text{Formula 34}$$

The accuracy of a value of a variable transmitted as information is proportional to the amount of information available for transmitting the value, for example in the form of available places after points. Since the available band width B and output power which determines the signal-to-noise ratio SNR are limited for various reasons, such as, for example, owing to legal rulings, the amount of information can be increased only by increasing the duration of the transmission T, cf. formula 34. It is therefore obvious for precise ascertaining of the time of arrival (ToA) of a data frame to use the times of arrival of as many pulses as possible as a basis and therefore to increase the amount of information.

Figure 9:
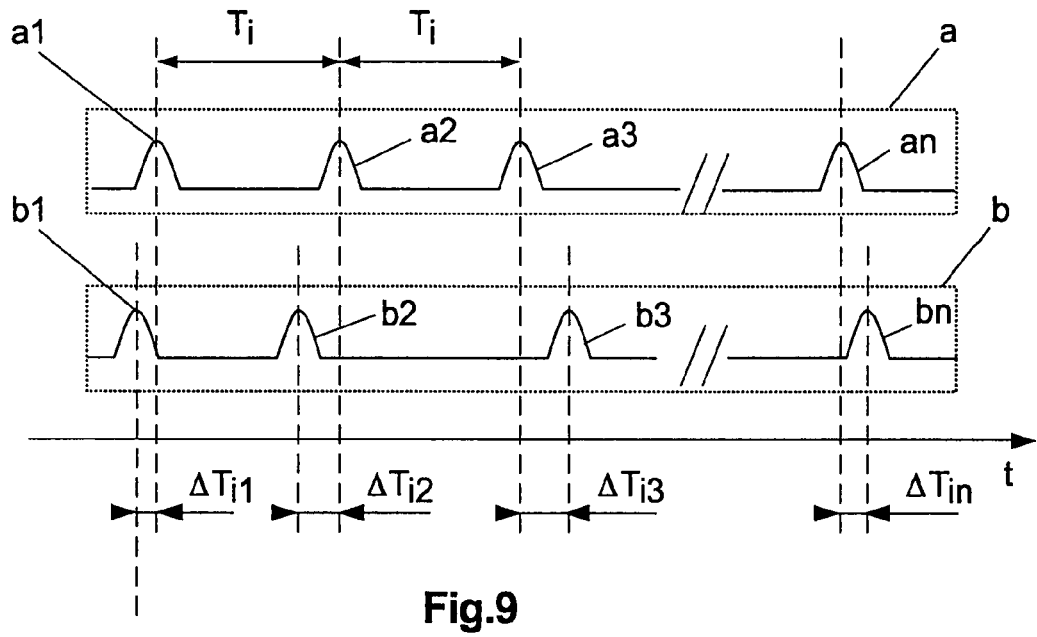
FIG. 9 shows a time chart to explain a fifth embodiment example in which dithering is undertaken on the transmitter side.

With reference to FIG. 9 a data frame a to be transmitted consists of a sequence of pulses, a1, a2, a3 to an, with known pulse frequency, which is mirrored in a known pulse period Ti.

In the case of the dithering performed in the present embodiment example the pulse periods are not constant, however. Single pulses b1 to bn of a data frame b transmitted according to the dithering method have in each case a time deviation $\Delta T_{ij}$, j=1, 2, . . . , n.

Ideally the deviations $\Delta T_{ij}$ are completely evenly distributed and the sum of the deviations is equal to zero:

$$\Delta T_{i1} + \Delta T_{i2} + \Delta T_{i3} + \ldots + \Delta T_{in} \to 0 \quad \text{Formula 35}$$

Figure 10:
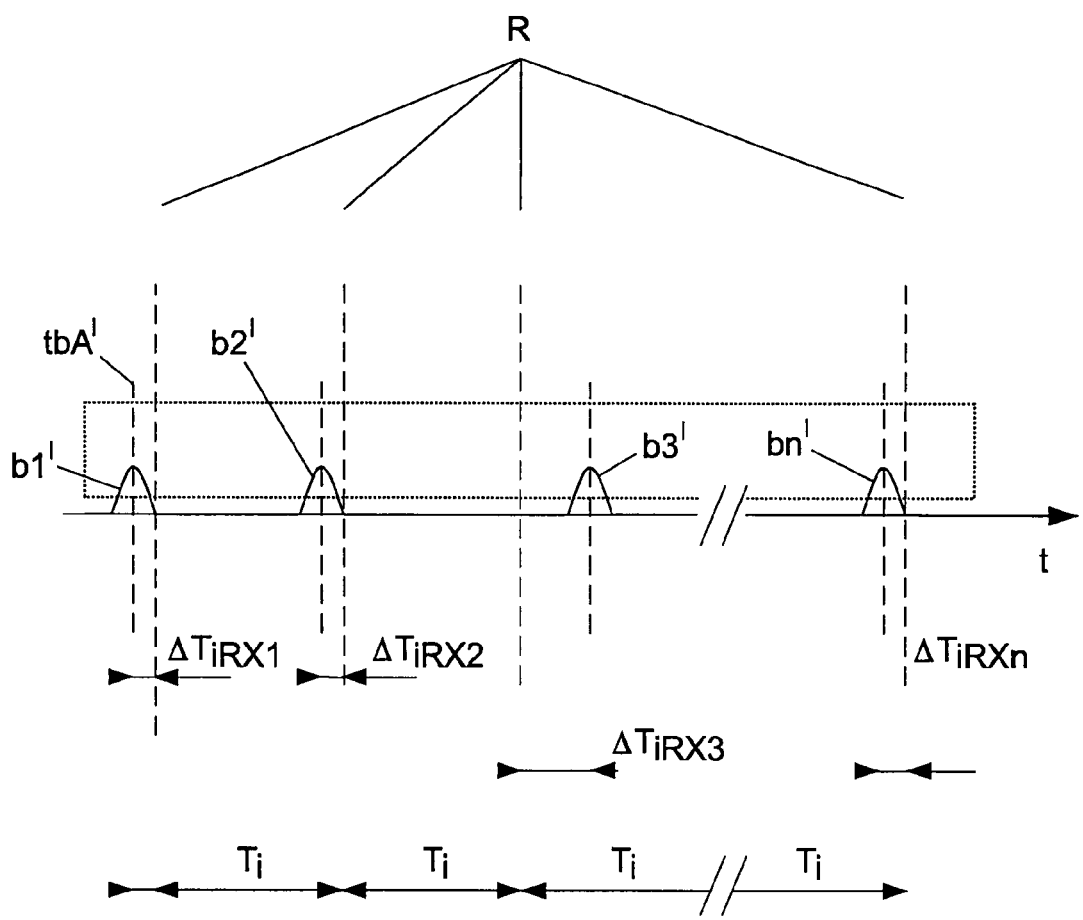
FIG. 10 shows a time chart to explain the receiver-side behaviour in the case of transmitter-side dithering according to FIG. 10.

Averaging performed in combination with the dithering is described below using FIG. 10. In averaging differences in the times of arrival $\Delta T_{iRXi}$ of individual received pulses b1', b2' to bn' are measured relative to the next grid points of a fixed time grid R in each case. The grid R corresponds to the pulse period $T_i$ and has a fixed relation (synchronous) to the time grid (clock generator) of the receiving device of a transmitter-receiver.

Any detected pulse of the data frame is here allocated to the grid as reference point (tToA') and the grid is adjusted as accurately as possible to the pulse sequence once per data frame. The achievable accuracy of the adjustment depends on the time grid/clock generator of the receiving device.

Since the deviations involved in the dithering are dimensioned as far smaller than the pulse period $T_i$, unambiguous allocation of the grid points to the detected pulses is guaranteed. The measurements of the deviations ($\Delta T_{iRXi}$) are accumulated and then arithmetically averaged (see formula 36). Since during dithering the sum of all the deviations ideally results in zero, the mean value $\Delta T_{iRXAVG}$ corresponds to the difference between the exact time of arrival of the data frame ($t_{TOA}$) and the reference point ($t_{TOA'}$).

$$\Delta T_{iRXAVG} = \frac{\Delta T_{iRX1} + \Delta T_{iRX2} + \ldots + \Delta T_{iRXn}}{n} \qquad \text{Formula 36}$$

$$t_{ToA} = t'_{TOA} - \Delta T_{iRXAVG} \qquad \text{Formula 37}$$

The additional method features described below are particularly suitable for using a dithering and averaging method in conjunction with the method of the invention:

a) Since the deviations added on the transmitter side determine the available pulse duration and only slight loss of bandwidth should be associated with this method, the deviations on the transmitter side amount to only a small fraction of the pulse period.

b) The dithering can be added on transmitting, on receiving or with both processes simultaneously. The latter variant in particular contributes to simple improvement of the even distribution of the dithering. Evenly distributed noise on the transmission path and on the transmitting and receiving circuit is beneficial to the method, since it improves the even distribution of the dithering.

c) The difference between the greatest positive and negative deviations must therefore be greater than the measuring resolution on the receiver side, in order to achieve distribution over at least two different quantising steps (measuring resolution). The most efficient solution is therefore dithering in which the difference between the deviations is greater than the measuring resolution $T_r$ on the receiver side (see formula 38), but considerably smaller than the pulse period Ti.

$$T_r < \Delta T_{i\,max} - \Delta T_{i\,min} << T_i \qquad \text{Formula 38}$$

d) Furthermore, all the pulses or only some of the pulses of a data frame may be subjected to dithering.

5.2 Transmitter-Receiver with Dithering/Averaging

Dithering is already inherent in practical embodiment variants of transmitter-receivers. For various reasons, yielding advantages for implementation, digital modules operated at different clock frequencies are switched to one. Low clock frequencies are sensible, for example, where the chronological behaviour with these clock frequencies is adequate, but yield the advantage of low power consumption. High clock frequencies are used where fast chronological behaviour of the circuit is required. The lower clock frequencies are normally used to perform processing of the data of the message frames (coding, decoding). These clock frequencies amount to only a small multiple of the data rate or the pulse frequency. For synthesis and detection of the individual pulses (message symbols), clock frequencies which must correspond to the multiple of the band width of the pulse in the baseband or on an intermediate frequency are used, in order to achieve the desired properties of the circuits. If the clocks are derived from various sources, the various clock frequencies are not synchronised. The frequencies may additionally be so dimensioned that the smallest common multiple goes towards infinity. At the transition of a signal from one clock domain to the other this cause a scanning error which has a random distribution. These random deviations generate "jittering" or "dithering" of the transmitted pulses and this is generally regarded as an undesired effect.

For the implementation of an embodiment example of a transmitter-receiver according to the invention and an arrangement for determining distance according to the invention this effect becomes a particular advantage, however, because it implements dithering of the pulses in both the transmitting and the receiving devices of transmitter-receivers without further measures.

Further circuit measures for implementing the dithering are not necessary, but can additionally be implemented as part of this invention.

Figure 11:
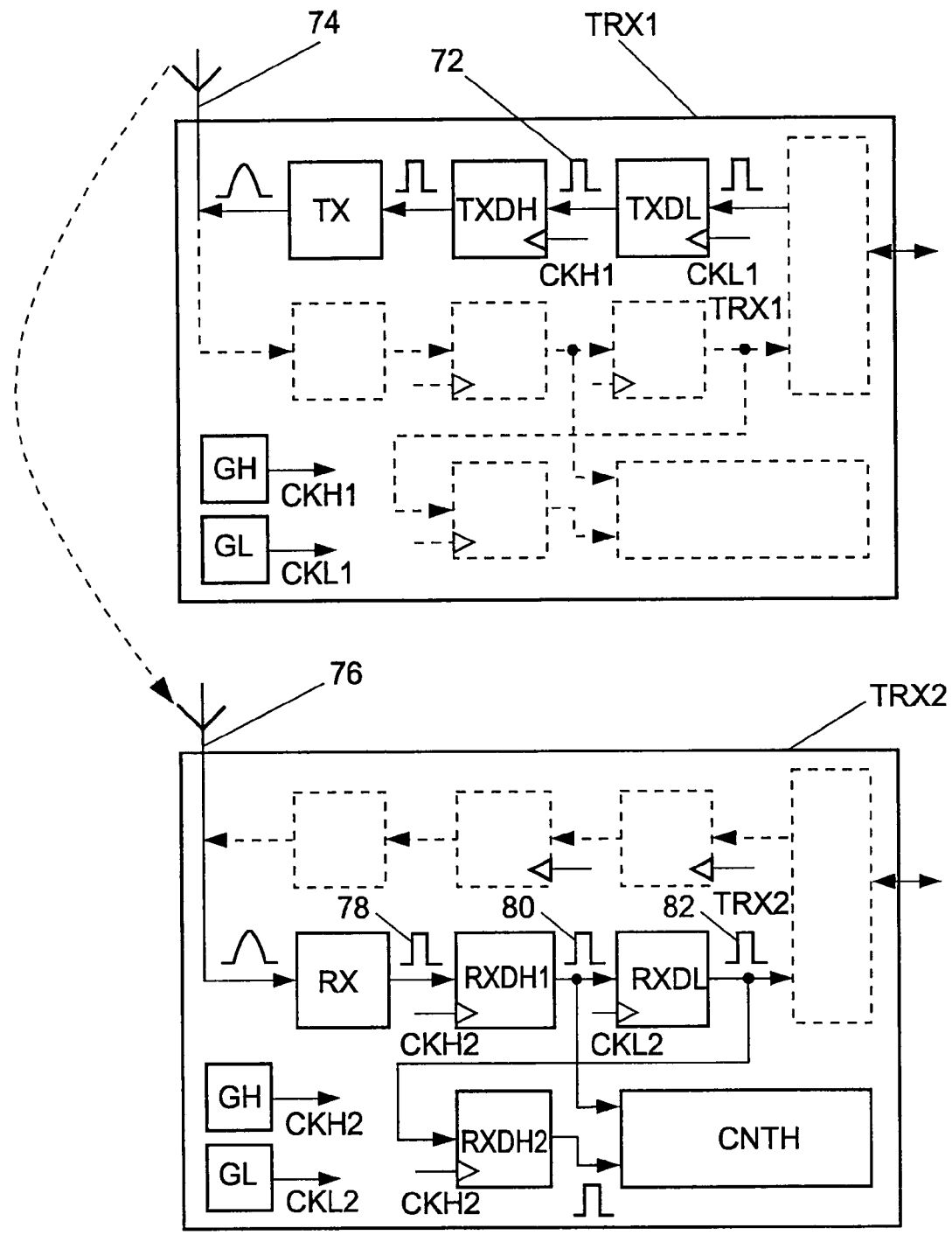
FIG. 11 shows using a block diagram an example of an arrangement of two transmitter-receivers with inherently converted dithering.

FIG. 11 shows an example of an implementation of an arrangement of two transmitter-receivers with inherent dithering and depicts the transmission of a message frame in one direction.

A transmitter-receiver TRX1 functions as transmitter and transmitter-receiver TRX2 as receiver. In transmitter-receiver TRX1 a frame is generated, in other words coded, and the signal pulses to be transmitted (also in abbreviated form called pulses below) are generated and transmitted with a pulse frequency by a module TXDL. A pulse 72 to be transmitted is scanned by a module TXDH and synthesised as a digital baseband signal.

The baseband signal is converted into an analogue signal, amplified and then emitted via an antenna 74 by a module TX. The pulse frequency is here based on a time basis which uses a module GL. Module GL conducts a clock signal CKL1 resulting from this to module TXDL.

However, module TXDH is supplied with a clock signal CKH1 which is generated in a module GH and is based on an independent time basis which is unsynchronised in respect of module GL. This gives rise to a systematic scanning error which on statistical average corresponds to half the period of CKH1.

Modules of transmitter-receiver TRX1, related to receiving, are drawn in dotted lines and are not explained in greater detail. Their function emerges from the following description of the receiving-related modules of a second transmitter-receiver TRX2.

In the second transmitter-receiver TRX2 a pulse irradiated via its antenna 76 is amplified in a module RX and digitised into a baseband signal 78. The baseband signal 78 is scanned with a clock CKH2 in a module RXDH1 and detection of a pulse is done, e.g. by digital correlation.

Because of the digital scanning in module RXDH1 a further systematic scanning error arises, which on statistical average corresponds to half the period of the clock signal CKH2. By scanning a detected pulse 80 by a module RXDL with a clock CKL2 again a scanning error arises, which, however, is dimensioned conditional on a low clock frequency at CKL2. For this purpose a pulse 82 scanned by a module RXDL switched downstream of module RXDH1 is scanned again by a further module RXDH2 with the clock at CKH2, giving rise to a further chronological scanning error of the received pulse. The scanning error of module RXDL is counted by a module CNTH.

The clock frequency of clock signal CKL2 is based on a time basis which uses a module GL which supplies module RXDL with a clock signal. Modules RXDH, RXDH2 and CNTH are supplied with clock signal CKH2, which is generated in a module GH and is based on a time basis independent of and unsynchronised with module GL. Modules RXDH and CNTH measure the time of arrival of the received pulse with clock CKH2, which means that the measuring accuracy of the time of arrival corresponds to the period of this clock.

In total the individual pulses are delayed systematically on the time axis by superimposing the total of three scanning errors. The transmitter-receivers can in this case be designed and set up in such a way that the ratio of the frequencies CKL1 to CKH1 or CKL2 to CKH2 generates as even a distribution of the scanning errors as possible. Frequencies CKH1 and CKH2 are configured identically for reasons of structural simplicity, but are not synchronised in phase and frequency and can therefore be so minimally delayed in respect of one another that likewise as even a distribution of the scanning errors as possible arises. The clock frequencies of CKL1 and CKL2 are identically configured, but likewise unsynchronised and in practice have very slight deviations from one another (e.g. crystal tolerances), but may also be randomly synchronous to one another.

Additionally, in practice all the clock frequencies have unsystematic, random phase errors. As already mentioned, noise in the transmitter-receivers and on the transmission path may lead to further minimal chronological delays in the pulses.

All these measures and effects lead to superimposing of systematic and random effects and therefore to very good randomly distributed time delaying of the individual pulses. In addition the superimposing leads to dithering, which approximates the condition according to formula 40.

Figure 12:
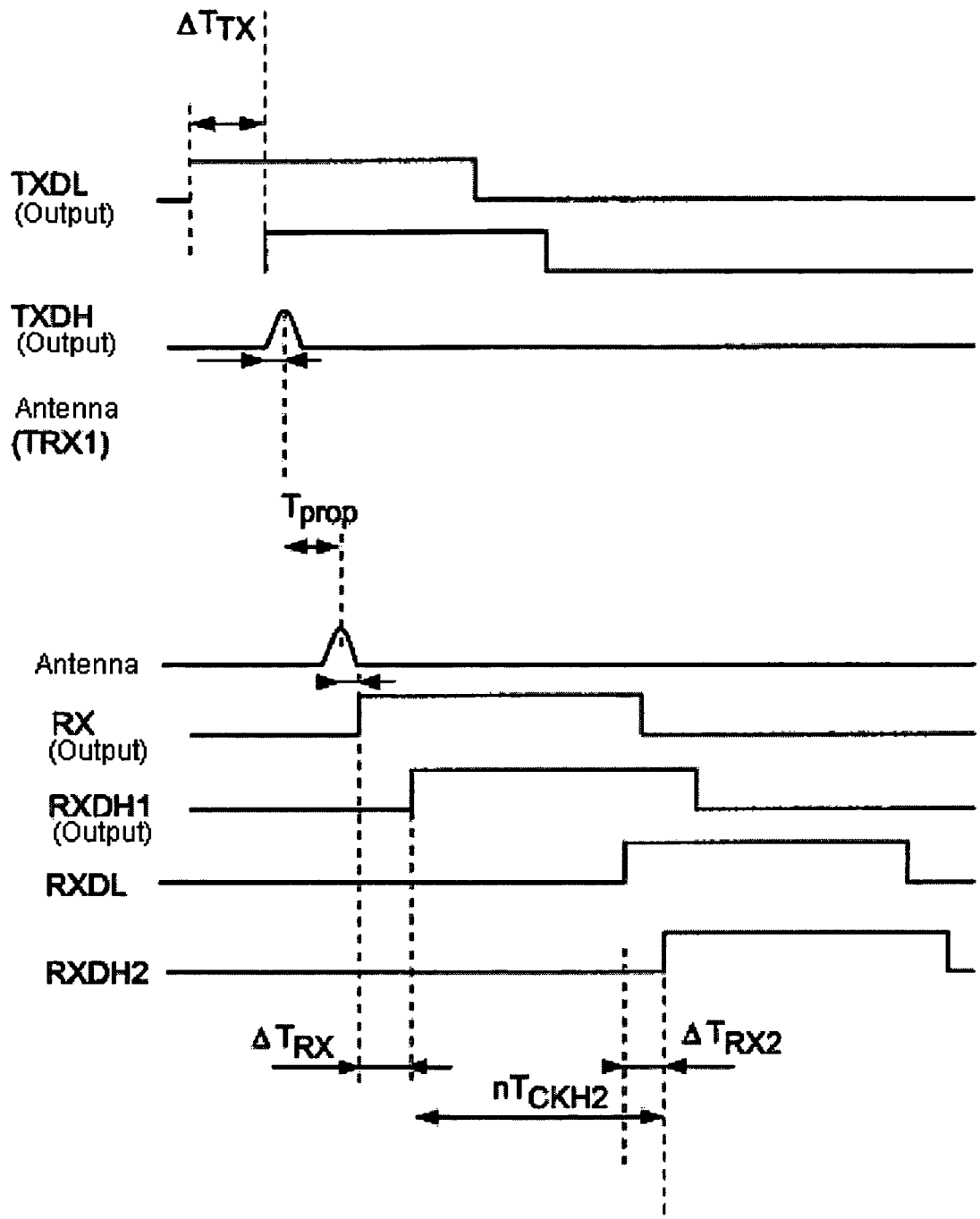
FIG. 12 shows a time chart to explain the time sequence of the transmission of a pulse when using the transmitter-receiver arrangement of FIG. 11.

FIG. 12 shows the chronological sequence of the transmission of a pulse when the transmitter-receiver arrangement of FIG. 11 is used. The time differences $\Delta TTX$, $\Delta TRX1$ and $\Delta TRX2$ here correspond to the systematic scanning errors. The times characterised by an asterisk (*) are delays not dependent on the phase combination of the various clocks, whose values are known.

A further improvement in the even distribution of the dithering can be achieved in that the clock generators GH are restarted between transmission of two message frames or the clock generators are frequency-modulated with a pseudo-random sequence during transmission. The frequency modulation in this case takes place in a very narrow range. Additionally, the clock generators GL may be restarted between the distance measurements.

5.3 Accuracy of Distance Determination where Dithering and Averaging are Used

Figure 13:
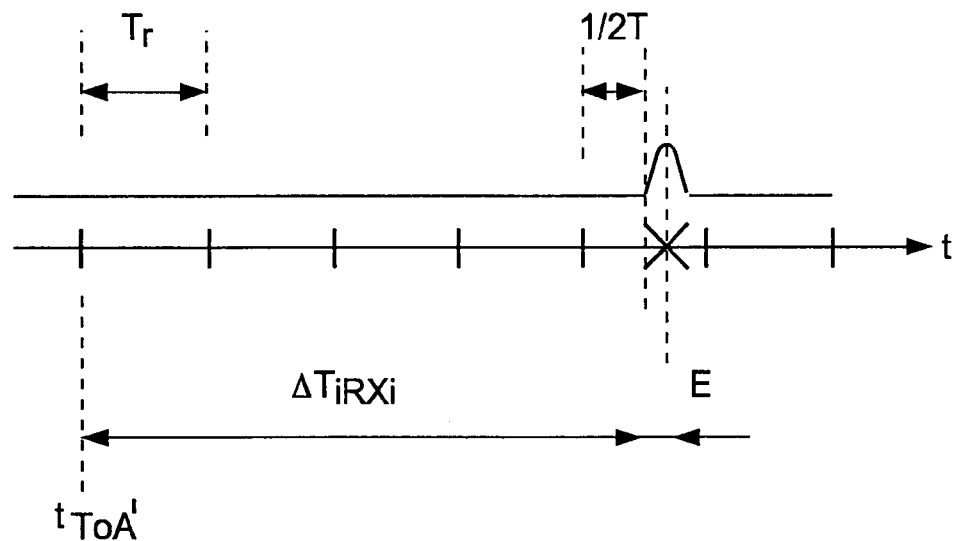
FIG. 13 shows for further explanation of the transmitter-receiver arrangement of FIG. 11 a time chart to explain the time resolution of the individual measurements.

Since the resolution of the individual measurements of $\Delta T_{iRXi}$, cf. FIG. 13, is technically limited in practice by the clock frequency available for it, the measurement of the individual pulses is subject to an error.

The limitation arises from the necessity to improve the feasibility of implementation (e.g. by the maximum possible clock frequencies depending on the manufacturing process of an implementation), to reduce the power consumption and to keep down the costs of the component (e.g. using a reasonably priced design). Since the uncertainness of quantising amounts statistically to ½ Tr, this amount is added to the measured value $\Delta T_{iRXi}$.

With a finite number of measured values ($\Delta T_{iRXi}$), on the basis of the above-mentioned measuring errors the absolute error $E_{ToA}$ of the measured time of arrival arises (see formula 39).

$$t_{ToA} + E_{ToA} = t_{ToA}' + \Delta T_{iRXAVG} \quad \text{Formula 39}$$

The error $E_{ToA}$, with assumed ideally evenly distributed deviations of the pulses, as long known, is in the following way dependent on the number of measurements n performed and the individual measuring resolution. $T_r$ (see formula 40).

$$E_{ToA} \leq \pm \frac{1}{n} T_r \quad \text{Formula 40}$$

Since in practice ideal even distribution of the deviations of the detected pulses would be very improbable or achievable only with complicated implementations, the error $E_{ToA}$ comes out correspondingly greater than according to formula 40.

Further embodiment examples are described below, the additional features of which can be applied to the above-described various variants of the method for determining distance, in order to improve its accuracy, security or protocol embedding.

6. Peak Detection

The accuracy of determining a receiving time can be improved by suitable peak detection methods. A digital correlation method is first described below. Then an analogue compression method is described.

6.1 Peak Detection by Digital Correlation

In this method, the pulse of which the time of arrival is measured is detected by a digital correlator (known as a sliding correlator). The received signal is digitally quantised and stored usually for the duration of a message symbol. The stored values are then continuously compared with an expected pattern. The result of the comparison is represented as a digital numerical value. To detect a pulse, this numerical value can be compared with a threshold value (fixed threshold), or the largest numerical value reached in a window of time is selected. The latter option is enlisted for measuring the receiving time, since it ascertains most accurately the time with the best signal amplification.

6.2 Peak Detection by Analogue Compression

In this case the receiving signal is summed up (compressed) in analogue manner with an electronic or mechanical circuit (mechanical surface wave filter) in such a way that at a specific time the received signal represents an analogue pulse. The analogue compression is in this case configured in such a way that with the peak of the analogue pulse it ascertains precisely the time (constant delay may be included) with the best signal amplification. The analogue voltage can be compared with a reference voltage (comparator). By measuring and averaging the times of exceeding and going below the threshold value of the analogue comparator, the peak of the analogue pulse can be ascertained chronologically most accurately as long as the analogue pulse has a symmetrical shape.

7. Qualifying and Identifying Signal Pulses

Below are described measures with which it can be ensured that signal pulses detected on the receiver side are provided for determining distance. These measures include a gating method, a plausibility check, an integrity check and identification of received signal pulses.

7.1 Gating

The detected pulses of a data frame generate a short-term signal which is repeated with the known pulse period for the following pulses. Since the receiver knows the pulse period, after synchronisation to any chosen pulse, a grid can be established with the known pulse frequency. At the grid points (time of the next expected pulses) short windows of time allow through the detected pulses to the measuring device for the time of arrival, while in the time periods between the windows the detected pulses are blocked or filtered out.

Therefore pulses detected by sources of radio noise, noise and multi-path distribution are masked out, further increasing the reliability and accuracy of measuring distance. If several pulses come into the window of time, the first pulse is always detected and the following pulses are likewise masked out. The windows of time for achieving a good filter effect against said sources of noise amount to only a fraction of the pulse period. However, they must have a certain minimum duration, since the pulse synchronisation is subject to a certain error and the individual pulse intervals are not constant owing to the dithering method used.

7.2 Plausibility Check

Checking the time of arrival of the pulses of received data frames for plausibility makes use of known devices and methods of existing message protocols and can therefore advantageously be implemented without great expenditure. The data frames have specific data fields, conditional on protocol, which are used to check the received data frames. Checking is done for specific codes, whereby the data frames can both be rated as reliable and valid and can also be classified. Alternatively or additionally, via signatures in the user data areas (payload) of data frames checking of the validity on the application level (higher protocol layers or application layer) can be done. If the plausibility check of data frames is successful, it is therefore also possible to regard the times of arrival of the individual pulses used as message symbols as plausible.

7.3 Integrity Check

Checking whether detected pulses have actually been transmitted by the transmitter can be done by checking the integrity of the data frames. For this check sums are generated in existing message protocols over specific fields of the data frames and attached to the data frames (CRC). In the frame decoder of the receiver the check sum for the actually received fields, for example, is then recalculated and compared with the received check sum. If the check is successful it can then be established with a very high statistical certainty (better than $10^{10}$) whether the pulses have been received uncorrupted. By also using this long-known arrangement of existing message protocols, the reliability and accuracy of measuring the distance can be efficiently improved, since only the actually transmitted pulses of the data frames are enlisted to determine the time of arrival.

7.4 Identification of the Signal Pulses

Associating pulses with a transmitter-receiver and therefore with a specific position can be done via unambiguous identification of the data frames. The address fields (e.g. IEEE station addresses) of existing message protocols which guarantee unambiguous allocation (origin) of a message to a transmitter-receiver are also used. The times of arrival of the pulses can thus be unambiguously allocated to a specific transmitter-receiver, thus improving the reliability of distance measuring without additional expenditure.

8. Exchange of Measured Data for Determining Distance

To calculate the pulse transit time and from it the distance, specific measured values must be exchanged between the cooperating transmitter-receivers.

One option is exchange of the transmitting and receiving times of the message frames, from which the round and reply times and from which in turn the pulse transit times and the distances can be calculated. Alternatively exchange of the round and reply time intervals already ascertained in the transmitter-receivers is also possible.

The measured time values can in this case be exchanged symmetrically, whereby the distance can be calculated in both the cooperating transmitter-receivers or only one-sided transmission is performed if calculation of the distance in one of the transmitter-receivers is adequate. The measured time values can in this case be transmitted both publicly (able to be received by any transmitter-receiver in the transmission range) or secretly (comprehensible to the two cooperating transmitter-receivers only).

8.1 Exchange of Transmitting and Receiving Times (ToA)

To calculate the round and reply times from which the pulse transit time or distance is subsequently calculated, the measured receiving and transmitting times of the message frames can be communicated. The time values are in this case communicated in a previously established or later negotiated format. The communication has the advantage that not every transmitter-receiver has to be equipped for calculating the round or reply times. If knowledge of the distance not just between the cooperating transmitter-receivers is practical and desired, communication of the measured receiving and transmitting times can be done efficiently, for example as a broadcast, (saving bandwidth of the message channel, saving electrical energy). The measured times can already be calculated before communication on the basis of the corruption by external influences (e.g. temperature). Alternatively, the correction may also be performed in the transmitter-receiver which performs the calculation of the round and reply times. For this, either the correction values must be additionally transmitted or already known. The optional use of a "perpetual" time scale has the additional advantage that the measured values can easily be allocated unambiguously to the respective message frames.

8.2 Communication of the Round and Reply Time Intervals

To calculate the pulse transit time and from it the distance, alternatively the round and reply time intervals can be communicated. Communication of the time values is done in a previously established or later negotiated format.

If knowledge of the distance not just between the cooperating transmitter-receivers is practical and desired, communication of the round and reply times may also take place, for example as broadcast. Calculation of the round and reply times from the measured receiving and transmitting times of the message frames has to be performed only once with this variant. The ascertained times can likewise be corrected before communication on the basis of the corruption by external influences. Alternatively the correction may also be performed in the transmitter-receiver which performs the calculation of the distance. For this the correction values must either be additionally transmitted or they are already known. In the case of the communicated times, however, allocation to specific message frames, which have to be communicated in addition to the time values is necessary (e.g. by numbering the message frames).

8.3 Communication of the Pulse Transit Time or the Distance

If the calculation of the pulse transit time or the distance is performed in only one of two cooperating transmitter-receivers it is possible to communicate these calculated results. This has the advantage that the computing expenditure, even though relatively low, has to be made only once. Additionally only specific transmitter-receivers have to be appropriately equipped. If knowledge of the distance not just between the cooperating transmitter-receivers is practical and desired, communication of the distance can likewise be done as a broadcast, for example (see 5.3.1). Additionally, calculation of the distance has to be performed only once.

9. Measures for Protecting and Increasing the Security of the Method

9.1 Authorising the Distance Measurement

The measurement of distances presupposes cooperating transmitter-receivers for the message exchange. The distance measurement may, however, be allowed or blocked depending on a specific situation. Blocking is necessary, for example, to guarantee the "private sphere" of a specific user group or to be able to control the traffic density of the transmission channel. The checking method in a transmitter-receiver which grants permission for distance measuring and thus approves the cooperation with another transmitter-receiver can be negotiated in advance or established from the start. Long-known methods of authentication are used in the checking process. Authentication may take place, for example, via station addresses, signatures, encrypted signatures or encrypted messages. Unique signatures and/or unique keys can be used to increase the security of the method. After successful one-sided or else mutual authentication the transmitter-receivers then cooperate in the individual steps, such as the message exchange and the exchange of measured data of the distance measurement (e.g. round and reply times). A simple option of integrating the checking process into the message exchange of the distance measurement is the use of encrypted messages which use a secret key known on both sides. Only if the encryption of a first data frame was successful at a transmitter-receiver does it send the second (encrypted) data frame, etc., until a message exchange is produced according to one of the multi-path methods used, for example.

9.2 Encrypted Transmission as Part of Determining Distance

The use of an appropriate encrypting method with high security also acts as protection of the private sphere and protection from listening in to data of the distance measurement. For example, long-known substitution and transposition methods and methods combined from them can be used. Long key lengths (at least 128 bits) and the use of unique keys guarantee appropriate protection of the method. The existing encryption method of a message protocol used for measuring the distance can be used for this. The following data can be exchanged for measuring the distance: transmitting and receiving times, reply and round time intervals, calculated pulse delay times or distances calculated from them. The data can be exchanged secretly between the cooperating transmitter-receivers or in specific applications also transmitted publicly, in order, for example, to give any transmitter-receiver the option of gathering knowledge about the distances between various other transmitter-receivers. This is practical, for example, when the items of distance information are to be distributed between the transmitter-receivers of a network as quickly and efficiently as possible. By using a secret but common key all the "dedicated" transmitter-receivers can listen in to this information. If no protection of this information is necessary they can also optionally be transmitted unencrypted.

9.3 Secret Reply Time Intervals

As illustrated in the methods of this invention, the reply times $T_{reply}$ must be known for calculation of the distance. For this purpose the ascertained, exact reply times or only the deviation from a fixed reply time is communicated to the cooperating transmitter-receiver for calculating the distance. The deviations from the fixed reply time are unavoidable in practical implementations and therefore allowed within certain tolerance limits. Establishing the tolerances of the reply time depends on the desired accuracy of the distance measurement and this in turn on the difference in the reply time intervals or their mean values. The reply time or its deviation may be transmitted encrypted and thus made inaccessible to a third transmitter-receiver, providing a certain protection of determining the distance. Since the reply time could however be known within certain tolerance limits, by a known generally valid definition in an implementation, for example, by dimensioning implementations with a previously unknown but permanently implemented reply time (e.g. the same type of integrated circuit) or by listening in to messages from transmitter-receivers with a known distance and subsequent correlation or calculation of the reply time, the distance could be successfully determined with a certain accuracy (e.g. correspond to ±100 ns tolerance of the reply time of a distance of a pulse off ±30 m to be overcome). If, in addition, the deviations are still evenly distributed, by listening in to the message exchange over a fairly long time period and subsequent averaging of the time measurements, the distance could again be determined with great accuracy (with knowledge of the implementation or listening in to the message exchange over a known distance the mean value of the reply time would likewise be known). Therefore, with this method the reply time is additionally changed by the user in even greater steps than those already caused by the tolerances in such a way that scattering of the reply time deviations takes place unevenly (asymmetrically to the mean value). It is possible for a secret reply time to be established or negotiated in a self-contained group of users and modified at any time. It is optionally possible to change the reply times according to a previously agreed plan. Additionally, the reply times can also be changed according to a random or pseudo-random pattern and this can then be made known to the cooperating station by encrypted communication. It is simply necessary to ensure that the reply time differences during a distance measurement are within the tolerance limits.

10. Measures for Improving the Compensation of Temperature and Supply Voltage Variations

10.1 Complementary Signal Pulses

Deviations in the carrier frequency in the transmitter from the selection frequency in the receiver can in specific modulation methods cause deviations in the time of arrival of the detected symbols. Since the transmitter-receivers are not synchronised in phase and frequency and for the method of this invention do not in fact have to be synchronised or mutually calibrated to one another, deviations in the frequencies of the transmitter-receivers (frequency offset effect) cannot be ruled out. The mixed frequencies derived from the carrier and selection frequencies can in practice be derived from a local reference frequency (crystal oscillator) and calibrated with good precision, but the reference frequencies are likewise subject to deviations (e.g. crystal tolerances). An advantage of this invention is the slight effect of the crystal tolerances, so that industrially available types of crystal can be used. This advantage must also not be cancelled out by the effect described here. Furthermore, changes of temperature in an implementation of a circuit, for example, (e.g. due to a change in the ambient temperature or self-heating) cause a slight change in the derived or calibrated mixed frequencies, which may lead to the significant changes in the time of arrival of the detected symbols. To compensate for this effect so-called complementary pulses are therefore used. The complementary pulses have the property of causing time deviations of the detected pulses with the same amount, but with opposite signs to one another. As complementary pulses it is possible to use, for example, monotonously rising and falling chirp pulses, which have an identical middle frequency and the same duration. With an equal number of detected complementary pulses the sum of the time deviations is therefore always zero. Since the various complementary pulses are normally used as different information symbols and data are represented by the information symbols, the distribution and the amount ratio of the complementary pulses to one another depends on the data information which is to be transmitted. Any data frame therefore consists of an unspecified amount ratio of the complementary pulses with unknown distribution. In averaging methods of this invention averaging of the times of arrival of a specific number of detected pulses takes place. If the complementary pulses are used it must additionally be guaranteed that equal averaging (of the times of arrival) of the complementary pulses takes place. This is achieved with this invention in that the various pulses are identified and the times of arrival are allocated to the appropriate pulses. By adding the same number of the respective times of arrival and dividing by the total number of times of arrival measured, the required equal averaging takes place and therefore compensation of the frequency offset effect. Since, as already explained, the distribution and the amount ratio of the complementary pulses depend on the information itself, this may turn out to be unfavourable for the equal averaging. This can, however, optionally be improved as part of this invention in that, before transmitting, the data are substituted according to a pseudo-random pattern and, after receiving, this substitution is reversed again (known as scrambling). In this way according to the invention better even distribution of information symbols and therefore different pulses is achieved. Scrambling is normally already present in existing message protocols, so it can be used jointly for this purpose. Additionally, the number of receiving times to be equally measured can also be adapted during operation of a transmitter-receiver, to achieve a high success rate of the equal averaging.

Achieving the required number can here be indicated to the user after receipt of a data frame, so that a new required number for the receipt of the next data frame can be reset.

10.2 Characterisation Tables and Functions

As long known, implementations of electronic circuits have the property of influencing the chronological behaviour of electrical signals depending on external conditions. Both influences which during the manufacture of a circuit implementation (e.g. integrated circuit) influence the properties thereof and changing influences during operation of the circuit implementation come under consideration. The influences during manufacture are known as specimen scatterings conditional on tolerance, while the external influences during operation have the effect of temperature and supply voltage dependency. In this way, at a specific temperature and supply voltage constant but different chronological delays may occur in the individual device specimens, which lead to significant deviations in measuring the receiving times of the pulses and therefore negatively impair the accuracy of the distance measurement.

This detail of the invention uses so-called characterisation tables and/or functions, which measure the influences of the temperature and supply voltage of a specimen for chronological behaviour or determine it in some other way. The characterisation tables and/or functions are in this case permanently allocated to a specimen and can be stored, for example, in the implementation (e.g. in the PROM/Flash memory of the integrated circuit or in the control software of the respective device). Additionally, the temperature and the supply voltage can be measured in the implementation and from the stored characterisation information precise delay times conditional on the circuit taken into consideration in the calculation of the pulse delay time and therefore of the distance. The characterisation information can in this case be gained uniquely during manufacture or in operation by a calibration process (e.g. by known distance of two transmitter-receivers) of the circuit implementations or devices and stored.

10.3 Use of Pairs of Transmitter-Receivers

The detail of this invention consists in compensation of the influences of temperature and supply voltage by ascertaining these influences over a known distance. Two transmitter-receivers with separate antennae in each case are installed in a device for measuring distance. The distance of the antennae from one another is known and from the calculated pulse transit time between the two transmitter-receivers and the actual distance the size of the delay times conditional on the circuit can be ascertained. The two transmitter-receivers are arranged in the device structurally in such a way and the device is spatially installed in such a way that they are exposed to the same ambient temperature. In addition the two transmitter-receivers are operated from the same supply voltage source (e.g. battery). By averaging the delay times conditional on the circuit, caused in the transmitter and in the receiver of the transmission path between the pair of transmitter-receivers and taking into account these delay times in determining an unknown distance from a pair of transmitter-receivers or individual transmitter-receivers, the delay times dependent on temperature and supply voltage can be compensated and thus the precision of the distance measuring further improved. Furthermore, this method is suitable for compensating the effects resulting from the multi-path propagation on the assumption that the influences of the multi-path propagation on the distance measurement between the transmitter-receivers of the pair with known distance are identical to transmitter-receivers with other, unknown distance. This option for compensating the multi-path propagation can be used primarily where the propagation properties of the medium between any positions of the transmitter/receivers are practically identical (e.g. in homogeneously enclosed spaces such as pipes, tunnels, factory halls, hangars, etc.).

11. Multiple Measurements

All the methods illustrated can also be used for multiple measurements of the round time intervals with subsequent averaging. The pulse transit times or distances ascertained are gathered and then arithmetically averaged.

$$T_{prop} = \frac{T_{prop1} + T_{prop2} + \ldots + T_{propn}}{n} \quad \text{Formula 41}$$

$$d = \frac{d_1 + d_2 + \ldots + d_n}{n} \quad \text{Formula 42}$$

Alternatively to this, the round and reply times can be accumulated and then divided by the number of measurements. Formula 43 shows the calculation of the accumulated round and reply times into an arithmetically averaged pulse transit time using the 3-path method.

$$T_{prop} = \frac{T_{roundA1} + T_{roundB1} + T_{roundA2} + T_{roundB2} + \ldots + T_{roundAn} + T_{roundBn}}{4n} - \quad \text{Formula 43}$$

-continued $$\frac{T_{replyA1} + T_{replyB1} + T_{replyA2} + T_{replyB2} + \ldots + T_{replyAn} + T_{replyBn}}{4n}$$

12. Use for Determining Distance Over Greater Distances

The method according to the invention aims at determining distance in a range of up to 10 km. However, it can also be used as part of a method for determining distances over greater distances.

The transmission range of a message transmission or maximum distance between two transmitter-receivers is limited for various reasons, whereby only distances up to a certain limit can be directly determined. The limitation of the transmission range arises mainly from legal specifications (e.g. maximum output power of the transmitter) and for technical and economic reasons (reasonably priced transmitter-receivers).

An increase in the transmission range of the distance measuring can be achieved in that in a network of transmitter-receivers shorter intermediate distances are measured, the intermediate distances are communicated to the transmitter-receiver of an end point of a longer distance measurement, where no direct message transmission would be possible between the end points, and there the intermediate results are calculated with a function to the total distance.

Various approaches to the conversion of this function can be used. A first simple option is to form the sum of the intermediate results for the total distance on the assumption that all the transmitter-receivers are in a straight line.

An extension of this option is to determine several sums which may arise because of different distances between the end points. Then, by comparing the sums, the smallest distance can be selected as the most accurate possible estimate. This method is more suitable in practice, since it is very unlikely for all the transmitter-receivers to be in a straight line.

The most accurate option for determining the distance over several transmitter-receivers is the use of lateration and angulation, known per se, for the calculation. Here the distances between the transmitter-receivers which allow unambiguous geometric imaging of the spatial arrangement of the end points and of required intermediate points are ascertained. The direct distance between the end points can then be calculated with the aid of lateration and angulation. The method can be applied both to arrangements of transmitter-receivers on a surface (two-dimensional) or in space (three-dimensional).

13. Utilising Standardised Message Protocols

Existing message protocols can be specifically utilised as part of this invention to improve accuracy, reliability and security of the distance measurement.

The method according to the invention enables the transmission of any application data and simultaneous distance measuring between two transmitter-receivers. On the other hand, the methods and mechanisms for data transmission established in the message protocols at the same time serve to improve the accuracy, reliability and security of the distance measurement.

The message protocols which can be used for the method are established, for example, in public standards of international organisations (e.g. IEEE), commercial interest associations (e.g. Bluetooth) or as private industrial standards (e.g. nanoNET). The general knowledge, distribution and presence of tried-and-tested, efficient methods and mechanisms in existing message protocols increase the acceptance of an integrated method for measuring distance and considerably simplify the spread of the methods and implementation thereof in practical forms (transmitter-receivers). Specific message protocol standards are sometimes prescribed for specific applications by the efforts of organisations. Because of the invention the distance measurement can be more easily integrated into these applications.

The agreements of layer ISO/OSI-1 (bit transmission layer, PHY) laid down in the standards, may, if suitable, be recycled. Layer ISO/OSI-2 (security layer, MAC/data link layer) is very useful to the method and there are enough suitable message protocols which enable integrated distance measurement unchanged. All the higher layers according to the ISO/OSI model can be used with the method, layer ISO/OSI-6 (presentation layer) serving the method particularly well.

This enables an efficient and integrated method which does not require any additional band width of the transmission channel for measuring the distance. Additionally, the circuit parts of an implementation which are necessary for data transmission are used at the same time for measuring the distance, thus enabling reasonably priced, power-saving transmitter-receivers.

Because of the recyclability of layers ISO/OSI-2 and above, existing standards can also easily be extended. This enables an efficient standardisation process, since in some circumstances only the bit transmission layer has to be re-established. Additionally, already existing knowledge and existing designs allow reasonably priced, time-saving extension of implementations with this method (design re-use). To optimise the method, specific layers of existing message protocols can be extended in such a way that the extension does not contradict the standard to date (e.g. extension of the set of commands of the link protocol manager of layer ISO/OSI-2). Downward compatibility with the already existing message protocols is maintained.

In the case of unrestricted recyclability of a standard including the bit transmission layer (e.g. the private industrial standard nanoNET) only an extension of the implementations (e.g. integrated circuits) is required. The already existing implementations can furthermore be used exclusively for data transmission.

13.1 Utilising Layer 2 Protocols

Message exchange according to the three- or/and n-path methods can be performed with a time slot method (time division multiple access, TDMA) of the security layer, in other words of layer 2 in the ISO/OSI reference model. Here message frames are exchanged between two cooperating transmitter-receivers at equidistant time intervals and the respective transmitting and receiving times are measured and from them the round and reply time intervals determined. The equidistant time intervals can be utilised to meet the demand for symmetry of the method according to the invention in respect of the reply time intervals.

Between the message frames additional message traffic may be allowed, for example the transmission of acknowledge packets as data packets on to the message frames used for the methods.

The message exchange according to the double-sided and multiply double-sided two-path method can be implemented with the widespread error correction protocol. In this case, as acknowledgement for correctly received data packets, acknowledge packets are sent back which generally have a preset interval from the data packets. The two packets act as a pair of message frames according to these methods. If the distances between the packets are constant during a measurement the demand for symmetry of this method is also met.

13.2 Use of Message Protocols for Exchanging the Measured Values

Exchange of the measured time values of the bit transmission layer (e.g. ascertained round and delay times) with the cooperating transmitter-receiver is necessary for calculating the distance. Additionally, the calculated distances can be exchanged with other transmitter-receivers.

The exchange of the data may take place between the security layers of the transmitter-receivers or else the time values are communicated as data of the application layer.

In the first variant the extension or introduction of a link protocol manager of the security layer is necessary. The link protocol manager enables, for example, control of the data flow of the application data on the level of the security layer or negotiation of the key used for the encoded data transmission. By defining new commands the transmission of the measured time values can be negotiated and transmission of the measured time values themselves can take place.

The link protocol manager can in some circumstances extend its set of commands in such a way that it remains downwardly compatible with the existing set of commands. This means that the use of transmitter-receivers which do not have the extended link protocol manager is still possible purely for data transmission without distance measurement.

In the variant of communicating the time values as data of the application layer the security layer can be used unchanged, though allocation of the message frames of the security layer to the measured time values of the bit transmission layer up to and including the application layer has to be maintained. Since according to the ISO/OSI model there are additional layers between the application layer and the security layer and in these layers buffering and fragmentation of message frames may be carried out, allocation of measured time values to the message frames of the application layer is not always unambiguous. This problem can be avoided in that the application layer is located directly on the security layer and therefore unambiguous allocation is maintained. This option is reserved mainly for very simple systems, which, for example, do not use a network layer (ISO/OSI-3) or a transport layer (ISO/OSI-4) or where specific properties of these layers are also integrated in a security layer which does not conform to ISO/OSI.

Alternatively the allocation may also be produced via so-called service interfaces, which enable a direct and chronologically unambiguous link between the application layer and the security layer.

13.3 Utilising Message Protocols to Protect and Secure Distance Measuring

The encryption and its supporting mechanisms (e.g. negotiating keys) of existing message protocols can be used to protect and secure the method. This comprises protection from listening in by encrypting the data which are exchanged with transmitter-receivers for measuring distance and protection from unauthorised use of the distance measurement. Authorisation for the use of distance measurement can be done with the authorisation and authentication mechanisms of the message protocols used.

The encryption can be performed in the different layers according to the ISO/OSI model. In practice encryption usually takes place in the security layer, in the presentation layer or in both layers at the same time. In most existing message protocols encryption is provided in the security layer (e.g. IEEE 802.11, WEP). Very efficient encryption methods are generally provided in the existing standards.

The authorisation and authentication mechanisms are usually in the presentation or security layers. They may additionally or alternatively be in any other layer of the message protocol used or in the application layer.

Use of the encryption and the authorisation mechanisms for measuring distance generally do not require any additional band width of the transmission channel. The devices do not have to be additionally built in practical implementations, as they are already there for transmission of the application data.

14. Embodiment Examples of Transmitter-Receivers

Various embodiment examples of transmitter-receivers according to the invention and their components are described using the figures described below.

14.1 Device with External Distance Calculation and Application Module

Figure 14:
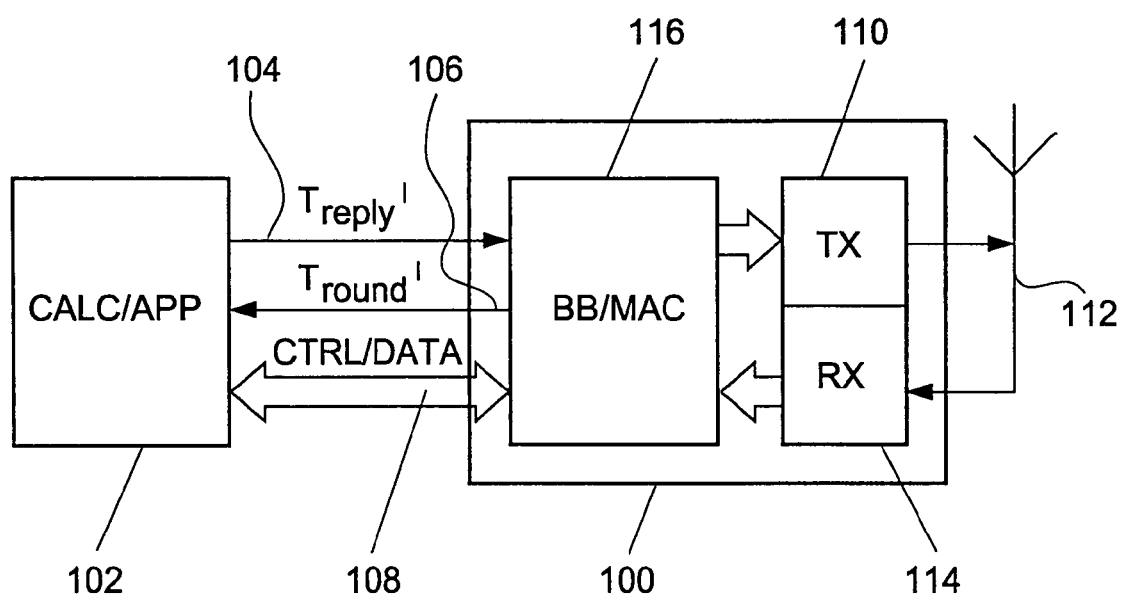
FIG. 14 shows using a block diagram an embodiment variant of a transmitter-receiver according to the invention implemented in an integrated circuit device with external distance calculation and application module.

In a first embodiment variant of a transmitter-receiver according to the invention illustrated in FIG. 14 several modules are combined in an integrated circuit device 100, also abbreviated to device, and implemented as an integrated circuit. An external CALC/APP module 102 is connected to the integrated device 100 via logical terminals $T_{reply}'$, $T_{round}'$ and CTRL/DATA 104, 106 and 108. The logical terminals may be combined in a joint serial or parallel user interface.

An analogue transmitter 110 (TX) modulates the signal pulses to be transmitted to a carrier frequency and passes them amplified to an external antenna 112. An analogue receiver 114 performs amplification, demodulation and detection of radio pulses irradiated on to the antenna 112.

A baseband/MAC module 116 (MAC=medium access controller) performs coding of data frames to be transmitted and decoding of received data frames consisting of a sequence of radio signal pulses.

The baseband/MAC module 116 also checks received data frames. By checking the data frames in the baseband/MAC module 116 the physical allocation of the received pulses to specific transmitter-receivers is secured and a reference point for measuring the round time intervals and generating the reply time is established, for example a pulse at the end of the frame. Furthermore, checking takes place using the data presented by the pulses, of which in turn the plausibility is checked using signatures, the integrity of the data is ensured by means of check sums and the identification is ensured using unambiguous transmitter-receiver addresses.

Optionally, for secure communication of the protocol and user data, including the information to be exchanged about the distance measurement between transmitter-receivers, the data in the baseband/MAC module 116 are encrypted and unencrypted. The baseband/MAC module 116 additionally controls access to the message channel used according to an agreed plan. Existing message protocols, such as e.g. public or private standards, can be used for this.

In the baseband/MAC module 116, after successful checking of a received first data frame, the generation of a second data frame to be transmitted, which is also designated as follow-up data frame, also further takes place. The follow-up data frame is transmitted after a precisely defined time delay, the reply time interval, relative to the receiving time of the first data frame. The reply time interval can be set and changed via a value applied to the terminal $T_{reply}'$ 104.

Furthermore, the round time interval between the transmitting time of a first data frame and the receiving time of the follow-up data frame is measured and a value output for this time via the terminal $T_{round}'$ 106.

The external CALC/APP module 102 exchanges control information with the baseband/MAC controller 116 via the terminal CTRL/DATA 108, transmits the protocol and useful data to be transmitted and received via this terminal and from the values for the round time intervals ($T_{round}$) and the reply times ($T_{reply}$) calculates the pulse transit times, from which in turn the distances between two communicating transmitter-receivers can be calculated. Applications of wireless data transmission and distance measurements can additionally be integrated in this module 102.

14.2 Integrated Distance Calculation Module

Figure 15:
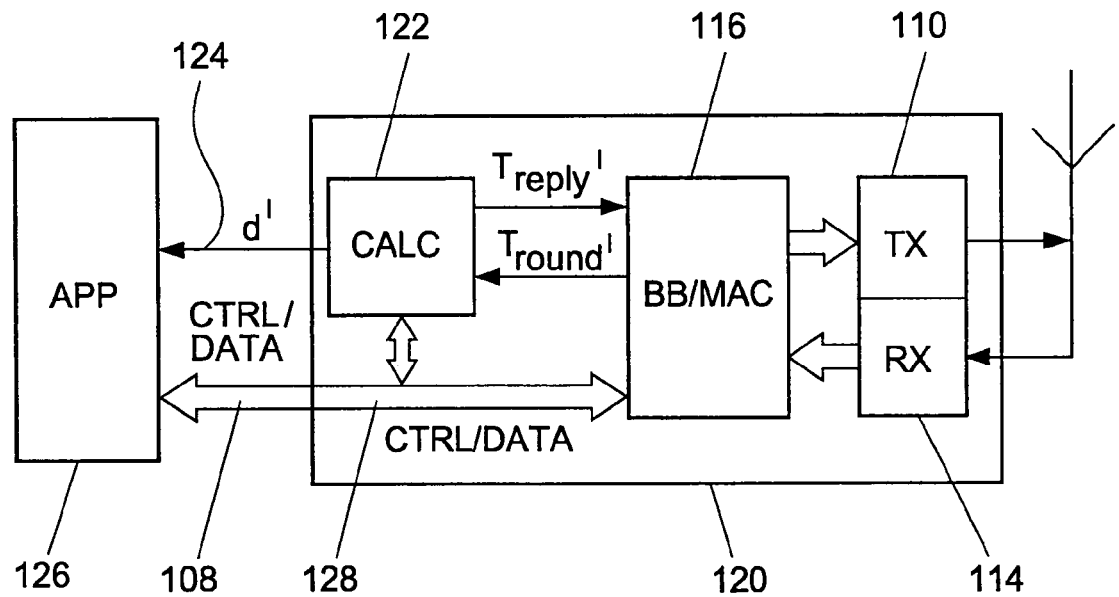
FIG. 15 shows in a block diagram an embodiment example of a transmitter-receiver with an integrated distance calculation module [distinguished].

FIG. 15 shows a further embodiment example of a transmitter-receiver which is distinguished by an integrated distance calculation module. The following illustration concentrates on differences in the transmitter-receiver of FIG. 15 compared with that in FIG. 14. The same reference symbols are used for modules of equal functional value to the embodiment example of FIG. 14.

In the embodiment variant illustrated in FIG. 15, in a device 120 a CALC module 122 is provided as integrated circuit in addition to the baseband/MAC module 116, the analogue transmitter 110 and the analogue receiver 114, for calculating the distance. In contrast to the first variant, the distance calculation is therefore integrated into device 120 in the present variant.

The function of the analogue transmitter and receiver module and the baseband/MAC module is identical to the first embodiment variant. The differences from the first variant are explained in greater detail below.

Via a terminal d' 124 values for the distance calculated in the CALC module 122 are communicated to an external application (APP) module 126. The APP module 126 exchanges control information and protocol and useful data with the baseband/MAC module 116 via the terminal CTRL/DATA 108. In addition the APP module 126 can set off the distance calculation in the CALC module 122 via terminal CTRL/DATA 108 or the distance calculation can be synchronised with the internal baseband/MAC module 116 via an internal bus CTRL/DATA 128.

In turn applications of wireless data transmission and distance measurement can additionally be integrated in the APP module 126. In the present second embodiment variant too the logical terminals d' 124 and CTRL/DATA 108 can be combined in a joint serial or parallel user interface.

14.3 Integrated Distance Calculation and Application Module

Figure 16:
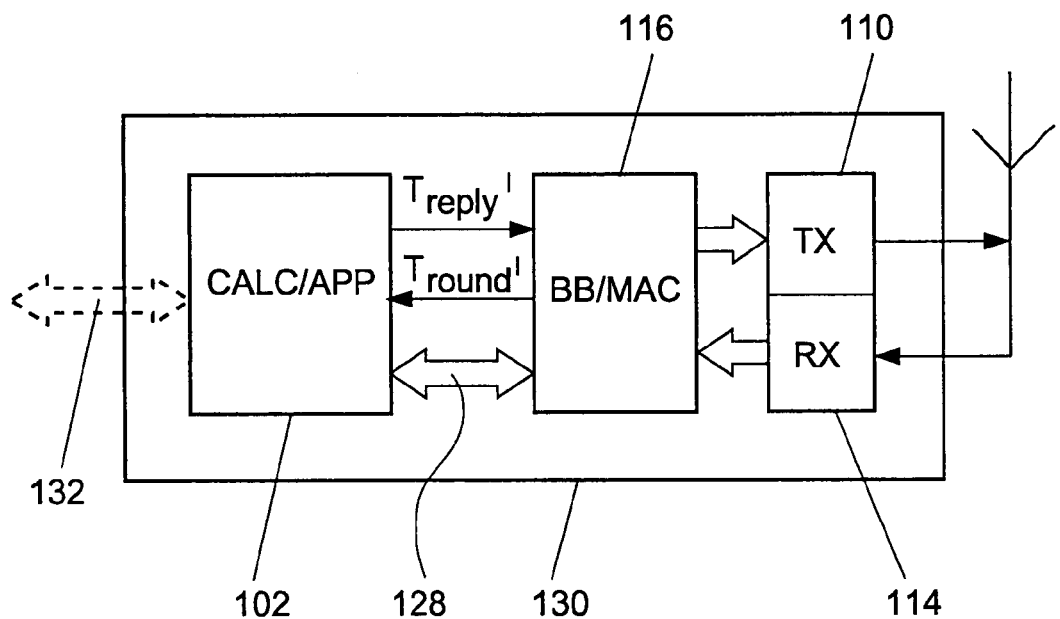
FIG. 16 shows in a block diagram an embodiment example of a transmitter-receiver which is distinguished by an integrated distance calculation and application module.

FIG. 16 shows a further embodiment example of a transmitter-receiver which is distinguished by an integrated distance calculation and application module. The following illustration concentrates on differences in the transmitter-receiver of FIG. 16 compared with that of FIGS. 14 and 15. The same reference symbols are used for modules of equal functional value to the embodiment examples of FIGS. 14 and 15.

In the embodiment variant of FIG. 16 the CALC/APP module 102 (FIG. 14) is implemented in a device as an integrated circuit 130 in addition to the baseband/MAC module 120, the analogue transmitter 110 and the analogue receiver 114.

There is optionally an external terminal 132 for the application control and the application data (e.g. man-machine user interface, terminal for sensors and actuators). The function of the analogue transmitter and receiver modules 110 and 114 and of the baseband/MAC module 116 is also identical to the first embodiment variant in this variant. The function of the integrated CALC/APP module 102 is likewise identical to the first embodiment variant.

Figure 17:
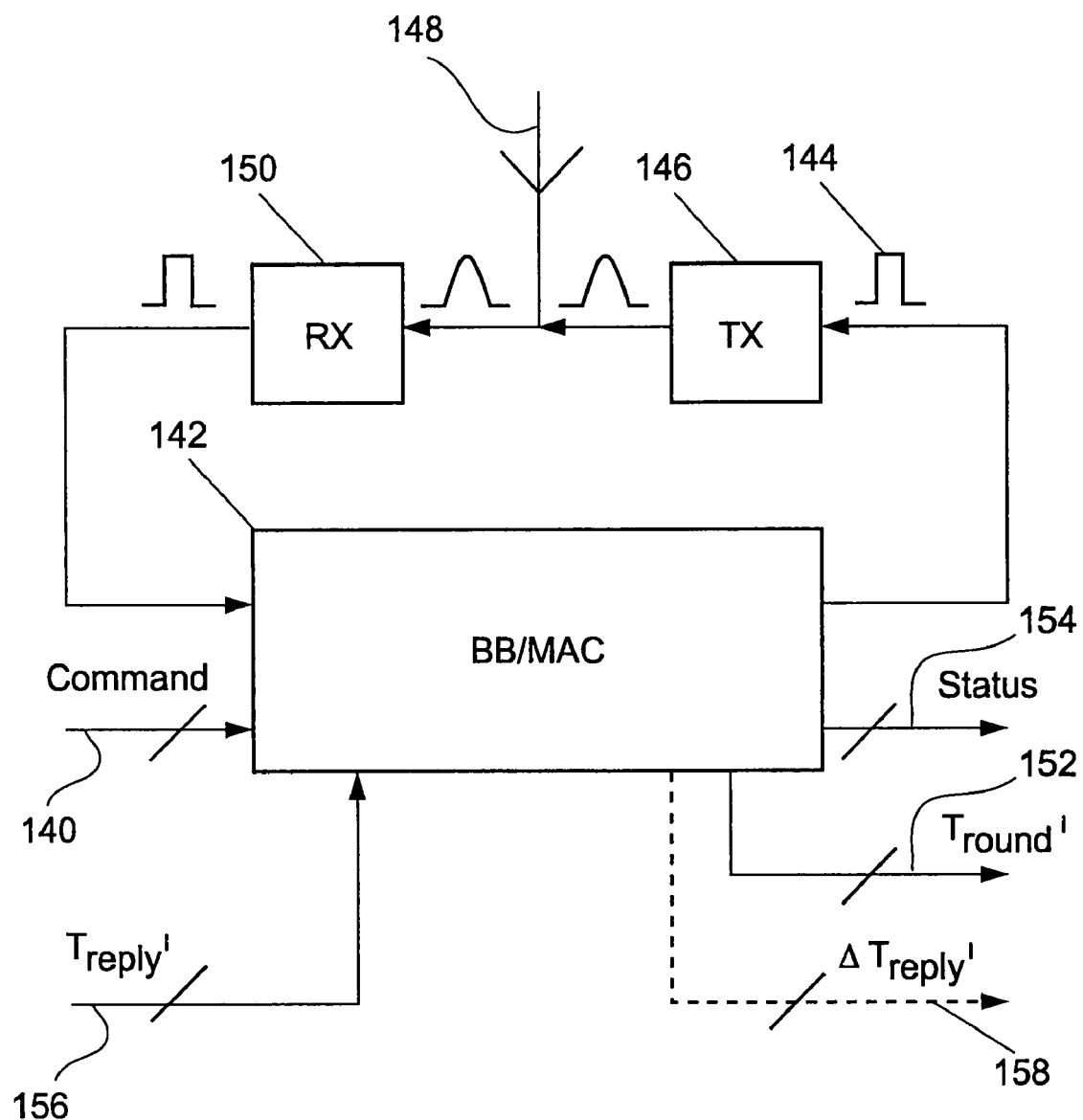
FIG. 17 shows in a block diagram an embodiment example of a transmitter-receiver with implementation of measurement of the round time interval and the reply time interval.

15. Implementation of Measuring the Round Time Interval and the Reply Time Interval In a general embodiment variant of a transmitter-receiver illustrated in FIG. 17 the generation of a message packet by coding protocol and useful data in the baseband/MAC module 142 into a sequence of digital pulses 144 is set off via a control input command 140. In the transmitter module 146 the pulses are modulated, amplified and emitted via the antenna 148.

Received pulses are likewise forwarded via the antenna 148 to the receiver module 150, there amplified, demodulated and detected at the time of the strongest signal of the pulses.

A sequence of digital pulses 144 is detected in the baseband/MAC module 142 as a data frame by decoding the protocol and useful data. The round time intervals from a respective transmitted first data frame to a respective received follow-up data frame are measured in the baseband/MAC module 142 and values for this time are output via a terminal $T_{round'}$ 152.

A status control output 154 indicates the validity of the values for the $T_{round'}$ terminal 152.

The reply time interval from a receiving time of a first data frame to the transmitting time of a follow-up data frame is established as a value via a $T_{reply'}$ terminal 156.

In a special embodiment variant a time difference between an actual reply time interval and a set reply time interval is additionally measured via the value applied to the $T_{reply'}$ terminal 154. In the special embodiment this time difference is conditional on the scanning error of the detected pulses between the receiver module 150 and the baseband/MAC module 142. Values for the time differences are output at a $\Delta T_{reply'}$ terminal 158 additionally provided in this special embodiment variant and the validity is indicated via the status control output 154.

16. Implementation of Control of the Round Time Measurement

Figure 18:
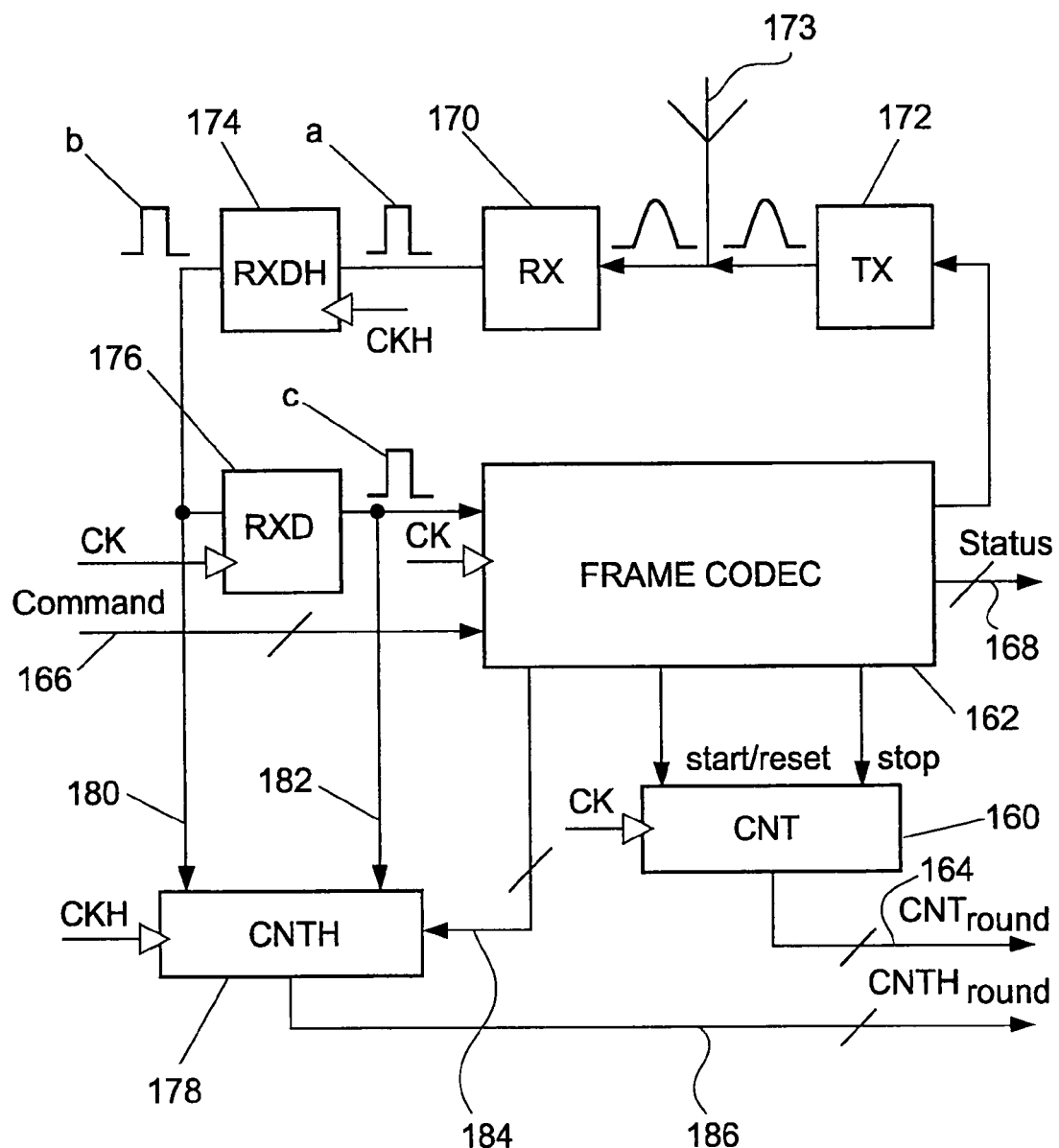
FIG. 18 shows in a block diagram an embodiment example of a transmitter-receiver which implements a measurement of the round time interval and additionally a measurement of the error of the round time interval.

FIG. 18 shows in a simplified block diagram a transmitter-receiver which implements a measurement of the round time interval. The transmitter branch of the transmitter-receiver of FIG. 18 comprises a transmitter module (TX) 172, which is connected on the input side to a module FRAME-CODEC 162 and on the output side to an antenna 173. The module FRAME-CODEC 162 is part of the above-described baseband/MAC module 116. The receiver branch of the transmitter-receiver of FIG. 18 comprises an analogue receiving module (RX) 170, which is connected on the input side to the antenna 173 and downstream of which digital modules RXDH 174 and RXD 176 are switched in the signal flow. Module RXD 176 is connected on the output side to an output of the module FRAME-CODEC 162.

The mode of functioning of the transmitter-receiver of FIG. 18 in the control of a round time measurement is described in greater detail below. Here measurement of the round time interval is done with a counter module 160, also designated as a CNT module 160. The CNT module 160 is likewise part of the above-described baseband/MAC module 116.

The counter module 160 is reset and started by the FRAME-CODEC module 162 when a first message frame is transmitted at the start of a signal round. The FRAME-CODEC module 162 likewise performs the coding of the data frame into a sequence of digital pulses.

After the data frame has been transmitted, the FRAME-CODEC module 162 waits for a second data frame from the receiver side, also designated as a follow-up data frame, in the form of a sequence of digital pulses. The counter module 160 is stopped after detection of a follow-up data frame and the counting value reached on stopping is after this applied unchanged to a CNTround terminal 64 of the counter module 160.

Decoding and checking the follow-up data frame is done by the FRAME-CODEC module 162 during or after receipt of the follow-up data frame.

The module FRAME-CODEC 162 here detects a reference time both for resetting and starting and stopping the counter module 160 using a predetermined reference point in the data frame. The time at which the round time measurement begins is derived from a reference point in the form of a specific pulse or a specific position in the message frame. This may be any position but uniform in all the message frames. It is advisable to use the detection time of the frame synchronisation generated by the FRAME-CODEC module 162. This reference point is available and unambiguous in all the message frames, both during transmitting and during receiving. This reference point is therefore also used for terminating the round time measurement.

Synchronisation with the distance calculating unit takes place via the control terminals command 166 and status 168. A new round time measurement is activated via the command control terminal 166 and the status control terminal 168 signals the presence and validity of the follow-up data frame and a new measured value for a round time interval CNTround.

In the present implementation the modules FRAME-CODEC 162 and CNT 160 are supplied with a joint clock CK and thus operate synchronously.

Below is explained in greater detail how the resolution of the measurement of the round time interval is improved with the circuit described by measuring and taking into account a scanning error. A pulse (a) detected by the analogue receiving module (RX) 170 is scanned in the RXDH module 174 with a clock CKH. The scanning error corresponds on statistical average to half the period duration of the clock applied at CKH. By scanning the detected and scanned pulse (b) in the RXD module 176 a further, though far greater time error arises, since clock CK has a considerably larger period duration than clock CKH. A better resolution of the round time interval is achieved by measuring and taking into account this time. In practice clock frequencies of c. 100-200 MHz with an accuracy of ±200 ppm are adequate, since this precision suffices owing to the special multi-path method of the present invention. The resolution can be further increased by the above-described dithering and averaging method.

In implementation of the measurement of the scanning error there are two embodiment variants. In a first embodiment variant a second counter module (CNTH) 178 is started by a pulse (b) scanned with clock CKH via a terminal 180. The delayed receiving pulse (c) scanned with clock CK effects stopping of the second counter module (CNTH) 178 via a terminal 182, the counting value of which is applied unchanged to a $CNTH_{Around}$ terminal 184 after the stoppage.

In a second alternative embodiment variant the second counter module (CNTH) 178 is started by the scanned and delayed receiving pulse (c) via a terminal 182. A subsequent detected pulse (b) scanned with clock CKH, effects stopping of the second counter module (CNTH) 178 via a terminal 180, the counting value of which is likewise applied unchanged to a $CNTH_{Around}$ terminal 186 after the stoppage.

Module FRAME-CODEC 162 can in this case activate measurement of the scanning error for a specific pulse or several pulses of a data frame or a specific position or in a specific time range of the data frame via a control connection 184. The control connection 184 additionally allows resetting of the second counter module 178.

Synchronisation with the distance calculation unit is done with the control terminals command 166 and status 168. Additionally, the status terminal 168 signals the presence and validity of a new measured value for the scanning error $CNTH_{Around}$ of the round time $T_{round}$. Calculation of the round time $T_{round}$ is done from the output values $CNTH_{Around}$ and $CNT_{round}$ of the counter modules and the periods of the clock frequencies at CK and CKH, additional delays conditional on the circuit having to be taken into account.

17. Implementation of a Control for Generating the Reply Time Interval

Figure 19:
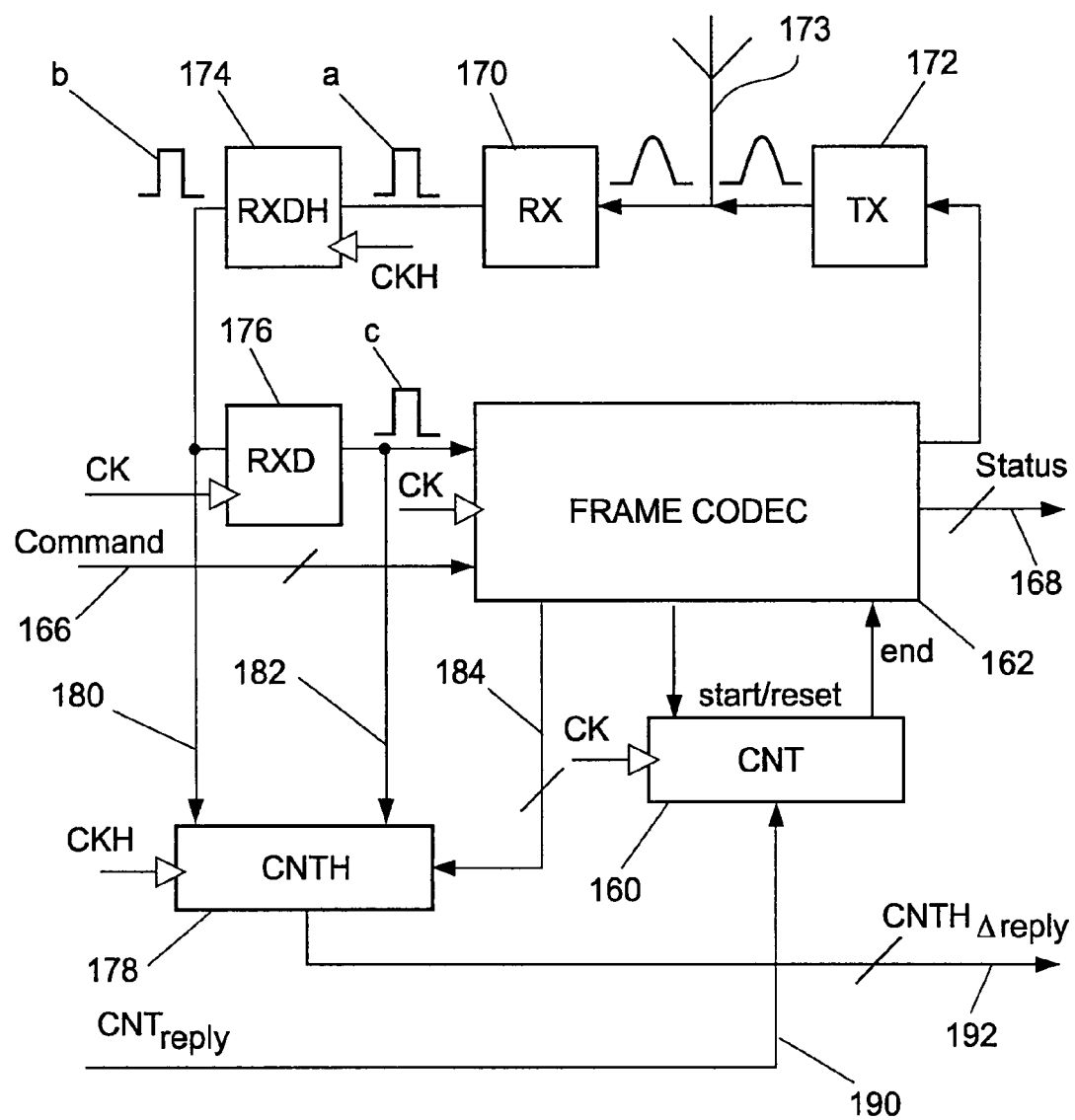
FIG. 19 shows in a block diagram an embodiment example of a transmitter-receiver which implements a control for generating the reply time interval and additionally measurement of the error of the reply time interval.

FIG. 19 shows a transmitter-receiver which implements a control for generating the reply time interval. In structure the transmitter-receiver of FIG. 19 is in many elements the same as that of FIG. 18. Therefore the same reference symbols are used here for modules which are the same as in FIG. 18.

However, as explained in greater detail below, FIG. 19 shows some inputs and outputs of the modules of the transmitter-receiver relevant to control of generating the reply time interval, which are not illustrated in FIG. 18. In reverse, FIG. 18 shows some inputs and outputs of the modules of the transmitter-receiver relevant for control of the round time measurement, which are not illustrated in the present FIG. 19. Functions implemented in the respective modules and explained in the preceding description of FIG. 18 and in the subsequent description of FIG. 19 are linked to the respective inputs and outputs.

Since the round time measurement and the reply time generation do not overlap chronologically, the implementations of FIGS. 18 and 19 can be combined into a joint circuit. A preferred embodiment example of a transmitter-receiver therefore implements a combination of the two embodiment examples of FIGS. 18 and 19 with one another.

In the transmitter-receiver of FIG. 19 generating the reply time is done with the CNT or counter module 160. Modules CNT 160 and FRAME-CODEC 162 here too are part of the baseband/MAC module 116 already explained above.

The counter module 160 is reset and started by the FRAME-CODEC module 162 when a request data frame is received at the start of a signal round. The FRAME-CODEC module 162 takes on decoding and checking the data frame consisting of a sequence of digital pulses during or after receipt.

The counter module 160 is stopped after a value for the reply time interval applied via a terminal $CNT_{reply}$ 190 has expired or been reached and transmitting of a reply data frame takes place, the FRAME-CODEC module 162 taking on the coding of the data frame into a sequence of digital pulses.

The module FRAME-CODEC 162 detects a predetermined reference point for resetting and starting the counter module 160 in the respective data frame after receiving a request data frame as part of a signal round from another transmitter-receiver. As already described, a uniform reference point at which the reply time generation begins is established in the data frame.

If, as already described, the time of the frame synchronisation is used for starting the counter module 160, the value $CNT_{reply}$ has to be appropriately shortened for the reply time interval, so that transmitting of the follow-up data frame can begin on time.

Decoding and checking the received request data frame must in any case be completed before the start of transmitting the follow-up data frame. This is guaranteed by appropriate dimensioning of the reply time and the use of appropriately fast decoding and checking circuits. If the checking has been successful and if the counter module 160 signals to the FRAME-CODEC module 162 the expiry of the reply time interval, a follow-up data frame is generated as a sequence of digital pulses.

Synchronisation with the distance calculation unit is done via the control terminals command 166 and status 168. The receipt of a data frame is allowed and generation of follow-up data frames activated via the command control terminal 166. The status control terminal 168 signals to the distance calculation unit that a data frame has been received and that, if checking it was successful, a follow-up data frame has been sent.

In the present implementation the module FRAME-CODEC 162 and the counter module 160 are supplied by a joint clock signal CK and thus operated synchronously.

Below will be explained in greater detail how the resolution of generation of the reply time interval is improved with the described circuit by measuring and taking into account a scanning error. A pulse (a) detected by an analogue receiving module (RX) 170 is scanned in an RXDH module 174 with a clock CKH. On statistical average the scanning error corresponds to half the period duration of the clock applied at CKH. By scanning the detected and scanned pulse (b) in the RXD module 176, a further, though considerably larger, time error arises, since clock CK has a considerably larger period duration than clock CKH. A better resolution of the actual reply time interval is achieved by measuring and taking into account this time. In practice clock frequencies of c. 100-200 MHz with an accuracy of ±200 ppm are adequate, since this precision suffices owing to the special multi-path method of the present invention. The resolution can be further increased by the above-described dithering and averaging method.

As in the embodiment example of FIG. 18, in the implementation of the measurement of the scanning error there are two embodiment variants. In a first embodiment variant a second counter module (CNTH) 178 is started via a terminal 180 by a pulse (b) scanned with clock CKH. The delayed receiving pulse (c) scanned with clock CK effects the stopping of the second counter module (CNTH) 178 via a terminal 182, the counting value of which is applied unchanged to a CNTH $\Delta_{reply}$ terminal 184 after the stoppage.

In a second alternative embodiment variant the second counter module (CNTH) 178 is started by the scanned and delayed receiving pulse (c) via a terminal 182. A subsequent detected pulse (b) scanned with clock CKH effects the stopping of the second counter module (CNTH) 178 via a terminal 180, the counting value of which is likewise applied unchanged to a CNTH$\Delta_{reply}$ terminal 186 after the stoppage.

Module FRAME-CODEC 162 can in this case activate the measurement of the scanning error for a specific pulse or several pulses of a data frame or a specific position or in a specific time range of the data frame via a control connection 184. The control connection 184 additionally allows resetting of the second counter module 178.

Synchronisation with the distance calculation unit is done here in the case of reply time generation with the control terminals command 166 and status 168. Additionally, the status terminal 168 signals the presence and validity of a new measured value for the scanning error CNTH$\Delta_{reply}$ of the reply time $T_{reply}$. Calculation of the reply time $T_{reply}$ is done from the output value CNTH$\Delta_{reply}$ of the counter module, the applied value for the reply time $CNT_{reply}$ and the periods of the clock frequencies at CK and CKH, additional delays conditional on the circuit having to be taken into account.

18. Implementation of the Averaging

Figure 20:
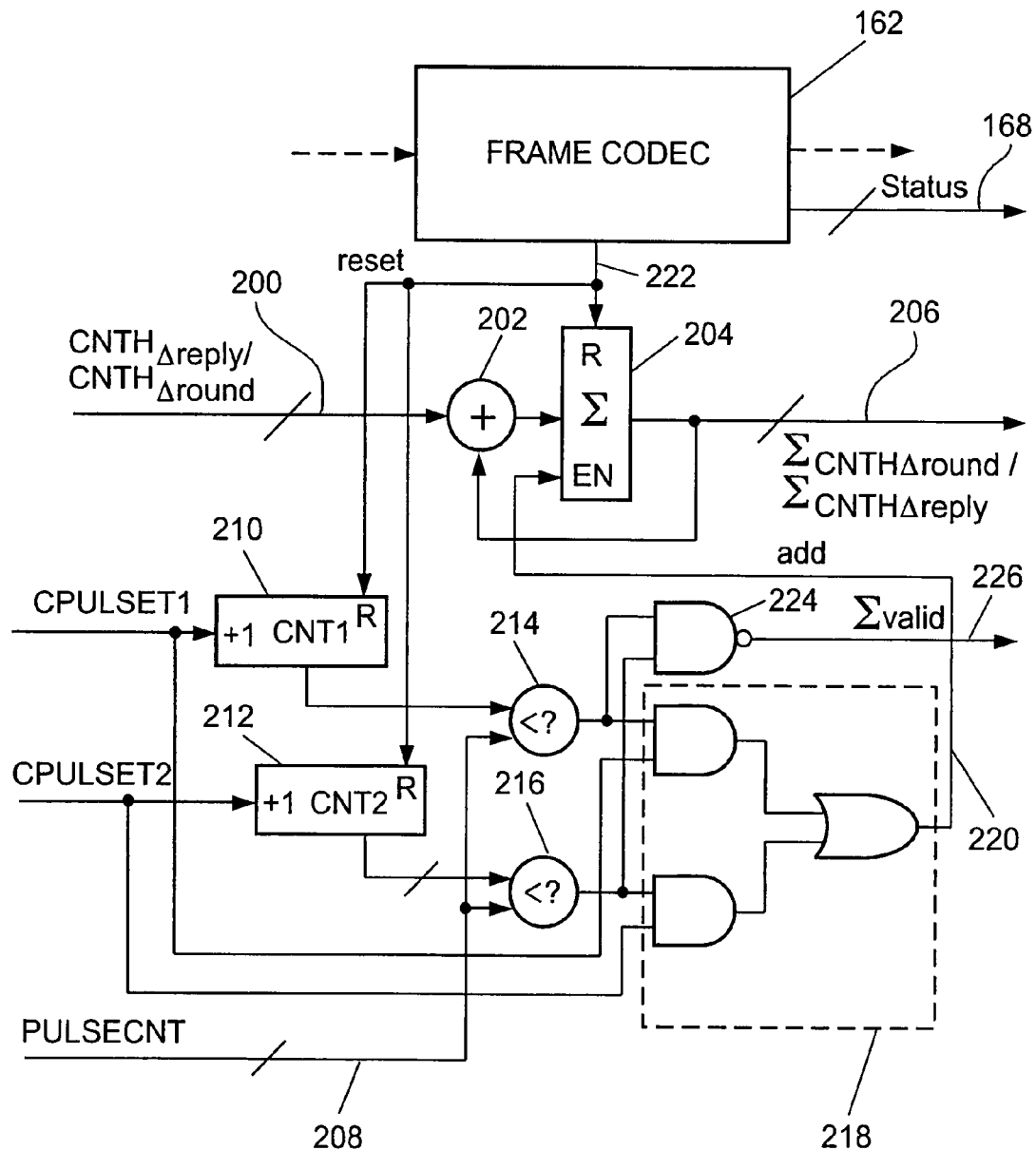
FIG. 20 shows a block diagram of a transmitter-receiver which implements an averaging method.

FIG. 20 shows a simplified block diagram of an embodiment example of a transmitter-receiver with implemented averaging. Only the modules essential for the averaging are illustrated in the figure.

Averaging is basically performed by firstly adding several time errors measured at a high resolution, which have arisen in the FRAME-CODEC module 162 from the scanning of received pulses of a data frame, and then dividing them by the number of added error values. The thus obtained error mean value is used for precise measurement of the round time interval and for exact determining of the reply time interval.

In the following description it is assumed that the transmitted data frames contain complementary chirp pulses. Averaging is carried out for the two complementary pulse types equally, in other words an equal number of the respective pulse types is taken into account. In this case the number of time errors to be added can be preset. The entire circuit is not very time-critical and can therefore be implemented at a reasonable price, since the addition has to be performed with the pulse frequency only (max. 10 MHz).

For time errors of detected pulses of a received data frame measured with high resolution the counter outputs CNTH$\Delta_{round}$ 192 of the round time measurement (cf. FIG. 18) or CNTH$\Delta_{reply}$ 186 of the reply time generation (cf. FIG. 19) are used. Depending on the situation, either output 192 or output 186 is conducted to a first input 200 of an adder 202. The result of the addition is written into a sum register 204 and is readable as a value at a $\Sigma$CNTH$\Delta_{round}$/$\Sigma$CNTH$\Delta_{reply}$ output 206.

The availability of the value contained in the sum register 204 is indicated by the FRAME-CODEC module 162 via its status terminal 168. The status information of the round time measurement and reply time generation can be used for this.

The number of values to be added is preset via a PULSECNT terminal 208. The number of values already taken into account is detected via counters CNT1 210 and CNT2 212 and compared with the number to be taken into account according to the value applied to the PULSECNT terminal in two comparators 214 and 216. If the required number has not yet been reached signals CPULSET1 and CPULSET2 form via a signal logic 218 a control signal (add) applied at its output 220 for adding up new counter outputs CNTH$\Delta_{round}$ or CNTH$\Delta_{reply}$ of the round time measurement or reply time generation.

Signals CPULSET1 (11) and CPULSET2 (12) correspond in each case to two detected different complementary pulses and are delayed in time, since the counter outputs CNTH$\Delta_{round}$ 192 and CNTH$\Delta_{reply}$ 186 are not available until a certain time after detection of the pulses.

Signals CPULSET1 and CPULSET2 mutually exclude one another, in other words do not occur simultaneously. Since the sum formation is redone for each data frame, the FRAME-CODEC module 162 has to reset the sum register 204 and the counters 210 (CNT1) and 212 (CNT2) with a control signal at the start of a new data frame via a control output 222.

A summation via the receiving times of an equal number of the respective pulse types is done by taking into account the identical number of pulses in each case via the counters CNT1 and CNT2. Whether the required equal number of complementary pulse types has been taken into account is indicated via a $\Sigma$valid terminal 226 with the aid of a NAND gate 224, to the inputs of which the outputs of the two comparators 214 and 216 are conducted.

To calculate the round and reply time intervals the calculated sums at the $\Sigma$CNTH$\Delta_{round}$/$\Sigma$CNTH$\Delta_{reply}$ terminal 206 must be divided in advance by the sum of the added values.

The appropriate calculation means are not illustrated in FIG. 20. They can be provided as a processing module in the transmitter-receiver or as an external module, e.g. in the form of a software module of a microcontroller externally connected to the transmitter-receiver.

Calculation of the averaged receiving time of the message frames forming the basis of the round and reply time is done according to the following formulae:

$$\Delta T_{roundAVG} = \frac{1}{2 \cdot n_{PULSECNT} \cdot f_{CKH2}} \sum_{CNTH\Delta_{round}} \quad \text{Formula 44}$$

$$\Delta T_{replyAVG} = \frac{1}{2 \cdot n_{PULSECNT} \cdot f_{CKH2}} \sum_{CNTH\Delta_{reply}} \quad \text{Formula 45}$$

19. Calculation of the Round and Reply Time Intervals

The way round and reply time intervals are calculated is explained below with reference to FIGS. 18 to 20.

Calculation of the round time intervals is done with the aid of the counter output $CNT_{round}$ at output 164 of counter 160 and the averaged scanning error of the round time $\Delta_{Tround\ AVG}$, delays in the transmitter and receiver circuits $T_{Tx}$ and $T_{Rx}$ conditional on the circuit additionally having to be taken into account. Depending on the implementation variant used, the averaged scanning error of the round time $\Delta_{Tround\ AVG}$ has to be added or subtracted according to the following formula.

$$T_{round} = \frac{1}{f_{CK}} CNT_{round} + k\Delta T_{roundAVG} + T_{TX} + T_{RX}; \quad \text{Formula 46}$$
$$k = -1,1$$

Calculation of the reply time intervals is done with the applied value for $CNT_{reply}$ at terminal 190 and the averaged scanning error of the reply time $\Delta_{Treply\ AVG}$, the delays in the transmitter and receiver circuits $T_{TX}$ and $T_{RX}$ conditional on the circuit additionally having to be taken into account. Depending on the implementation variant used, the averaged scanning error of the reply time $\Delta_{Treply\ AVG}$ has to be added or subtracted.

$$T_{reply} = \frac{1}{f_{CK}} CNT_{reply} + k\Delta T_{replyAVG} + T_{TX} + T_{RX}; \quad \text{Formula 47}$$
$$k = -1,1$$

What is claimed is:

1. Method for determining the spatial distance between two transmitter-receivers within a distance range in the order of magnitude of 10 km,
  in which both transmitter-receivers set off respectively at least one signal round, a signal round comprising the following steps:
  transmitting at least one request data frame, containing a sequence of at least two signal pulses with a predetermined pulse time interval, from a first transmitter-receiver setting off the signal round to a second transmitter-receiver at a request transmitting time ($T_{TA1}$, $T_{TB2}$),
  receiving the request data frame at the second transmitter-receiver at a request receiving time ($T_{RB1}$, $T_{RA2}$),
  transmitting a reply data frame, containing a sequence of at least two signal pulses with a predetermined pulse time interval, from the second transmitter-receiver to the first transmitter-receiver at a reply transmitting time ($T_{TB1}$, $T_{TA2}$), which has a respective reply time interval ($T_{replyB1}$, $T_{replyA2}$) from the request receiving time ($T_{RB1}$, $T_{RA2}$), and detecting the respective reply time interval,
  receiving the reply data frame at the first transmitter-receiver setting off the signal round and detecting a reply receiving time ($T_{RA1}$, $T_{RB2}$), allocated to the receipt of the reply data frame, relative to the request transmitting time ($T_{TA1}$, $T_{TB2}$),
  at which an evaluation is carried out comprising the following steps:
  ascertaining a round time interval ($T_{roundA1}$, $T_{roundB2}$) between the respective request transmitting time ($T_{TA1}$, $T_{TB2}$) and the respective reply receiving time ($T_{RA1}$, $T_{RB2}$) for each signal round, this step being able to be performed at any time after the relevant signal round,
  ascertaining a signal transit time ($T_{prop}$) between the two transmitter-receivers using the ascertained round time intervals ($T_{roundA1}$, $T_{roundB2}$) and the reply time intervals ($T_{replyB1}$, $T_{replyA2}$) and
  ascertaining the spatial distance between the first and second transmitter-receivers by multiplying the signal transit time ($T_{prop}$) (by a previously known propagation speed of the signal pulses,
  and in which the signal rounds are performed in such a way that the reply time intervals ($T_{replyA2}$, $T_{replyB1}$) are either identical or have a difference, in the case of performing more than one signal round set off by each transmitter-receiver an average difference, the amount of which is a maximum of 200 microseconds.

2. Method according to claim 1, in which the signal rounds are performed in such a way that the reply time intervals ($T_{replyA2}$, $T_{replyB1}$) are either identical or have a difference, in the case of performing of more than one signal round set off by each transmitter-receiver an average difference, the amount of which is a maximum of 20 microseconds.

3. Method according to claim 1, in which the second transmitter-receiver does not set off a signal round until it has sent the reply data frame to the first transmitter-receiver.

4. Method according to claim 3, in which
  each transmitter-receiver sets off at least two signal rounds, until the distance between the first and the second transmitter-receivers has been passed through by a number of request and reply data frames which is at least eight and a multiple of four,
  additional round time intervals $T_{roundAi}$, with i=3, 5, 7, ..., (n−2) from $T_{roundA3}$ to $T_{roundA(n-2)}$, to the signal rounds set off by the first transmitter-receiver are determined, n>3 being an uneven number, and
  additional round time intervals $T_{roundBk}$, with k=4, 6, 8, ..., (n−1) from $T_{round4}$ to $T_{roundB(n-1)}$, to the signal rounds set off by the second transmitter-receiver are ascertained,
  wherein reply time intervals $T_{replyAk}$, k=2, 4, 6, 8, ..., (n−1) from $T_{replyA2}$ to $T_{replyA(n-1)}$, and $T_{replyBi}$, i=1, 3, 5, 7, ..., (n−2) from $T_{replyB1}$ to $T_{replyB(n-2)}$ occur, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

the amount of which is a maximum of 20 microseconds.

5. Method according to claim 4, in which the signal transit time Tprop is ascertained according to the formula $$T_{prop} = \frac{\begin{array}{c}(T_{roundA1} - T_{replyB1} + T_{roundB2} - T_{replyA2} + \ldots + \\ T_{roundA(n-2)} - T_{replyB(n-2)} + T_{roundB(n-1)} - T_{replyA(n-1)})\end{array}}{(2(n-1))}$$

$$n = 2k + 1, k \in N > 1$$

6. Method according to claim 1, in which, on transmitting the reply data frame, the second transmitter-receiver simultaneously sets off a signal round, the reply data frame, allocated to a first signal round set off by the first transmitter-receiver, simultaneously constituting the request data frame of a second signal round set off by the second transmitter-receiver.

7. Method according to claim 6, in which
each transmitter-receiver sets off at least two signal rounds, until the distance between the first and second transmitter-receivers has been passed through by an uneven number n>3 of request and reply data frames, all the additional round time intervals being ascertained and all the additional reply time intervals detected,
after repeated performance of the first signal round step sequence additional round time intervals $T_{roundAi}$ with i=3, 5, 7, . . . , (n−2), from $T_{roundA3}$ to $T_{roundA(n-2)}$ are ascertained and
after repeated performance of the second signal round step sequence additional round time intervals $T_{roundBk}$, with k=4, 6, 8, . . . , (n−1), from $T_{roundB4}$ to $T_{roundB(n-1)}$ are ascertained,
wherein reply time intervals $T_{replyAk}$, k=2, 4, 6, 8, . . . , (n−1) from $T_{replyA2}$ to $T_{replyA(n-1)}$, $T_{replyBi}$, i=1, 3, 5, 7, . . . , (n−2) from $T_{replyB1}$ to $T_{replyB(n-2)}$ occur, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

the amount of which is a maximum of 20 microseconds.

8. Method according to claim 1 in which both transmitter-receivers set off precisely one signal round and the signal transit time $T_{prop}$ is determined according to the formula $$T_{prop} = \frac{T_{roundA1} - T_{replyB1} + T_{roundB2} - T_{replyA2}}{4}.$$

9. Method according to claim 1, in which as part of the evaluation either only the first or only the second transmitter-receiver ascertains the spatial distance and the other transmitter-receiver communicates to it in advance the round time interval ascertained on the part of the other transmitter-receiver and the reply time interval which has occurred on the part of the other transmitter-receiver.

10. Method according to claim 1, in which both transmitter-receivers ascertain the spatial distance and the round time intervals ascertained in each case and the reply time intervals which have occurred are communicated in advance by the first to the second transmitter-receiver and by the second to the first transmitter-receiver.

11. Method according to claim 1, in which a third transmitter-receiver ascertains the spatial distance between the first and second transmitter-receivers and the first and second transmitter-receivers transmit the ascertained round time intervals and reply time intervals in advance alternatively or additionally to the third transmitter-receiver.

12. Method according to claim 1, in which the communicated request data frames and reply data frames contain more than two signal pulses and the receiving times of more than two signal pulses of a respective request or reply data frame are detected on the part of a respective receiver.

13. Method according to claim 12, in which the respective transmitter of a request or reply data frame transmits signal pulses of the data frame at transmitting times which are delayed relative to a time grid defined in the data frame to be transmitted by the pulse time interval predetermined on the transmitter side in such a way that the signal pulses are on average transmitted at the grid times preset by the time grid.

14. Method according to claim 12, in which the respective receiver of a request or reply data frame delays signal pulses of the received data frame relative to a time grid, defined by the pulse time interval of the received signal pulses, in such a way that the delayed signal pulses are received on average with the pulse time interval predetermined on the transmitter side.

15. Method according to claim 14, in which scattering of the time delay of a signal pulse of the data frame on the part of the transmitter or the receiver, or in which the scattering of the sum of the time delays of a signal pulse on the part of the transmitter and the receiver is greater than the accuracy of a time measurement on the part of the receiver.

16. Method according to claim 14, in which at the respective receiver of a data frame the receiving times of a plurality of signal pulses contained in a received request or reply data frame are detected and stored relative to a time grid, defined by the pulse time interval of the received signal pulses and an agreed reference point in the request or reply data frame.

17. Method according to claim 16, in which the receiving transmitter-receiver in each case ascertains an average receiving time in respect of the time grid after the receiving times of the signal pulses have been detected.

18. Method according to claim 14, in which the respective receiver restarts a clock generator or oscillator which it uses to determine receiving times after determination of a request or reply receiving time and before subsequent determination of a next request or reply receiving time.

19. Method according to claim 18, in which the respective receiver modulates a clock generator or oscillator which it uses to determine transmitting and/or receiving time of the signal pulses in frequency according to a pseudo-random sequence during receipt of a request or reply data frame.

20. Method according to claim 1, in which the receiving transmitter-receiver of a signal pulse in each case ascertains the time at which a detected signal pulse has a maximum signal amplification or a maximum value of a correlation with a predetermined signal pattern.

21. Method according to claim 1, in which, if there is a pulse sequence in the receiving signal traceable to multi-path propagation of a single signal pulse, the respective receiver of a request or reply data frame ascertains as receiving time of the signal pulse the earliest time within a predetermined window of time in which the receiving signal adopts a maximum value.

22. Method according to claim 1, in which the first and second transmitter-receivers agree the values of the reply time intervals ($T_{replyAk}$, $T_{replyBi}$) before transmitting a reply data frame.

23. Method according to claim 22, in which the first and second transmitter-receivers transmit secretly encrypted messages to one another during agreement of the reply time intervals or the sequence of reply time intervals.

24. Method according to claim 1, in which the first and second transmitter-receivers perform the method multiple times and before transmitting the first request data frame of the first performance agree a sequence of different values of reply time intervals and in subsequent performances in each case adhere to the next preset reply time interval in the sequence.

25. Method according to claim 1, in which the first and second transmitter-receivers vary the reply time interval as a function of an unknown pseudo-random numerical sequence.

26. Method according to claim 1, in which the first and the second transmitter-receivers measure the reply time interval they have used and the measured reply time intervals are enlisted in the evaluation for determining the distance.

27. Method according to claim 1, in which the signal pulses used for determining the distance are simultaneously used as information symbols.

28. Method according to claim 1, in which the request data frames and reply data frames transmitted between the first and second transmitter-receivers obey a transmission protocol of layer 2 of the OSI reference model.

29. Method according to claim 1, in which the signal pulses are chirp pulses.

30. Method according to claim 29, in which two complementary types of chirp pulses are used which have an identical middle frequency and pulse duration, but by comparison with the two complementary chirp pulse types have a contradirectional frequency response, which is symmetrical about the middle frequency, rising in the case of one chirp pulse type and falling in the case of the other chirp pulse type, during the pulse duration, the same number of complementary chirp pulse types being used in a request or reply data frame in each case for determining the distance.

31. Method according to claim 1, in which a calibration run is performed in that, before a first signal round as part of the distance determination from the other transmitter-receiver in each case, the first or the second or both transmitter-receivers perform at least one pair of signal rounds for determining the distance from one or from one each of the calibrating transmitter-receivers arranged at a previously known distance from the respective transmitter-receiver and additionally uses a reply time interval known to or to be communicated to the respective transmitter-receiver in each case, in which the thus ascertained and the previously known spatial distance from the calibrating transmitter-receiver are compared and in which the result of the comparison is used for error correction as part of the subsequent distance determination.

32. Method according to claim 31, in which during the performance of distance determination or at a time interval in the order or magnitude of one second before or afterwards either a current temperature at the site of a respective transmitter-receiver or a current supply voltage of a respective transmitter-receiver or both the current temperature and the current supply voltage are ascertained.

33. Method according to claim 32, in which before or during performance of the calibration run the first or the second or both transmitter-receivers store the result of the comparison to ascertain error data characteristic of the respective transmitter-receiver either as a function of the temperature at the site of a respective transmitter-receiver or as a function of the current supply voltage of a respective transmitter-receiver or as a function of both said parameters, enlist the ascertained error data to determine an error correction function dependent on the temperature and supply voltage individual to the respective transmitter-receiver or an appropriate error correction table for distance values stored in the respective transmitter-receiver, and in which distance values ascertained as part of a subsequent distance determination are corrected by applying the error correction function or by enlisting a correction value contained in the error table.

34. Method according to claim 1, in which determining the distance is repeated after a predeterminable or dynamically changeable measuring time interval and by forming a difference in interval of distance values ascertained in succession between the first and second transmitter-receivers and subsequent forming of a quotient of the difference in distance and the measuring time interval the speed of the transmitter-receivers relative to one another is ascertained.

35. Method according to claim 34, in which two speed values are ascertained with a predeterminable or dynamically changeable interval between speed and measuring time and by forming a speed difference of speed values ascertained in succession and subsequent forming of the quotient of the speed difference and the measuring time interval the acceleration of the transmitter-receivers relative to one another is ascertained.

36. Method according to claim 34, in which the number of signal rounds set off is chosen additionally as a function of a predetermined upper limit of the time duration of performing the distance determination.

37. Method according to claim 1, in which the number of signal rounds set off in each case is chosen as a function of a predetermined accuracy of the distance determination.

38. Method for determining the position of a first transmitter-receiver relative to at least one second transmitter-receiver within a distance range in the order of magnitude of 10 km, in which for determining the distance between the first and the second or every other transmitter-receiver a method according to claim 1.

39. Method according to claim 1, with a step of ascertaining a clock generator error of both transmitter-receivers in the evaluation step, in which a subsequent distance determination relating to at least one of the two transmitter-receivers, comprises only one single signal round set off by one of the transmitter-receivers and one evaluation step, and in which in the evaluation step of the subsequent distance determination a corruption of a distance value provisionally ascertained on the basis of the single signal round is worked out on the basis of the previously ascertained clock generator error of the relevant transmitter-receiver for ultimate ascertainment of the distance value.

40. Transmitter-receiver for determining the spatial distance from a second transmitter-receiver within a distance range in the order of magnitude of 10 km comprising:

a transmitting unit, configured
to set off at least one first signal round by transmitting a respective first request data frame, containing a sequence of at least two signal pulses with a predetermined pulse time interval, at a first request transmitting time ($T_{TA1}$, $T_{TB2}$) to a second transmitter-receiver, a receiving unit configured
to monitor the receipt of a first reply data frame sent in reply to the first request data frame from the second transmitter-receiver and to ascertain a first reply receiving time ($T_{RA1}$) relative to the first request transmitting time ($T_{TA1}$,) allocated to the receipt of the first reply data frame, the transmitting unit being additionally configured,
after receipt of a second request data frame from the second transmitter-receiver setting off a second signal round, to transmit a second reply data frame, containing a sequence of at least two signal pulses with a predetermined pulse time interval, with a reply time interval ($T_{replyA2}$) of an allocated second request receiving time ($T_{RA2}$) of the second request data frame to the second transmitter-receiver, after receipt of a first request data frame from a second transmitter-receiver setting off a first signal round, to transmit a first reply data frame, containing a sequence of at least two signal pulses with a predetermined pulse time interval, with a reply time interval ($T_{replyB1}$) relative to an allocated first request receiving time ($T_{RB1}$) of the first request data frame to the second transmitter-receiver and on receipt of the first request data frame from the second transmitter-receiver to set off a second signal round by transmitting a second request data frame, containing a sequence of at least two signal pulses with a predetermined pulse time interval, to the second transmitter-receiver at a second request transmitting time ($T_{TB1}$), the receiving unit additionally being configured,
to monitor the receipt of a second reply data frame sent from the second transmitter-receiver in reply to the second request data frame and to ascertain a second reply receiving time ($T_{RB2}$) relative to the second request transmitting time ($T_{TB2}$) allocated to the receipt of the second reply data frame, and the transmitter-receiver being configured to transmit the first and the second reply data frames with a predetermined value of the reply time interval relative to the respective request receiving time with a chronological precision, at which the reply time intervals ($T_{replyA2}$, $T_{replyB1}$) on the part of the first and second transmitter-receivers in the signal rounds are either identical or have a difference, in the case of performing more than one signal round set off by each transmitter-receiver an average difference, the amount of which is a maximum of 200 microseconds.

41. Transmitter-receiver according to claim 40, wherein the transmitter-receiver is designed to transmit the first and second reply data frames with a predetermined value of the reply time interval relative to the respective request receiving time with a chronological precision with which the reply time intervals ($T_{replyA2}$, $T_{replyB1}$) on the part of the first and second transmitter-receivers in the signal rounds are either identical or have a difference, in the case of performing more than one signal round set off by each transmitter-receiver an average difference, the amount of which is a maximum of 20 microseconds.

42. Transmitter-receiver according to claim 40, with an evaluation unit which is connected to the transmitting and receiving unit and is designed to ascertain a round time interval ($T_{roundA1}$ $T_{roundB2}$) between the request transmitting time ($T_{TA1}$, $T_{TB2}$) of a request data frame transmitted by the transmitting unit and the reply receiving time ($T_{RA1}$, $T_{RB2}$) of a reply data frame received from the second transmitter-receiver.

43. Transmitter-receiver according to claim 42, which is designed to repeat the distance determination after a predeterminable or dynamically changeable measuring time interval and in which the evaluation unit is designed by forming a difference in distance of distance values ascertained in succession between the first and second transmitter-receivers and subsequent forming of a quotient of the difference in distance and the measuring time interval to ascertain the speed of the transmitter-receivers relative to one another.

44. Transmitter-receiver according to claim 42, which is designed to ascertain two speed values with a predeterminable or dynamically changeable interval between speed and measuring time and in which the evaluation unit is designed to ascertain the acceleration of the transmitter-receivers relative to one another by forming a difference in speed between speed values ascertained in succession and subsequent forming of the quotient of the difference in speed and the measuring time interval.

45. Arrangement for determining the spatial distance between a first transmitter-receiver and a second transmitter-receiver each according to claim 42 within a distance range in the order of magnitude of 10 km.

46. Arrangement according to claim 45, in which the first and second transmitter-receivers are designed,
to perform the first and second signal rounds at least twice until the distance between the first and second transmitter-receivers has been passed through by a number of request and reply data frames which is a multiple of four and to ascertain all the additional round time intervals and detect reply time intervals, the first and second transmitter-receivers being designed to use reply time intervals $T_{replyAk}$, k=2, 4, 6, 8, . . . , (n−1) from $T_{replyA2}$ to $T_{replyA(n-1)}$, and $T_{replyBi}$, i=1, 3, 5, 7, . . . , (n−2) from $T_{replyB1}$ to $T_{replyB(n-2)}$, which have an average difference according to the formula $$\Delta T_{ReplyAVG} = \frac{T_{replyA2} - T_{replyB1} + \ldots + T_{replyA(n-1)} - T_{replyB(n-2)}}{\frac{n-1}{2}}$$

the sum of which is a maximum of 20 microseconds,
and in which the evaluation unit of the first transmitter-receiver is designed,
after repeated performance of the first signal round step sequence, to ascertain additional round time intervals $T_{roundAi}$ with i=3, 5, 7, . . . , (n−2) from $T_{roundA3}$ to $T_{roundA(n-2)}$, n being an uneven number, and
the evaluation unit of the second transmitter-receiver is designed, after repeated performance of the second signal round step sequence, to ascertain additional round time intervals $T_{roundBk}$ with k=4, 6, 8, . . . , (n−1) from $T_{roundB4}$ to $T_{round)B(n-1)}$.

47. Arrangement according to claim 45, with at least one additional calibrating transmitter-receiver which is arranged at a previously known distance from the first or second transmitter-receiver and which uses a reply time interval known or to be communicated to the first or second transmitter-receiver in each case, in which the first or the second or both transmitter-receivers are designed to perform at least one pair of signal rounds for determining the distance from the calibrating transmitter-receiver before a first signal round as part of the distance determination from before a first signal round as part of the distance determination to the other transmitter-receiver in each case the other transmitter-receiver in each case, and in which the first or second transmitter-receiver is designed to compare the thus ascertained and the previously known spatial distance from the calibrating transmitter-receiver and to use the result of the comparison as part of the subsequent distance determination for error correction of the there ascertained distance value.

48. Arrangement according to claim 47, in which the first or the second transmitter-receiver or both transmitter-receivers are designed to measure either a current temperature at the site of a respective transmitter-receiver or a current supply voltage of a respective transmitter-receiver or both the current temperature and the current supply voltage during performance of a distance determination or at a time interval in the order of magnitude of one second before or afterwards.

49. Transmitter-receiver according to claim 40, in which the evaluation unit has a data connection to the second receiver and is additionally designed, to transmit a detected reply time interval ($T_{replyA2}$, $T_{replyB1}$) and an ascertained round time interval ($T_{roundA1}$, $Tr_{oundB2}$) to the second transmitter-receiver via the transmitting unit or to receive a detected reply time interval ($T_{replyA2}$, $T_{replyB1}$) and an ascertained round time interval ($T_{roundA1}$, $Tr_{oundB2}$) on the part of the second transmitter-receiver via the receiving unit and to ascertain a signal transit time $T_{prop}$ between the first and second transmitter-receivers using the ascertained round time interval(s) and the reply time intervals and to determine the spatial distance between the first and second transmitter-receivers by multiplying the signal transit time $T_{prop}$ by a previously known propagation speed of the signal pulses.

50. Transmitter-receiver according to claim 40, in which the transmitting unit is designed to send the second request data frame for setting off the second signal round to the second transmitter-receiver after the first reply data frame.

51. Transmitter-receiver according to claim 40, in which the transmitting unit is designed to transmit a combined request and reply data frame to the second transmitter-receiver at the second request transmitting time ($T_{TB1}$) with the predetermined reply time interval ($T_{replyB1}$, $T_{replyA2}$) relative to the first receiving time ($T_{RB1}$) of the first request data frame, which in a single data frame unites both the function of a first reply data frame and the function of a second request data frame, and in which the receiving unit is designed to monitor the receipt of a second reply data frame sent in reply to the combined request and reply data frame from the second transmitter-receiver and to detect a second reply receiving time ($T_{RB2}$) relative to the second request transmitting time allocated to the receipt of the second reply data frame.

52. Arrangement with two transmitter-receivers according to claim 51, in which each transmitter-receiver is designed to set off at least two signal rounds, until the distance between the first and second transmitter-receivers has been passed through by an uneven number n>3 of request and reply data frames and to ascertain all the additional round time intervals and detect reply time intervals, the first or second transmitter-receiver being designed, after repeated performance of the first signal round step sequence to ascertain additional round time intervals $T_{roundAi}$ with i=3, 5, 7, ..., (n-2), from $T_{roundB4}$ to $T_{roundB(n-2)}$ and after repeated performance of the second signal round step sequence to ascertain additional round time intervals $T_{roundBk}$, with k=4, 6, 8, ..., (n-1), from $T_{roundA3}$ to $T_{roundA(n-2)}$, the first and second transmitter-receivers being designed to use reply time intervals $T_{replyAk}$, k=2, 4, 6, 8, ..., (n-1) from $T_{replyA2}$ to $T_{replyA(n-1)}$, $T_{replyBi}$, i=1, 3, 5, 7, ..., (n-2) from $T_{replyB1}$ to $T_{replyB(n-2)}$, which have an average difference according to the formula, $$\Delta T_{ReplyAVG} = \frac{T_{replyA2} - T_{replyB1} + \ldots + T_{replyA(n-1)} - T_{replyB(n-2)}}{\frac{n-1}{2}}$$

the amount of which is a maximum of 20 microseconds.

53. Transmitter-receiver according to claim 40, in which the transmitting unit is designed to transmit request data frames and reply data frames with more than two signal pulses in each case and in which the receiving unit is designed to detect the receiving times of more than two signal pulses of a respective request or reply data frame.

54. Transmitter-receiver according to claim 53, in which the transmitting unit is designed to transmit signal pulses of a request or reply data frame at transmitting times which are delayed relative to a time grid, defined in the data frame to be transmitted by the pulse time interval predetermined on the transmitter side, in such a way that the signal pulses are transmitted on average at the grid times preset by the time grid.

55. Transmitter-receiver according to claim 53, in which the receiving unit is designed to delay signal pulses of a received request or reply data frame relative to a time grid, defined by the pulse time interval of the received signal pulses, in such a way that the delayed signal pulses are received on average with the pulse time interval predetermined on the transmitter side.

56. Transmitter-receiver according to claim 55, in which the receiving unit is designed, after detection of the receiving times of the signal pulses, to ascertain an average receiving time in respect of the time grid.

57. Transmitter-receiver according to claim 40, in which the receiving unit is designed to ascertain the time and to detect it as receiving time of a signal pulse, at which a detected signal pulse has a maximum signal amplification or a maximum value of a correlation with a predetermined signal pattern.

58. Transmitter-receiver according to claim 40, in which the receiving unit is designed, to restart a clock generator or oscillator used to determine transmitting and receiving times after determining of a request or reply receiving time and before subsequent determining of a request or reply receiving time of a next request or reply data frame.

59. Transmitter-receiver according to claim 40, in which the receiving unit is designed to check a receiving signal for the presence of a pulse sequence traceable to a multi-path propagation of a single signal pulse and, if there is such a pulse sequence, to ascertain as receiving time of the signal pulse the earliest time within a predetermined window of time at which the receiving signal adopts a maximum value.

60. Transmitter-receiver according to claim 40, which is designed to agree the values of the reply time intervals ($T_{replyAk}$, $T_{replyBi}$) with the second transmitter-receiver before transmitting a request data frame.

61. Transmitter-receiver according to claim 40, which is designed to measure the reply time interval.

62. Transmitter-receiver according to claim 40, which is designed to agree a sequence of different values of reply time intervals with the second transmitter-receiver and when each subsequent distance determination is performed to adhere in each case to the next reply time interval preset in the sequence.

63. Transmitter-receiver according to claim 40, in which the transmitting unit is designed to use the signal pulses used for determining the distance simultaneously as information symbols.

64. Transmitter-receiver according to claim 40, in which the transmitting unit is designed to transmit generated signal pulses in the form of chirp pulses and the receiving unit is designed to reconstruct signal pulses generated on the transmitter side from received chirp pulses.

65. Transmitter-receiver according to claim 64, in which the transmitting unit is designed to transmit two complementary types of chirp pulses which have an identical middle frequency and pulse duration, but a contra-directional frequency response which is symmetrical about the middle frequency, in the case of one chirp pulse type rising and in the case of the other chirp pulse type falling, during the pulse duration, the same number of complementary chirp pulse types being used in a request or reply data frame in each case for determining the distance.

66. Arrangement for determining the spatial distance between a first transmitter-receiver and a second transmitter-receiver each according to claim 40 within a distance range in the order of magnitude of 10 km.

67. Arrangement according to claim 66, with a third transmitter-receiver which is designed to set up a data connection to the first and to the second transmitter-receivers for transmitting round time intervals and reply time intervals to the third transmitter-receiver and which has a distance determining unit which is designed to set up a data connection to the first and to the second transmitter-receivers for transmitting round time intervals and reply time intervals to the distance determining unit, to ascertain a signal transit time ($T_{prop}$) between the first and the second transmitter-receivers using the round time intervals ascertained by the first and second transmitter-receivers and the reply time intervals detected by the first and second transmitter-receivers and to calculate the spatial distance between the first and second transmitter-receivers by multiplying the signal transit time ($T_{prop}$) by a previously known propagation speed of the signal pulses.

68. Arrangement according to claim 66, in which a database unit is provided in a transmitter-receiver, which is designed to ascertain and store clock generator errors of transmitter-receivers using a previously performed distance determination, in which the first and second transmitter-receivers are designed to perform distance determinations taking place after ascertaining their clock generator errors, with just one single signal round and one evaluation step, and in which the evaluation unit of the transmitter-receivers is designed in the evaluation step to work out a corruption of a distance value provisionally ascertained after a single signal round by access to the clock generator errors of the participating transmitter-receiver, previously stored by the database unit for ultimate ascertainment of the distance value.

* * * * *